(12) United States Patent
Furusho

(10) Patent No.: US 6,886,082 B1
(45) Date of Patent: Apr. 26, 2005

(54) INFORMATION PROCESSING SYSTEM

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 369 days.

(21) Appl. No.: 10/130,629

(22) PCT Filed: Nov. 21, 2000

(86) PCT No.: PCT/JP00/08209

§ 371 (c)(1),
(2), (4) Date: Oct. 18, 2002

(87) PCT Pub. No.: WO01/38967

PCT Pub. Date: May 31, 2001

(30) Foreign Application Priority Data

Nov. 22, 1999 (JP) .......................................... 11/330997

(51) Int. Cl.[7] .............................................. G06F 12/00
(52) U.S. Cl. ....................... 711/154; 711/165; 711/170; 711/148; 707/101
(58) Field of Search ................................. 711/154, 165, 711/170, 148, 171, 172, 100; 707/1

(56) References Cited

U.S. PATENT DOCUMENTS 5,408,633 A * 4/1995 Katsumura et al. ......... 711/115
6,324,629 B1 * 11/2001 Kulkarni et al. ............ 711/165
6,587,894 B1 * 7/2003 Stracovsky et al. ............ 710/6

FOREIGN PATENT DOCUMENTS

| JP | 05-035444 | 2/1993 |
| JP | 08-044537 | 2/1996 |
| JP | 10-336216 | 12/1998 |

* cited by examiner

Primary Examiner—Kimberly McLean-Mayo
(74) Attorney, Agent, or Firm—Griffin & Szipl, P.C.

(57) ABSTRACT

The object of this invention is to perform the sorting, compiling and joining of data at extremely high speeds. This is achieved by a distributed memory type information processing system comprising: a CPU module, a plurality of memory modules, each of which having a processor and RAM core, and a plurality of sets of buses that make connections between the CPU and memory modules and/or connections among memory modules, where the processors of the various memory modules execute the processing of arrays managed by the one or more memory modules based on instructions given by the CPU to the processors of the various memory modules. In this system, the processor of the memory module comprises: sorting means that executes a sort on the elements that make up those portions of the array that it itself manages, and reorders the elements according to a specific order, I/O that, depending on the positions that the portions managed by itself occupy within the array, sends the sorted elements together with their sequence numbers to another memory module via a stipulated bus, or receives the elements and sequence numbers from another memory module via a stipulated bus, sequence number calculation means that, upon receipt of the element and sequence number, compares it with the elements that it manages itself and calculates a virtual sequence number which is a candidate for the sequence number of the received element, and returns it to the other memory module, and sequence determination means that, upon receipt of the virtual sequence number, determines the sequence of elements according to the virtual sequence numbers. Thus, the sequence numbers of elements of the array are determined by means of communication between a presentation memory module on the side that sends the element and sequence number and a determination memory module on the side that receives the element and sequence number and calculates the virtual sequence number.

14 Claims, 47 Drawing Sheets

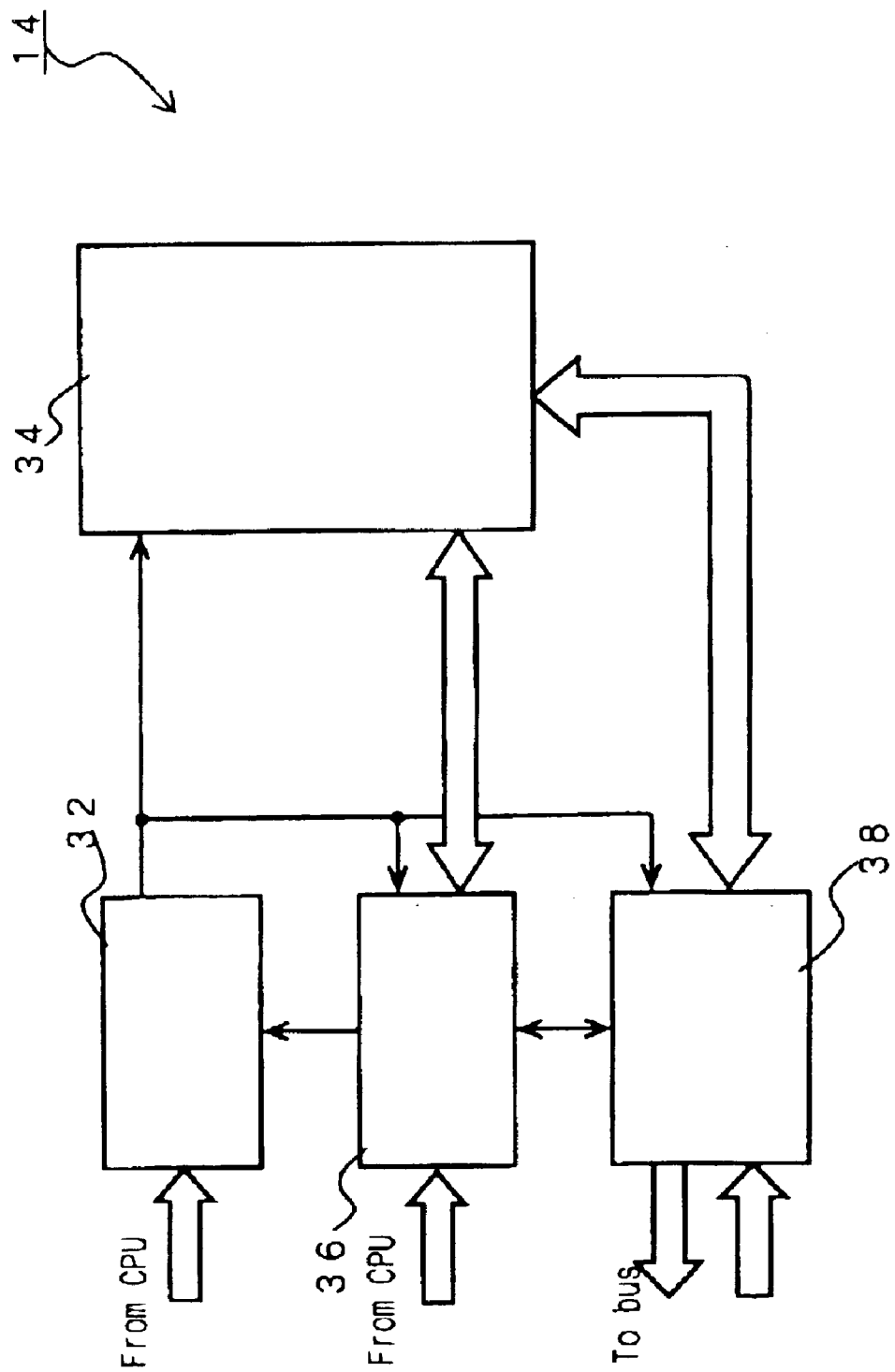

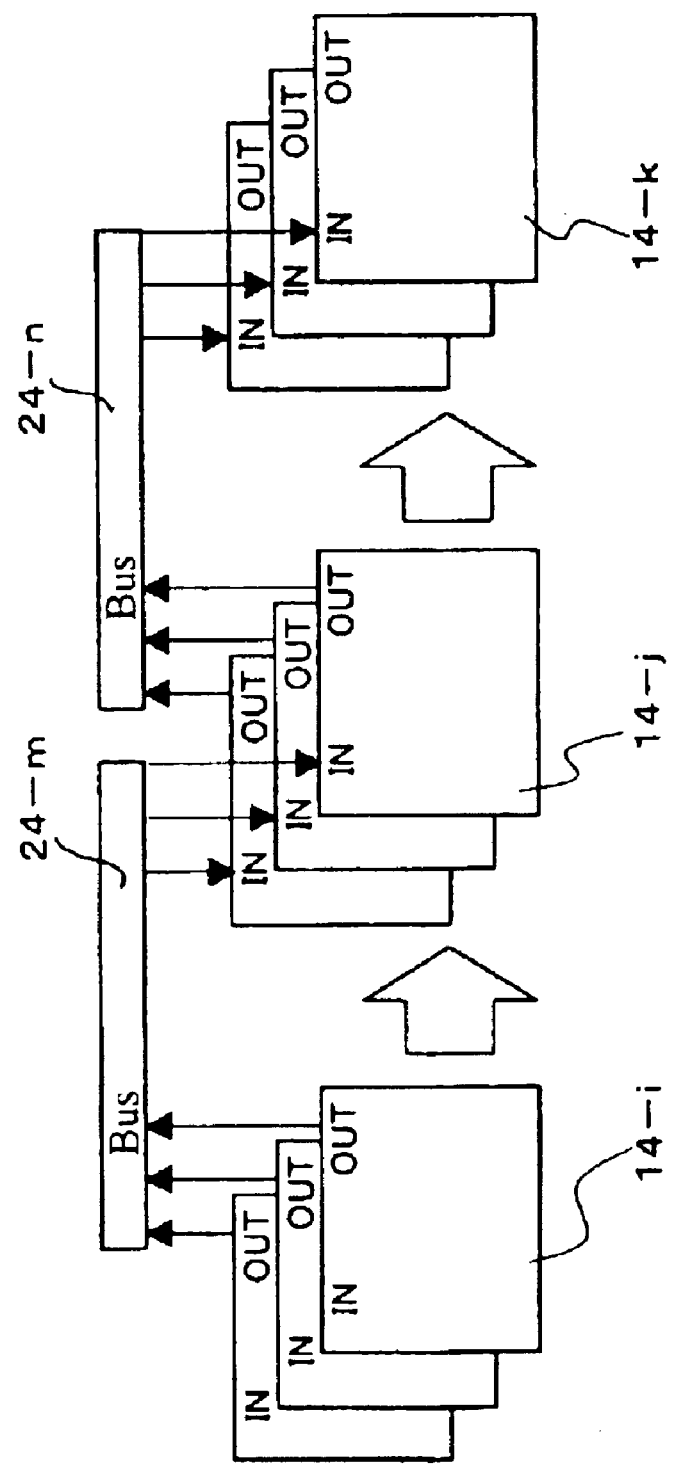

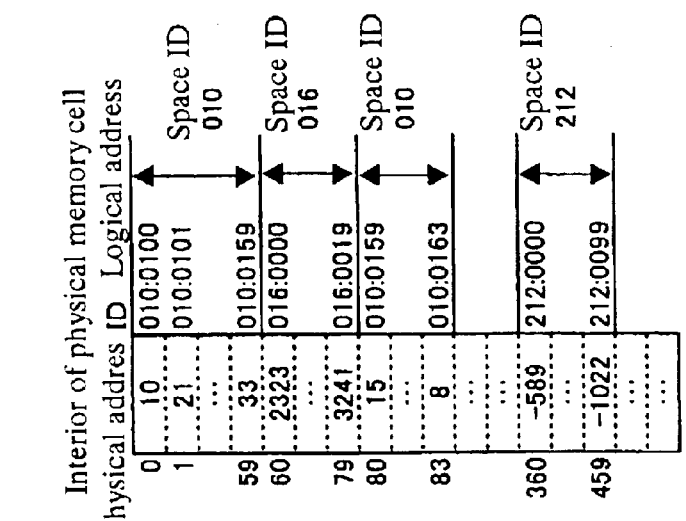
FIG. 4C
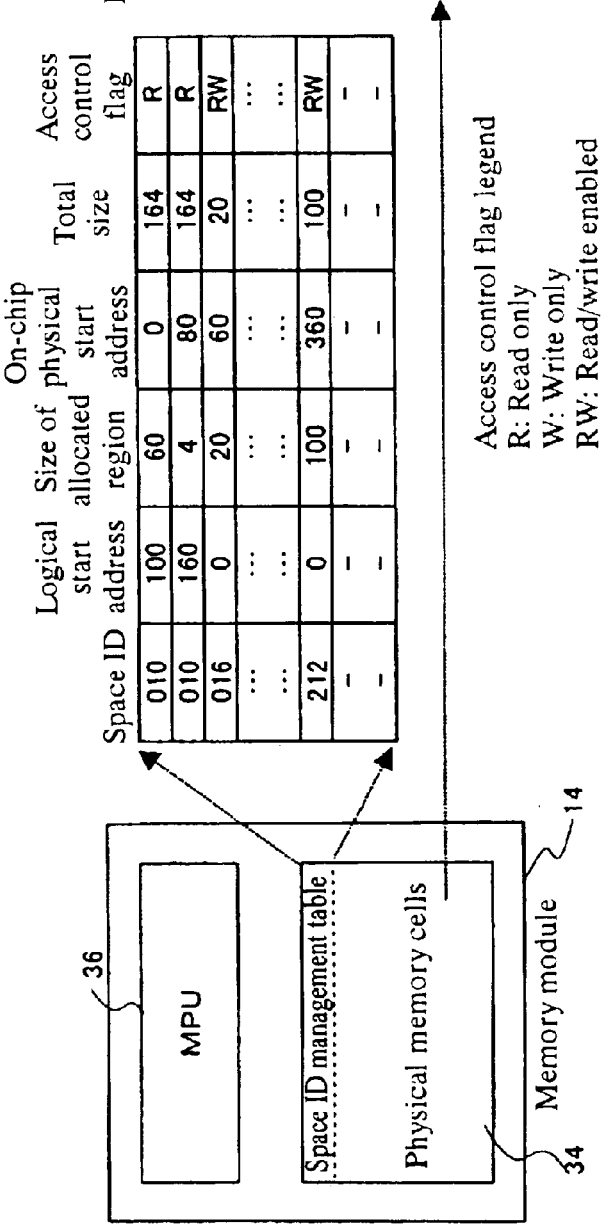
FIG. 4B
FIG. 4A

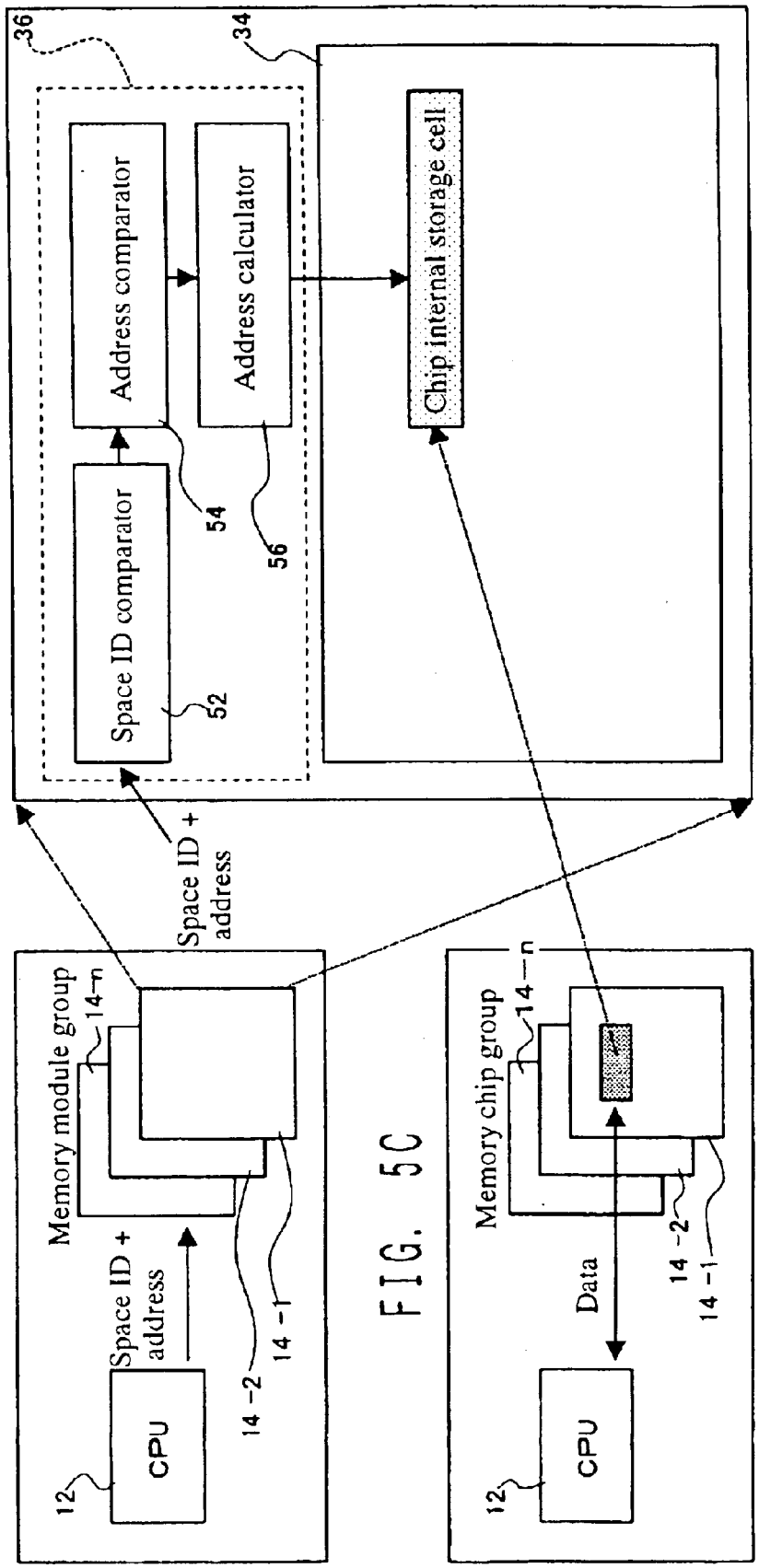

FIG. 6A

| 0 | Smith |
|---|---|
| 1 | Carter |

Range managed by PMM 14-1

| 2 | Carter |
|---|---|
| 3 | Monroe |

Range managed by PMM 14-2

| 4 | Kennedy |
|---|---|
| 5 | Gore |

Range managed by PMM 14-3

| 6 | Wilson |
|---|---|
| 7 | Johnson |

Range managed by PMM 14-4

FIG. 6B

| 0 | Carter |
|---|---|
| 1 | Smith |

Range managed by PMM 14-1

| 2 | Carter |
|---|---|
| 3 | Monroe |

Range managed by PMM 14-2

| 4 | Gore |
|---|---|
| 5 | Kennedy |

Range managed by PMM 14-3

| 6 | Johnson |
|---|---|
| 7 | Wilson |

Range managed by PMM 14-4

FIG. 6C

Sequence number

| 0 | Carter | 0 |
|---|---|---|
| 1 | Smith | 1 |

Range managed by PMM 14-1

| 2 | Carter | 2 |
|---|---|---|
| 3 | Monroe | 3 |

Range managed by PMM 14-2

| 4 | Gore | 0 |
|---|---|---|
| 5 | Kennedy | 1 |

Range managed by PMM 14-3

| 6 | Johnson | 2 |
|---|---|---|
| 7 | Wilson | 3 |

Range managed by PMM 14-4

FIG. 10A

```
                              Sequence number
    Put pointer ──▶  1 | Carter  | 0
    Initialize to 0  0 | Smith   | 1
Comparison pointer ▶ 2 | Carter  | 0
  Initialize to (0, 0, 0)  3 | Monroe | 1
```

FIG. 10B

```
                  Sequence number
       0 ──▶  1 | Carter | 0  ╲
              0 | Smith  | 1   ╲ "Carter"
   (0,0,0) ▶  2 | Carter | 0   ╱
              3 | Monroe | 1
```

FIG. 10C

```
                  Sequence number
       0 ──▶  1 | Carter | 0
              0 | Smith  | 1
   (0,0,0) ▶  2 | Carter | 0
              3 | Monroe | 1
```

FIG. 10D

```
                       Sequence number
           0 ⤏  1 | Carter | 0
                0 | Smith  | 1
(0,0,0)→(0,1,1) ▶ 2 | Carter | 0
                  3 | Monroe | 1
```

FIG. 11A

```
          Sequence number
   0 ----  1 | Carter | 0→0
   1 ----► 0 | Smith  | 1
(0,1,1)=► 2 | Carter | 0
          3 | Monroe | 1
```

FIG. 11B

```
          Sequence number
          1 | Carter | 0
   1 ----► 0 | Smith  | 1  ╲
(0,1,1)=► 2 | Carter | 0   }  "Smith"
          3 | Monroe | 1   ╱
```

FIG. 11C

```
          Sequence number
          1 | Carter | 0
   1 ----► 0 | Smith  | 1
       =► 2 | Carter | 0
          3 | Monroe | 1
```

FIG. 11D

```
          Sequence number
          1 | Carter | 0
   1 ----► 0 | Smith  | 1
(0,1,1)=► 2 | Carter | 0→1
(2,1,2)=► 3 | Monroe | 1→2
(2,2,3)=►
(2,2,4) [After processing of Step 1322]
```

FIG. 12A

Sequence number

|   |        |     |
|---|--------|-----|
| 1 | Carter | 0   |
| 0 | Smith  | 1→3 |
|   |        |     |
| 2 | Carter | 1   |
| 3 | Monroe | 2   |

Sequence number

|   |        |   |
|---|--------|---|
| 1 | Carter | 0 |
| 0 | Smith  | 3 |
|   |        |   |
| 2 | Carter | 1 |
| 3 | Monroe | 2 |

2→                    "End"

Sequence number

|   |         |   |
|---|---------|---|
| 5 | Gore    | 0 |
| 4 | Kennedy | 2 |
| 7 | Johnson | 1 |
| 6 | Wilson  | 3 |

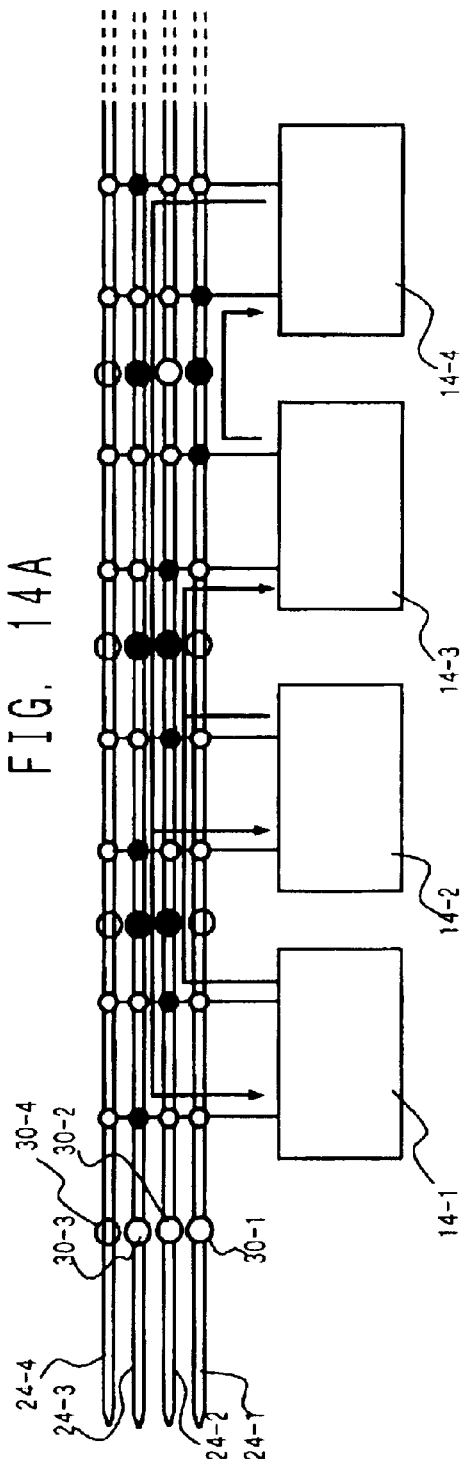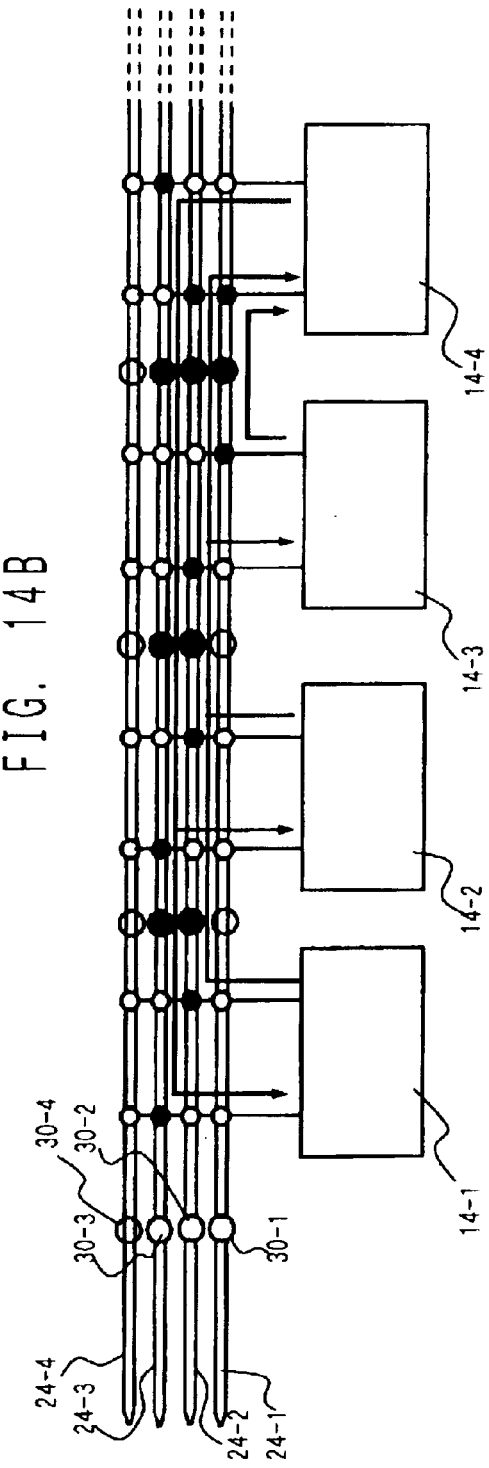

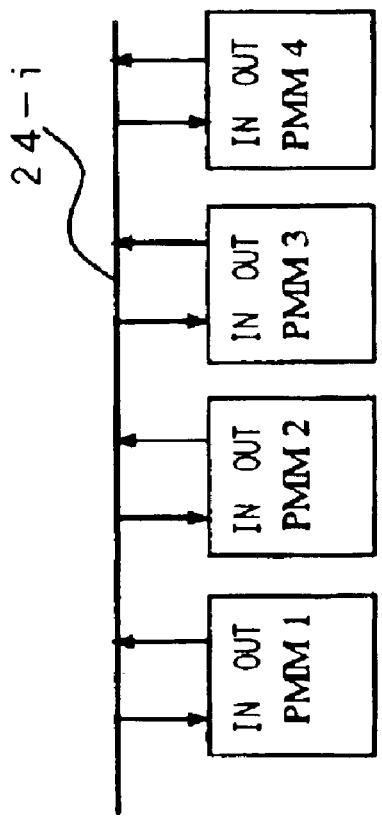
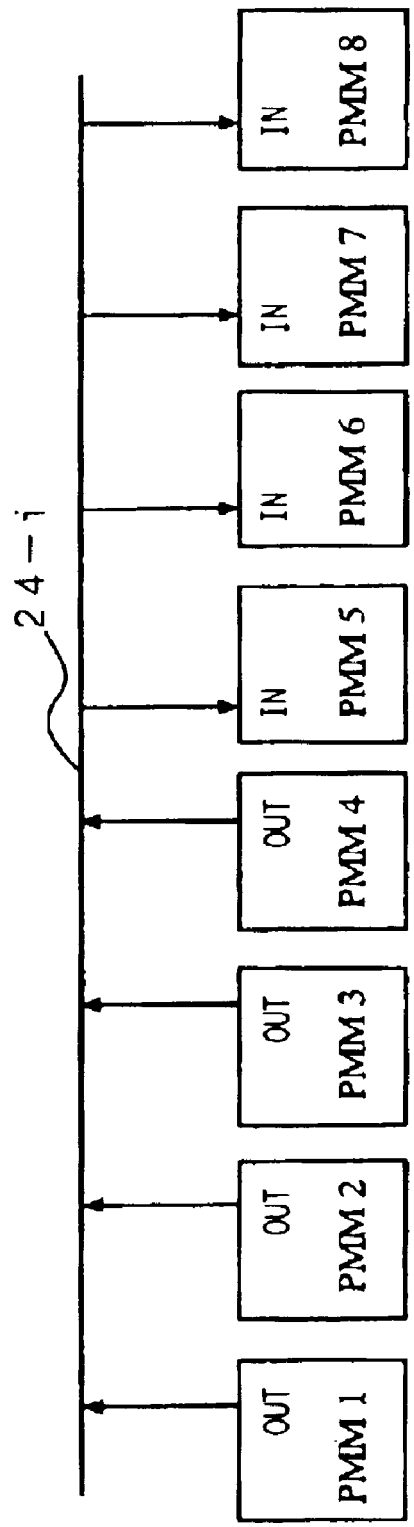

FIG. 25

Preparation complete state
Sorting complete in
PMM 1 through PMM 4
Sequence number

| | | | Sequence number counter | Identical-value counter | Previous-value storage register |
|---|---|---|---|---|---|
| 1 | Clinton | 2 | 0 | 0 | – |
| 0 | Johnson | 4 | | | |
| 2 | Johnson | 5 | 0 | 0 | – |
| 3 | Johnson | 6 | | | |
| 5 | Carter | 0 | 0 | 0 | – |
| 4 | Clinton | 3 | | | |
| 7 | Carter | 1 | 0 | 0 | – |
| 6 | Johnson | 7 | | | |

FIG. 26

| | Sequence number | | 1st bus | Sequence number counter | Identical-value counter | Previous-value storage register |
|---|---|---|---|---|---|---|
| PMM1 | 1 Clinton | 2 | | 0→1 | 0→1 | – → Carter |
| | 0 Johnson | 4 | | | | |
| PMM2 | 2 Johnson | 5 | | 0→1 | 0→1 | – → Carter |
| | 3 Johnson | 6 | | | | |
| PMM3 | 5 Carter | ⓪ | | 0→1 | 0→1 | – → Carter |
| | 4 Clinton | 3 | | | | |
| PMM4 | 7 Carter | 1 | | 0→1 | 0→1 | – → Carter |
| | 6 Johnson | 7 | | | | |

("Carter", 1)

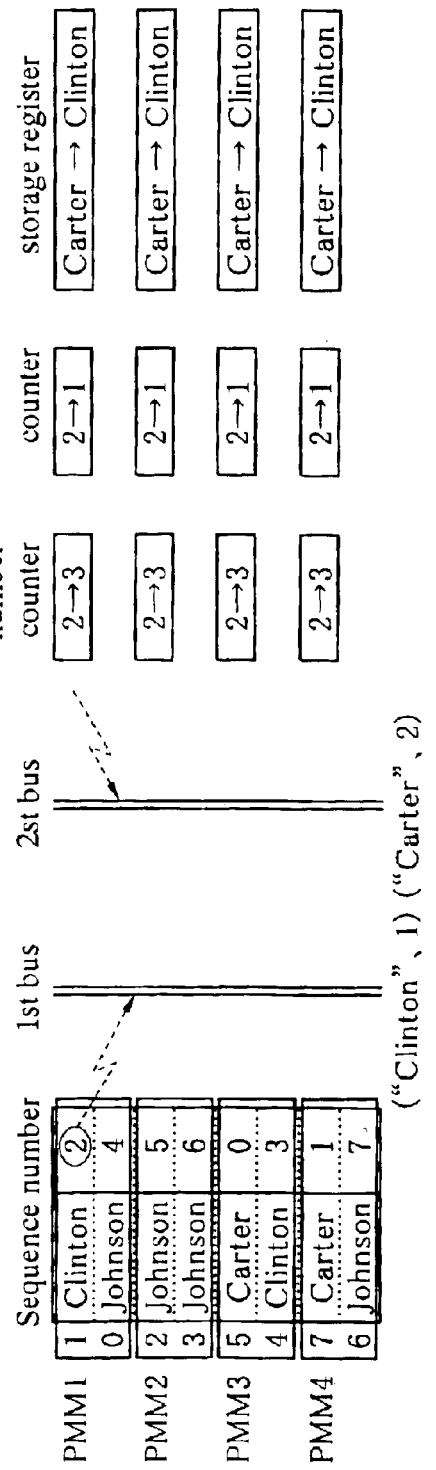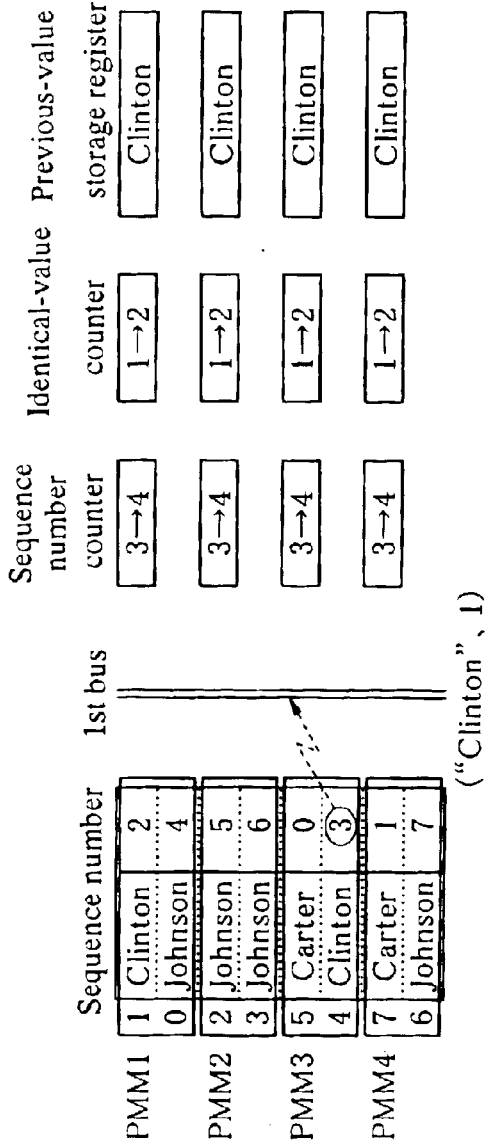

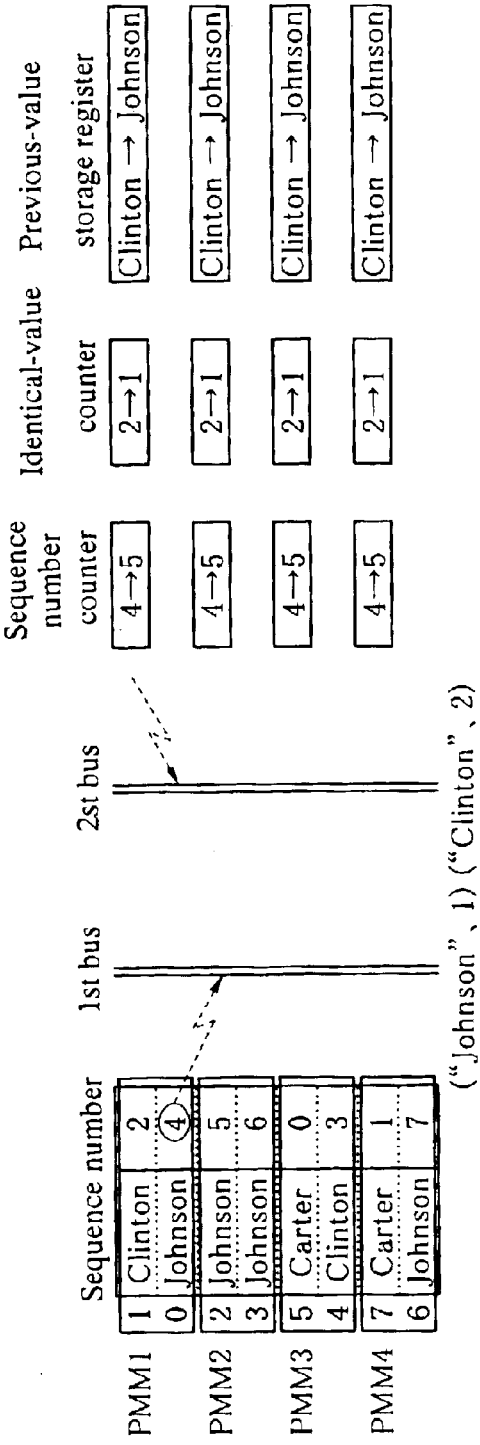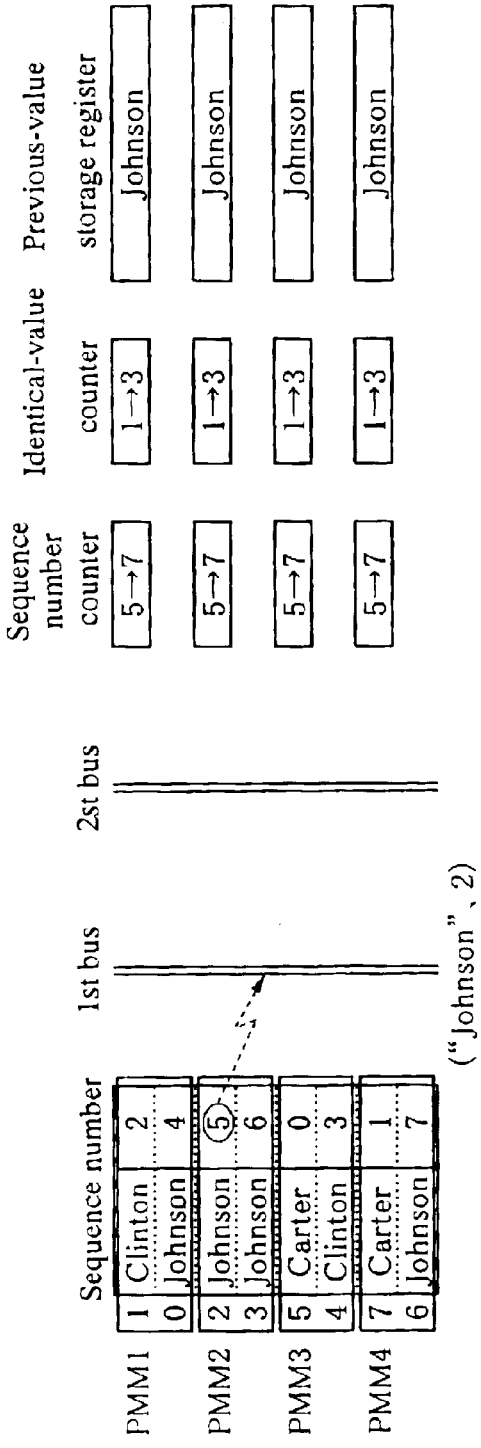

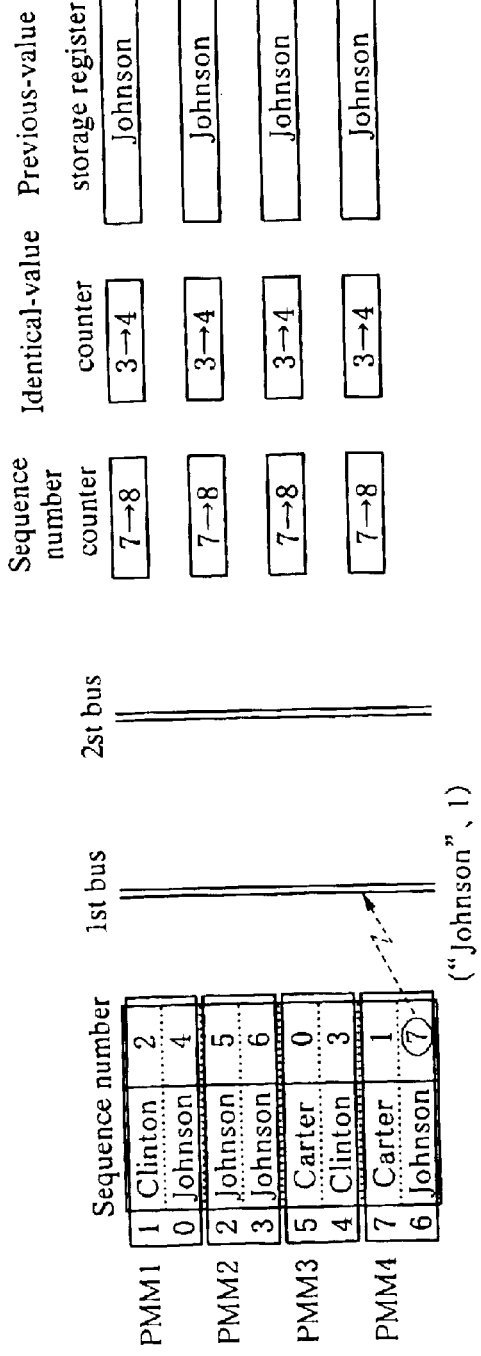
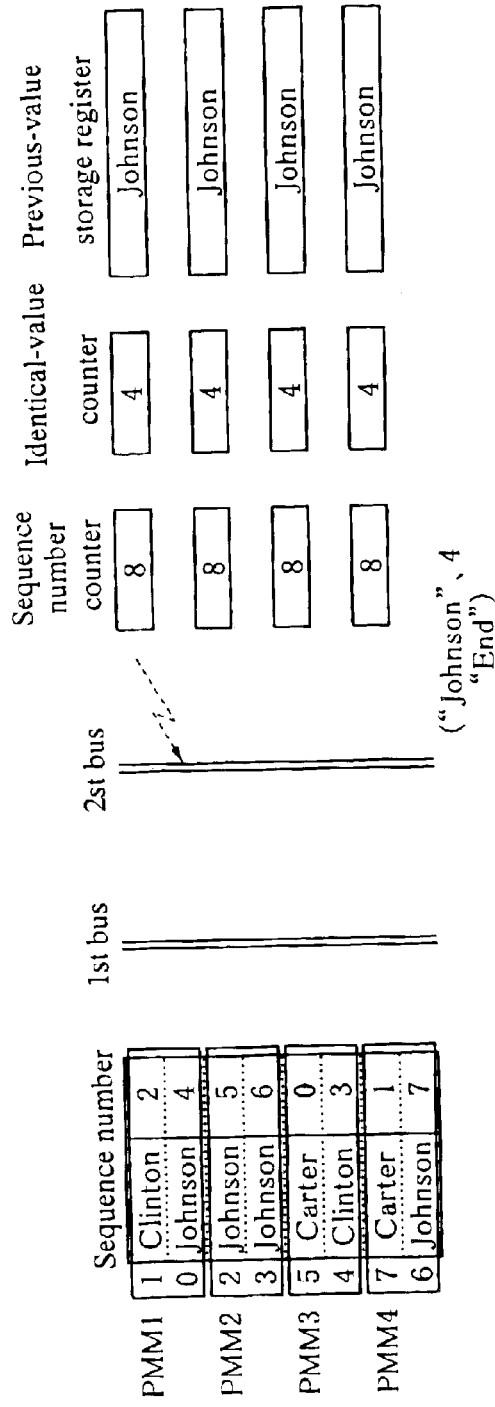

Processing in the latter PMMs

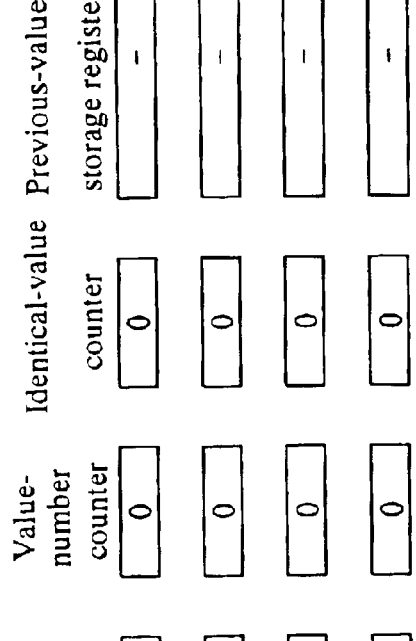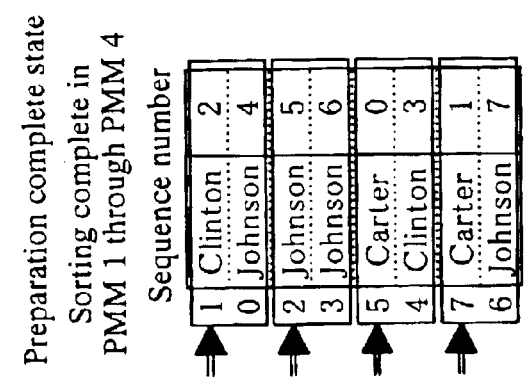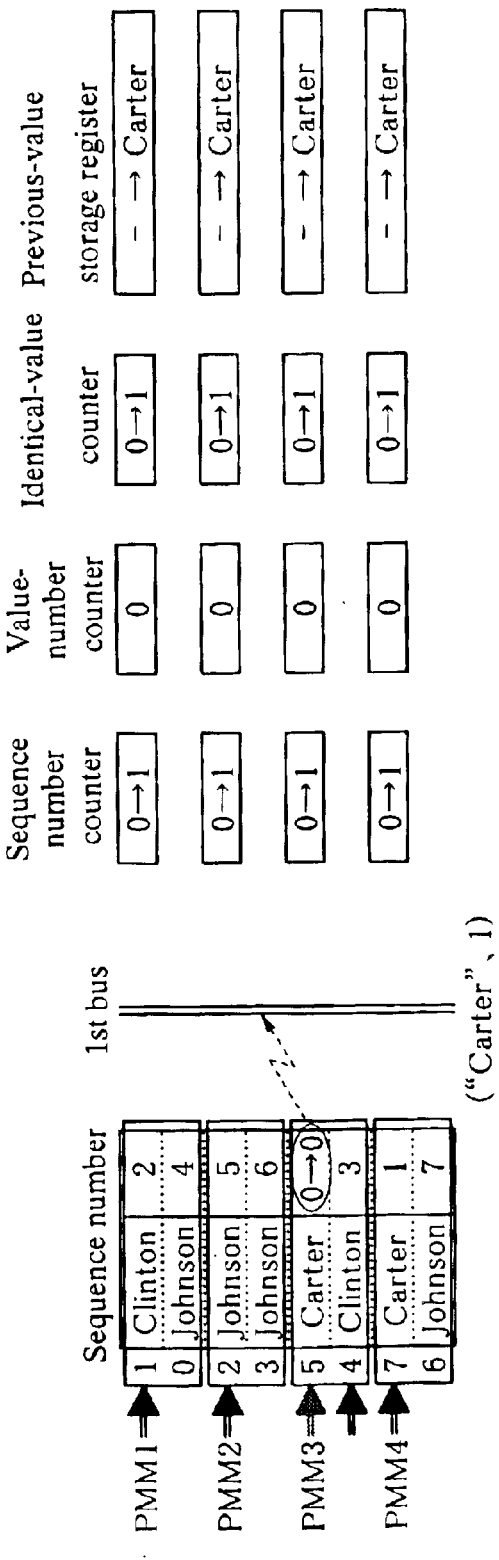

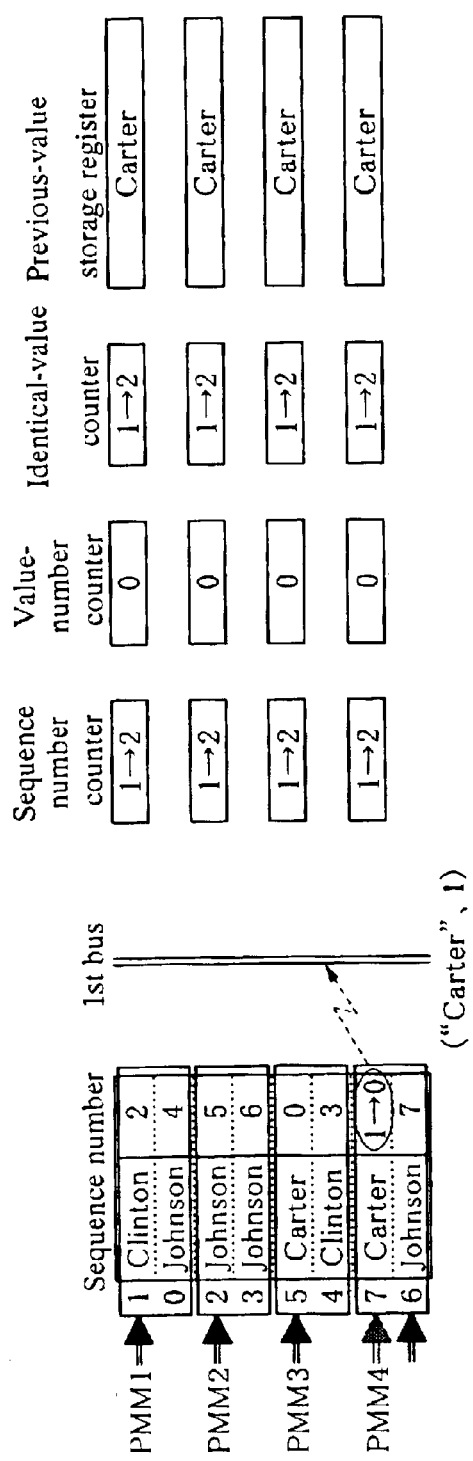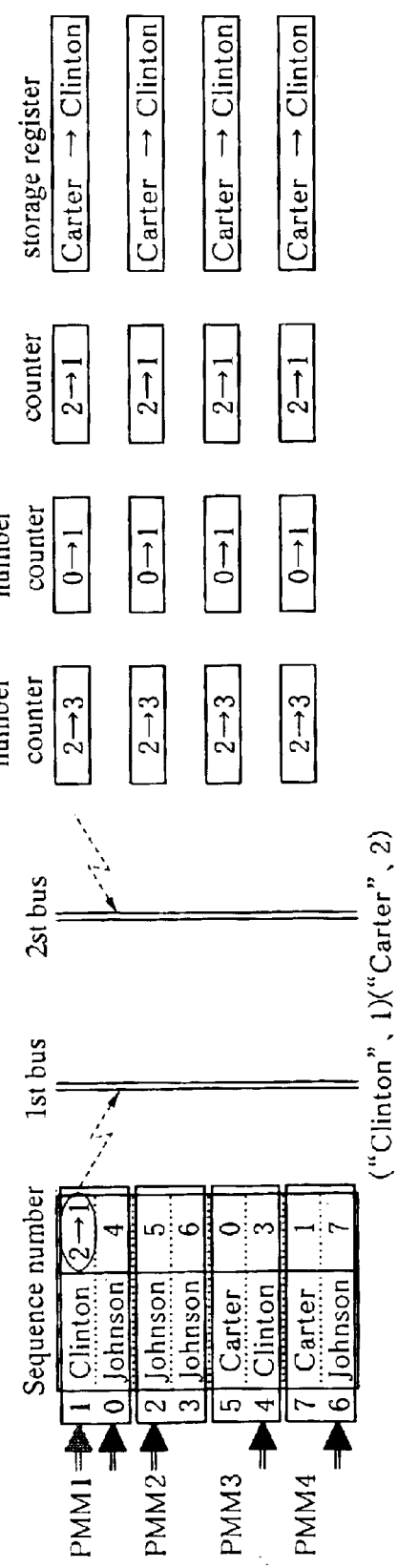
FIG. 35A
FIG. 35B

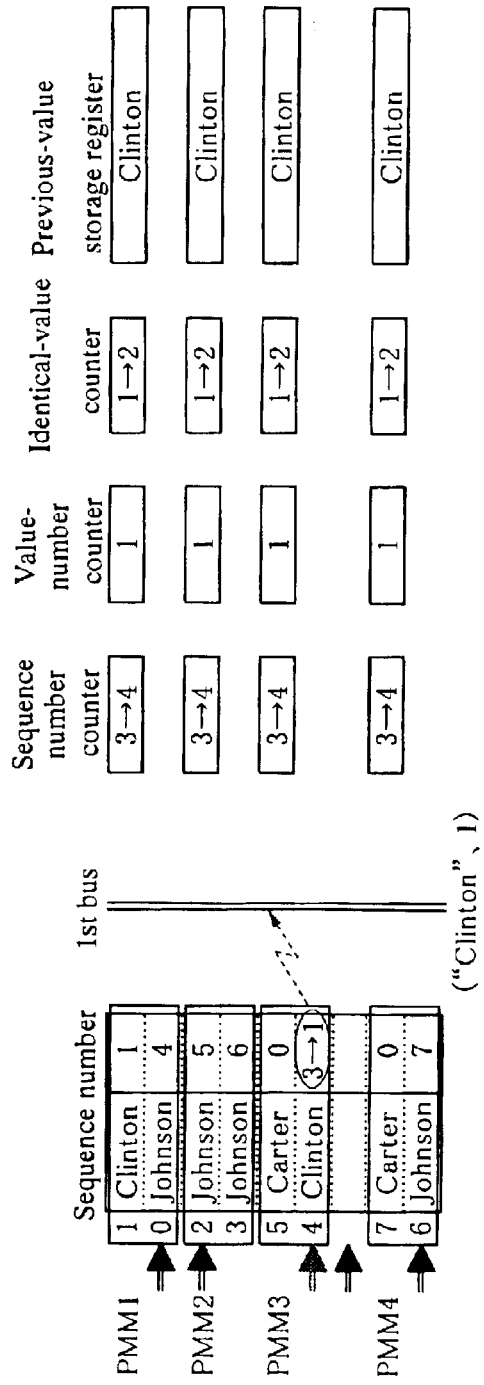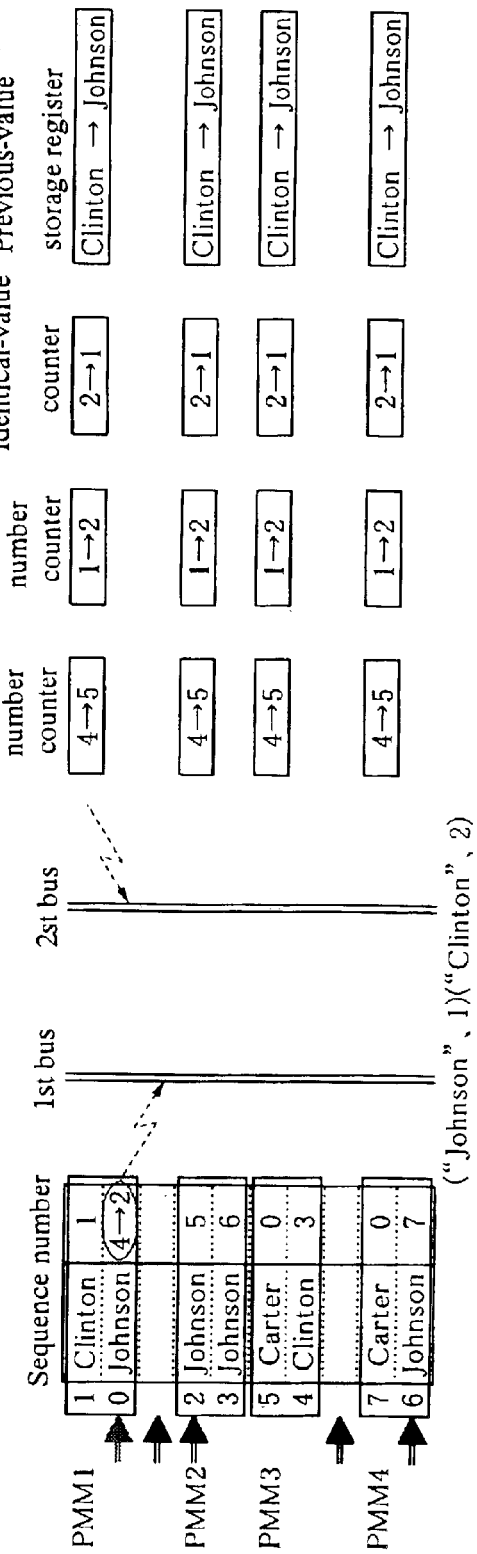

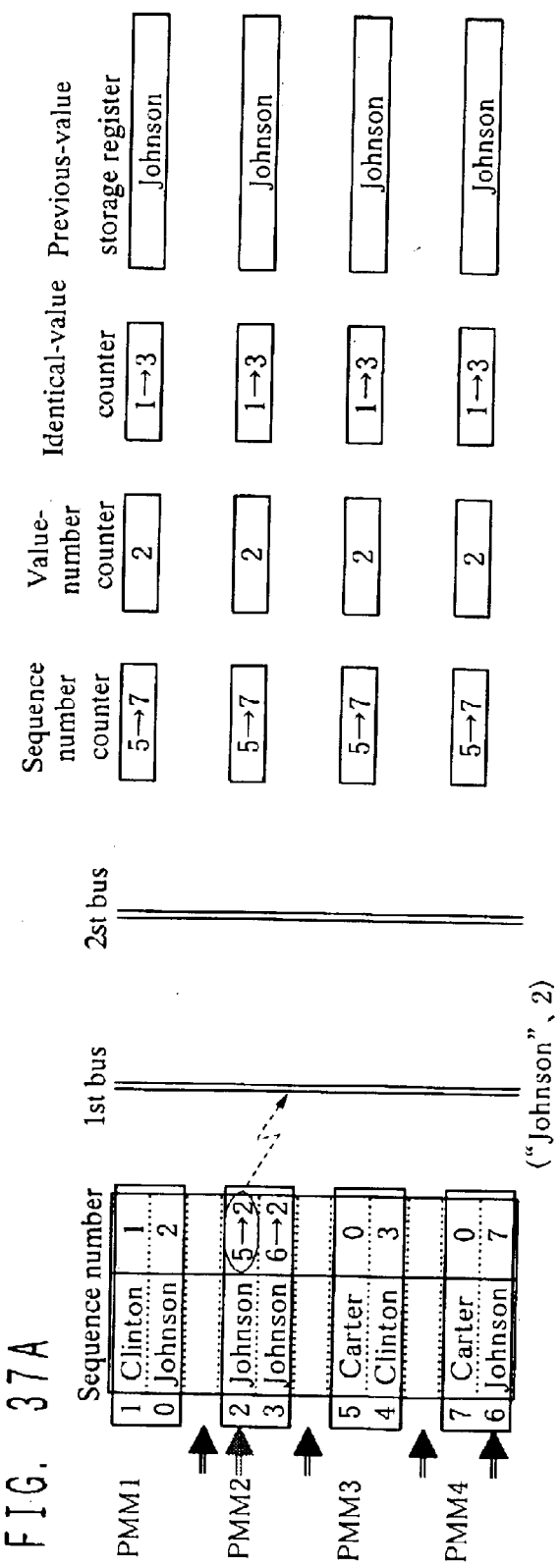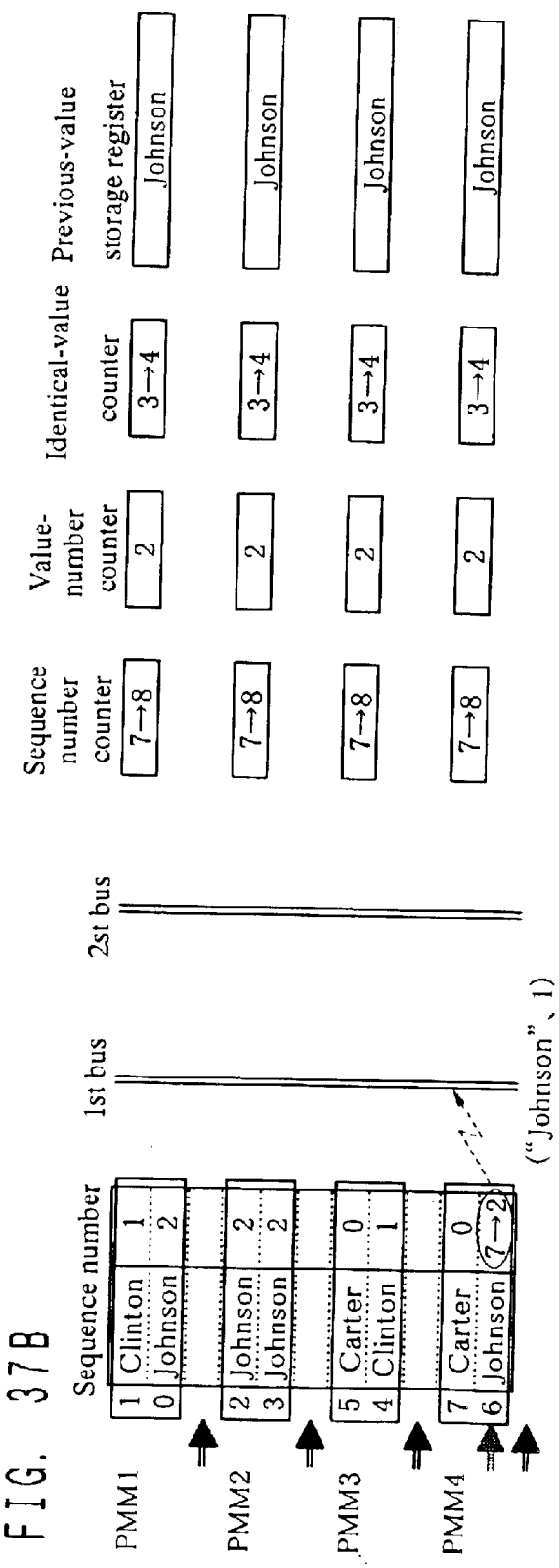
FIG. 37A
FIG. 37B

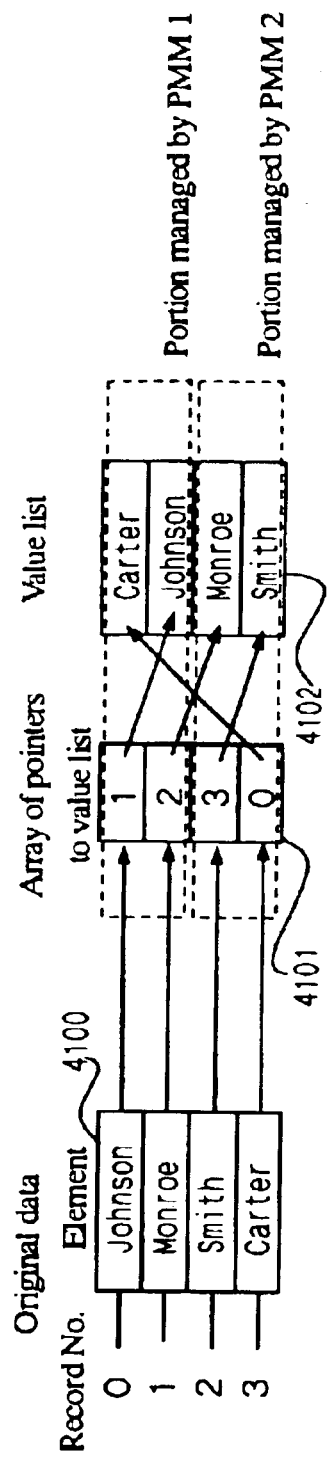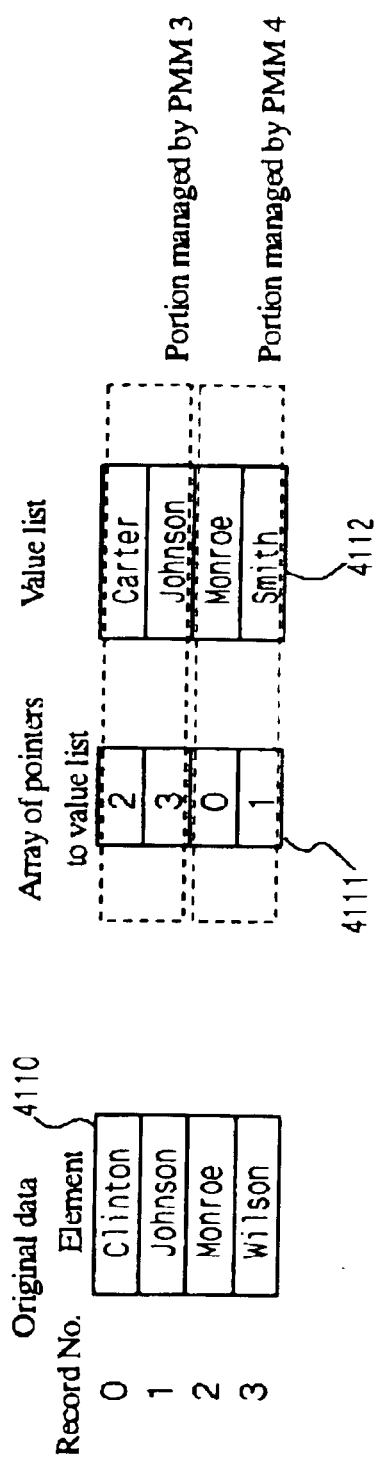
FIG. 41A
FIG. 41B

FIG. 42A

| 0 | Carter | 0 |
|---|--------|---|
| 1 | Johnson | 1 |
| 2 | Monroe | 2 |
| 3 | Smith | 3 |

Range managed by PMM 1

Range managed by PMM 2

| 0 | Clinton | 0 |
|---|---------|---|
| 1 | Johnson | 1 |
| 2 | Monroe | 2 |
| 3 | Wilson | 3 |

Range managed by PMM 3 (Also possible with PMM 1)

Range managed by PMM 4 (Also possible with PMM 1)

FIG. 42B

| 0 | Carter | 0 |
|---|--------|---|
| 1 | Johnson | 2 |
| 2 | Monroe | 4 |
| 3 | Smith | 6 |

Range managed by PMM 1

Range managed by PMM 2

| 0 | Clinton | 1 |
|---|---------|---|
| 1 | Johnson | 3 |
| 2 | Monroe | 5 |
| 3 | Wilson | 7 |

Range managed by PMM 3 (Also possible with PMM 1)

Range managed by PMM 4 (Also possible with PMM 1)

FIG. 42C

| 0 | Carter | 0 |
|---|--------|---|
| 1 | Johnson | 2 |
| 2 | Monroe | 3 |
| 3 | Smith | 4 |

Range managed by PMM 1

Range managed by PMM 2

| 0 | Clinton | 1 |
|---|---------|---|
| 1 | Johnson | 2 |
| 2 | Monroe | 3 |
| 3 | Wilson | 5 |

Range managed by PMM 3 (Also possible with PMM 1)

Range managed by PMM 4 (Also possible with PMM 1)

Joined value list

| 0 | Carter |
|---|--------|
| 1 | Clinton |
| 2 | Johnson |
| 3 | Monroe |
| 4 | Smith |
| 5 | Wilson |

Joined count array

| 0 | 1 |
|---|---|
| 1 | 1 |
| 2 | 2 |
| 3 | 2 |
| 4 | 1 |
| 5 | 1 |

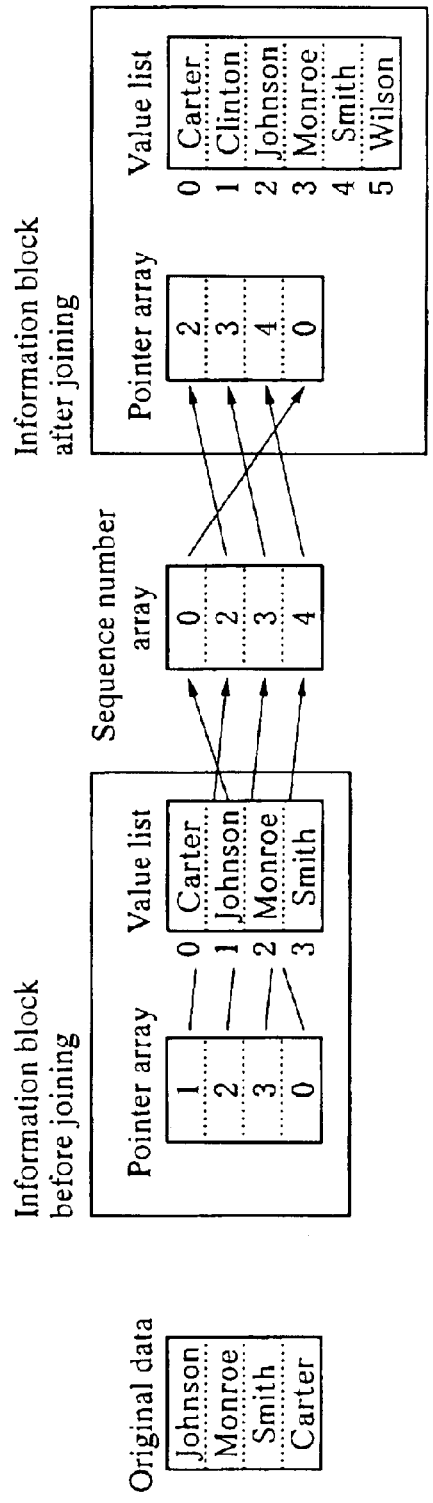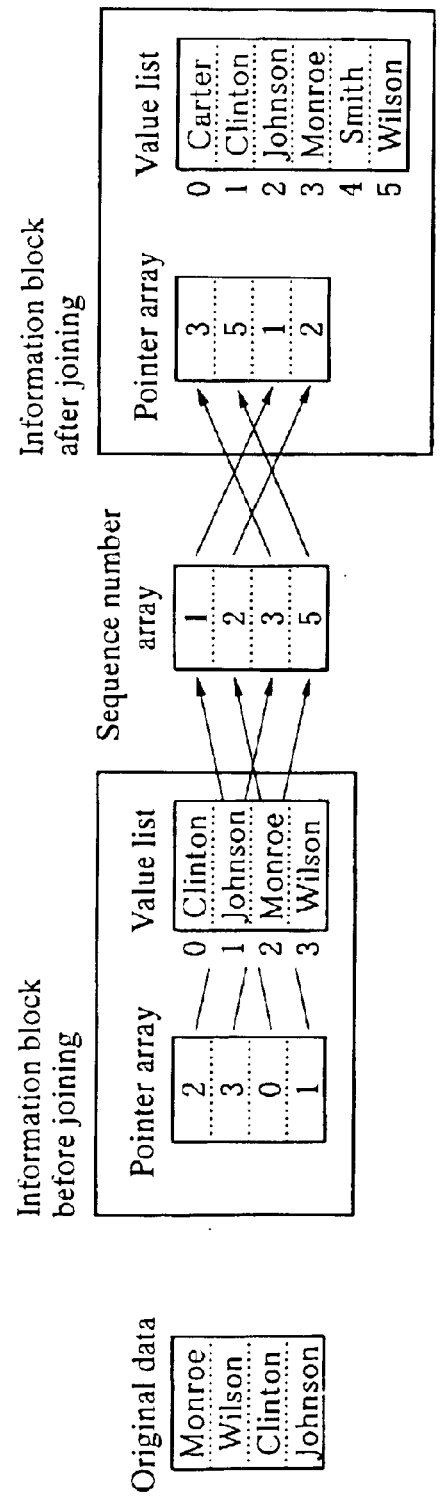
FIG. 43A
FIG. 43B

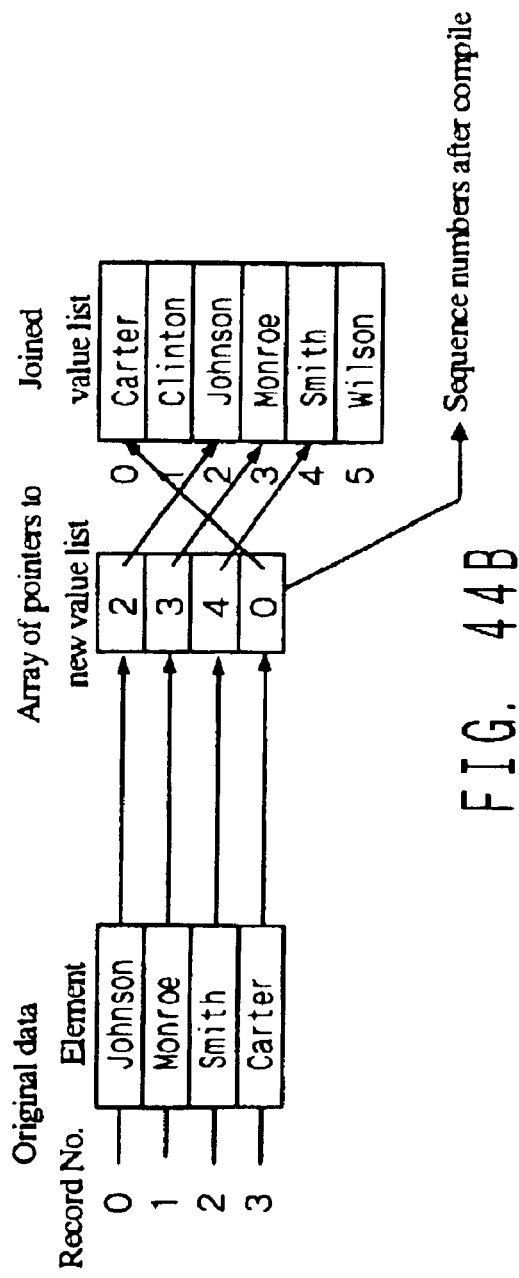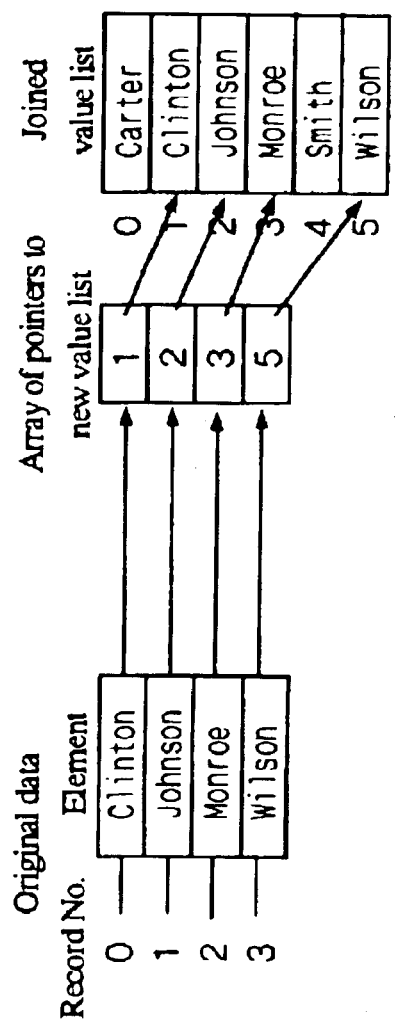
FIG. 44A
FIG. 44B

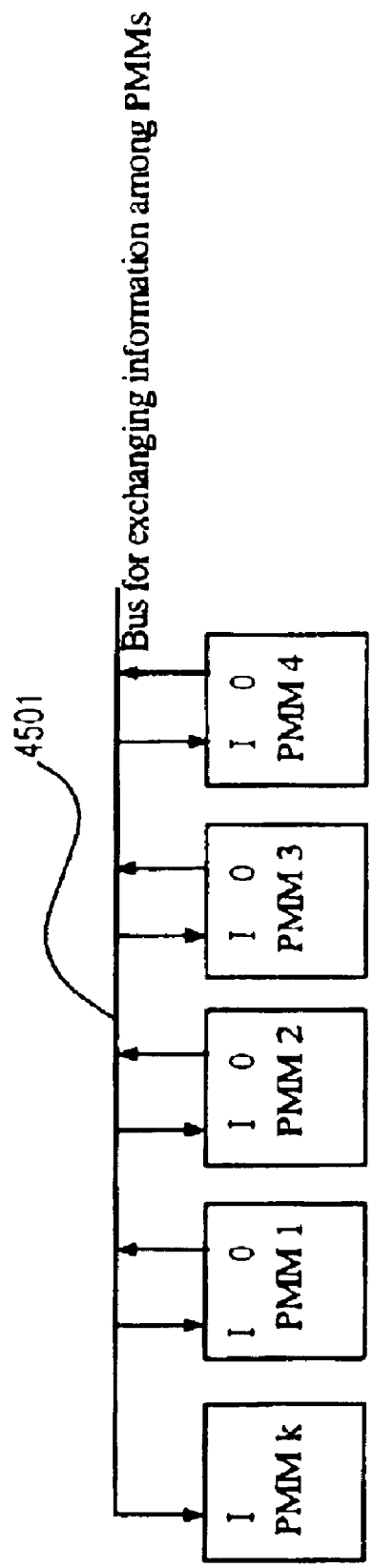

INFORMATION PROCESSING SYSTEM

BACKGROUND OF THE INVENTION

1. Field of the Invention

The invention relates to a distributed memory-type information processing apparatus, and particularly to an information processing apparatus that is able to perform the sorting, compiling and joining of data at extremely high speeds.

2. Description of the Prior Art

Now that computers have been introduced into many aspects of society in its entirely and the Internet and other networks have become pervasive, data is being accumulated on a large scale. Vast amounts of computing power is required in order to process data on such large scales, so attempts to introduce parallel processing are natural.

Now, parallel processing architectures are divided into "shared memory" types and "distributed memory" types. The former ("shared memory" types) are architectures wherein a plurality of processors shares a single enormous memory space. In this architecture, traffic between the group of processors and the shared memory becomes a bottleneck, so it is not easy to construct practical systems that use more than 100 processors. Accordingly, at the time of calculating the square roots of 1 billion floating-point numbers, for example, processing can be performed no faster than 100 times the speed of a single CPU. Empirically, the upper limit is found to be roughly 30 times.

In the latter ("distributed memory" types), each processor has its own local memory and these are linked to construct a system. With this architecture, it is possible to design a hardware system that incorporates even several hundred to tens of thousands of processors. Accordingly, at the lime of calculating the aforementioned square roots of 1 billion floating-point numbers, processing can be performed several hundred times to tens of thousands of times the speed of a single CPU.

Latent demand for parallel processing implemented by a large number of processors numbering in the range of several hundred or more is said to be large, but as described above, these are difficult to design using architectures other than the distributed memory type when they are to be implemented using current realistic hardware technology.

In distributed memory architectures, the capacity of the memory attached to the individual processors is small, so in the storage and processing of data (typically in arrays) on a large scale which is one of the main objects of parallel processing, it is necessary to divide this data among the plurality of processors and the memory attached to each.

However, when arrays are divided among a plurality of processors and the memory attached to each, bus mastering to prevent the collision of data upon the bus becomes difficult, so if the various processors cannot operate in parallel, then there is a problem in that the efficiency of processor usage cannot be increased and it is not possible to increase the speed of processing. To this end, the present invention achieves various objects as described below.

(1) Collision of data on the bus algorithmically cannot occur so bus mastering is unnecessary; thereby the processing speed can be increased by making full use of the bus bandwidth.

(2) Parallel processing is possible by combining a plurality of memory modules equipped with a processor (or preferably a plurality of processors) and memory, and it is possible for the respective memory modules to be used effectively and processing can be allocated independently to processors within each memory module, and thereby processing speed can be further increased by the effective utilization of memory modules.

(3) If the size of data subject to sorting is N, then a data size of only $O(N)$ is required. (With conventional sorting, a data size of $O(N*N)$ or $O(N*Log(N))$ is necessary in the worst case.)

(4) The processing time is stable and even in the worst case, a predictable processing speed is guaranteed.

To wit, the present invention has as its object to provide an information processing apparatus that is able to perform the sorting of arrays at extremely high speed and with stable processing times.

SUMMARY OF THE INVENTION

An object of the present invention is achieved by a distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, and wherein said information processing system is characterized in that the processor of said memory module comprises: sorting means that executes a sort on the elements that make up those portions of the array that it itself manages, and reorders said elements according to a specific order, I/O that, depending on the positions that said portions managed by itself occupy within the array, sends said sorted elements together with their sequence numbers to another memory module via a stipulated bus, or receives said elements and sequence numbers from another memory module via a stipulated bus, sequence number calculation means that, upon receipt of said element and sequence number, compares it with the elements that it manages itself and calculates a virtual sequence number which is a candidate for the sequence number of the received element, and returns it to said other memory module, and sequence determination means that, upon receipt of said virtual sequence number, determines the sequence of elements according to said virtual sequence numbers; such that the sequence numbers of elements of said array are determined by means of communication between a presentation memory module on the side that sends said element and sequence number and a determination memory module on the side that receives said element and sequence number and calculates the virtual sequence number.

By means of the present invention, the presentation of elements and sequence numbers by a presentation memory module is executed via a bus and virtual sequence numbers are calculated by a determination memory module, and these virtual sequence numbers are given to the presentation memory module via another bus. Accordingly, sorting can proceed in parallel in the presentation memory module and determination memory module, and bus collisions can be averted.

In a preferred embodiment of the present invention, said memory module comprises: element identification/sending means that identifies elements subject to processing according to the determined sequence number and sends it over one of the buses, element comparison means that compares the previous element subject to processing against the sent element, and an identical-value counter that indicates the count of identical elements and whose value is incremented when an identical element is sent; wherein said element comparison means is constituted such that when the previous element subject to processing is determined to be different from the sent element, the previous element subject to processing is associated with the value of the identical-value counter related to the element in question and one of which is sent, and moreover, one of the memory modules receives the previous element subject to processing and the value of the related counter thus sent, and is provided with an array in which they are associated and placed in the order received.

By means of this embodiment, in one of the memory modules, the elements and their redundancy are received in a stipulated sequence and thereby it is possible to create a non-redundant array of elements and count of the various elements. To wit, a non-redundant list of elements and the numbers of each of the elements in the original array can be easily determined thereby.

In another preferred embodiment of the present invention, said memory module comprises: a value-number counter that indicates the non-redundant sequence numbers, whose value is incremented in the event that said element comparison means determines that the previous element subject to processing is different from the sent element, and sequence number updating means that, regarding the sent element, if the previous element subject to processing is identical to the sent element, sets the value of the value-number counter as the sequence number of the non-redundant element in question, but if they are different, sets the incremented value of the value-number counter as the sequence number of the non-redundant element in question.

By means of this embodiment, it is possible to convert the sequence numbers applied to the elements of the array to one in the state wherein redundancy of elements is eliminated.

In addition, an object of the present invention is achieved by a method of sorting arrays using a distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, wherein said method of sorting comprises:

(a) a step of sorting the elements that make up those portions of the array that it itself manages in the memory module, (b) a step of, depending on the positions that said portions managed by itself occupy within the array, determining, among the memory modules that manage portions of said array, a presentation memory module on the side that sends the element and sequence number, and a determination memory module on the side that receives said element and sequence number, (c) a step of, in the presentation memory module, transmitting the sorted element together with its sequence number to the other memory module via a stipulated bus, (d) a step of, in the determination memory module, receiving said element and its sequence number from the other memory module via a stipulated bus, (e) a step of, in said determination memory module, based on the sequence numbers of elements managed by said determination memory module, calculating a virtual sequence number that indicates a candidate for the sequence number of the received element, and returning said virtual sequence number to said presentation memory module, and (f) a step of, in said presentation memory module, upon receiving said virtual sequence number, updates the sequence number of the element according to said virtual sequence number, and (g) upon each completion of said steps (d) through (f), by taking each of the memory module groups consisting of the presentation memory module and determination memory module pertaining to the element that is given a stipulated sequence number by means of said steps (d) through (f) as one of the presentation memory module group and determination memory module group, respectively, and repeating steps (d) through (f) to update the sequence numbers of elements in each memory module group, the sequence numbers of each element of the array are determined.

By means of the present invention, the calculation in the presentation memory module, sending of elements and sequence numbers in the presentation memory module, calculation in the determination memory module group and sending of virtual sequence numbers in the presentation memory module can be performed in parallel, and bus collisions can be averted. To wit, it is possible to achieve the sorting (assignment of sequence numbers to the elements of the array) at extremely high speeds. In addition, the data size in memory can be kept to only O(N).

In a preferred embodiment of the aforementioned present invention, step (e) comprises:

(e1) a step of calculating the virtual sequence number based on a forward insertion number that indicates the number of elements to be inserted in front of the received element, the sequence number regarding the element to be positioned in front, and the received sequence number.

In a further preferred embodiment of the aforementioned present invention, step (f) comprises:

(f1) a step of setting the received virtual sequence number to the sequence number of the element sent in step (c).

A preferred embodiment of the present invention further comprises:

(h) a step of, in said presentation memory module, calculating the redundancy which indicates how many elements managed by memory modules that make up said presentation memory module group are present within said memory module group, wherein said step (c) comprises:

(c1) a step of transmitting the sorted element together with its sequence number and redundancy to the other memory module so that identical elements are not transmitted redundantly, wherein said step (e) comprises:

(e1) a step of calculating the virtual sequence number based on a forward insertion number that indicates the number of elements to be inserted in front of the received element, the sequence number regarding the element to be positioned in front, and the received sequence number and redundancy, and wherein said step (f) comprises:

(f2) a step of deciding the sequence number of the element identical to the element in question based on the difference between the virtual sequence number and the sequence number at the time of sending of the element in step (c).

By means of the present invention, there is no need for the presentation memory module to send the same element multiple time. In addition, when the redundancy of a certain element is calculated, it is possible to send the sequence numbers and redundancy of the element in question to the judgment memory module, and in the determination memory module, the calculation of a virtual sequence number for the element in question can be executed. To wit, this can prevent a decrease in the efficiency of utilization of the memory modules.

In a further preferred embodiment, the presentation memory module is initially an independent memory module and the receiving module is also an independent memory module, and the presentation memory module group consists of $2^n$ memory modules where n (n: an integer greater than or equal to 1) is incremented each time steps (d) through (t) are complete, while the determination memory module group consists of $2^n$ memory modules.

As described above, the sorting can be achieved ideally when $2^n$ memory modules are used.

In addition, another embodiment of the present invention is a compiling method wherein an array is sorted by means of the aforementioned sorting method, and based on said sorted array, a new array is generated such that the elements within said array are placed in the stipulated order without duplication, and wherein said compiling method comprises:

(i) a step of, in the stipulated memory module, sending the elements subject to processing according to the sequence number, (j) a step of, if the previous element subject to processing is identical to the sent element, incrementing the identical-value counter that indicates the count of the identical elements present, but if an element different from the previous element subject to processing was sent, associating the previous element subject to processing with the value of the identical-value counter related to the element in question and sending these, (k) a step of receiving the previous element subject to processing and the value of the associated identical-value counter, and generating a new array which has them associated, and (l) repeating steps (i) through (j) to place the elements and their counts such that they are associated in said new array.

In addition, the aforementioned compiling method may further comprise:

(m) a step of, in one of the modules, monitoring the element sent in step (j) and the value of the associated identical-value counter, wherein step (k) is executed by means of one of said modules.

In addition, the aforementioned compiling method may further comprise:

(n) a step of, in the memory modules that manage the elements of said array, providing a sequence-number counter and identical-value counter that hold the sequence number of the element subject to processing and the count of said elements, respectively, and also providing a register that temporarily stores the previous element subject to processing, (o) a step of, in the memory module that manages the element having the sequence number in question, sending the element in question according to the sequence number, (p) a step of, in the memory module that manages the elements of the array, comparing the received element and the content of the register, and if these are identical, incrementing the count, but if they are not identical, sending the content of the register and the value of the counter over the second bus, and then updating the content of the register and the value of the counter, (q) a step of, in one of the memory modules, placing the content of said register and the value of said counter as the element and count of said elements, respectively, in the array.

In addition, step (n) may further comprise:

(n1) a step of providing a value counter that stores non-redundant sequence numbers for elements subject to processing, and said step (p) preferably comprises:

(p1) a step of comparing the received element and the content of the register, and if these are identical, assigning the value of the value-number counter as the sequence number of said element subject to processing, but if they are not identical, incrementing the value-number counter, and assigning the value of the incremented value-number counter as the sequence number of said element subject to processing.

In addition, in another embodiment of the present invention, a method of joining arrays achieves the joining of a plurality of arrays using the aforementioned sorting method and the aforementioned compiling method, wherein said joining method comprises:

(r) a step of merging a plurality of arrays and executing the processing of said sorting method by assigning sequence numbers to each of the elements in these arrays, and (s) a step of executing the processing of said compiling method according to the elements within said merged array and their sequence numbers, thereby generating a new array with no redundant elements present.

To wit, by performing the sorting and compiling according to the present invention in the state in which the desired arrays are merged, it is possible to obtain a joined array with redundancy of elements eliminated.

In an even further embodiment, a method of joining arrays achieves the joining of a plurality of arrays using the aforementioned sorting method and the aforementioned compiling method using a distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, wherein said memory modules each comprises a pointer array in which pointer values indicating a value list are placed at positions corresponding to the record number in order to specify stipulated elements in the value list which is an array that stores elements based on the record number, and said method of joining comprises:

(r1) a step of merging a plurality of value lists and executing the processing of said sorting method by assigning sequence numbers to each of the elements in these arrays, and (t) a step of executing the processing of said compiling method according to the elements within said merged value list and their sequence numbers, thereby generating a new array with no redundant elements present and also updating the sequence numbers of said elements to the sequence numbers of said elements in the case that no redundant elements are present, and (u) a step of setting said array consisting of sequence numbers of elements in the case in which no redundant elements are present as a new pointer array for indicating the new value list.

BRIEF EXPLANATION OF THE DRAWINGS

This and other objects of the present invention will be made clear in reference to the appended drawings and embodiments. Here:

FIG. 2 is a schematic block diagram showing a memory module according to this embodiment.

FIG. 3 is a diagram used to describe pipeline processing among memory modules according to this embodiment.

FIGS. 4A to 4C are diagrams used to describe the structure of memory module 14 under the multi-space memory according to this embodiment.

FIGS. 5A to 5C are diagrams used to describe access to memory modules according to this embodiment.

FIGS. 6A to 6C are diagrams showing one example of an array on which the sorting according to Embodiment 1 is performed.

FIGS. 10A to 10D are diagrams showing the numbering of elements within an array in the sorting according to Embodiment 1.

FIGS. 11A to 11D are diagrams showing the sequence numbering of elements within an array in the sorting according to Embodiment 1.

FIGS. 12A to 12C are diagrams showing the numbering of elements within an array in the sorting according to Embodiment 1.

FIGS. 14A and 14B are block diagrams showing examples of connections among two memory module groups pertaining to the memory modules shown in FIG. 8.

FIG. 21 is a diagram showing an example of the connection of memory modules in the case of generating a new array according to the sequence numbers obtained as a result of the sorting according to Embodiment 1.

FIG. 22 is a diagram showing another example of the connection of memory modules in the case of generating a new array according to the sequence numbers obtained as a result of the sorting according to Embodiment 1.

FIG. 25 is a diagram used to describe the process of calculating the redundancy in memory module groups according to Embodiment 2.

FIG. 26 is a flowchart showing the process of calculating the redundancy in memory module groups according to Embodiment 2.

FIGS. 28A and 28B are diagrams used to describe the process of calculating the redundancy in memory module groups according to Embodiment 2.

FIGS. 29A and 29B are diagrams used to describe the process of calculating the redundancy in memory module groups according to Embodiment 2.

FIGS. 30A and 30B are diagrams used to describe the process of calculating the redundancy in memory module groups according to Embodiment 2.

FIGS. 34A and 34B are diagrams used to describe compiling in the memory module group according to Embodiment 3 of the present invention.

FIGS. 35A and 35B are diagrams used to describe compiling in the memory module group according to Embodiment 3 of the present invention.

FIGS. 36A and 36B are diagrams used to describe compiling in the memory module group according to Embodiment 3 of the present invention.

FIGS. 37A and 37B are diagrams used to describe compiling in the memory module group according to Embodiment 3 of the present invention.

FIGS. 41A and 41B are diagrams used to describe joining in the memory module group according to Embodiment 4 of the present invention.

FIGS. 42A to 42C are diagrams used to describe joining in the memory module group according to Embodiment 4 of the present invention.

FIGS. 43A and 43B are diagrams used to describe joining in the memory module group according to Embodiment 4 of the present invention.

FIGS. 44A and 44B are diagrams used to describe joining in the memory module group according to Embodiment 4 of the present invention.

FIG. 45 is a schematic diagram showing the connection of memory module groups in another practical example of the present invention.

DESCRIPTION OF THE PREFERRED EMBODIMENT

[Hardware Configuration]

Figure 1:
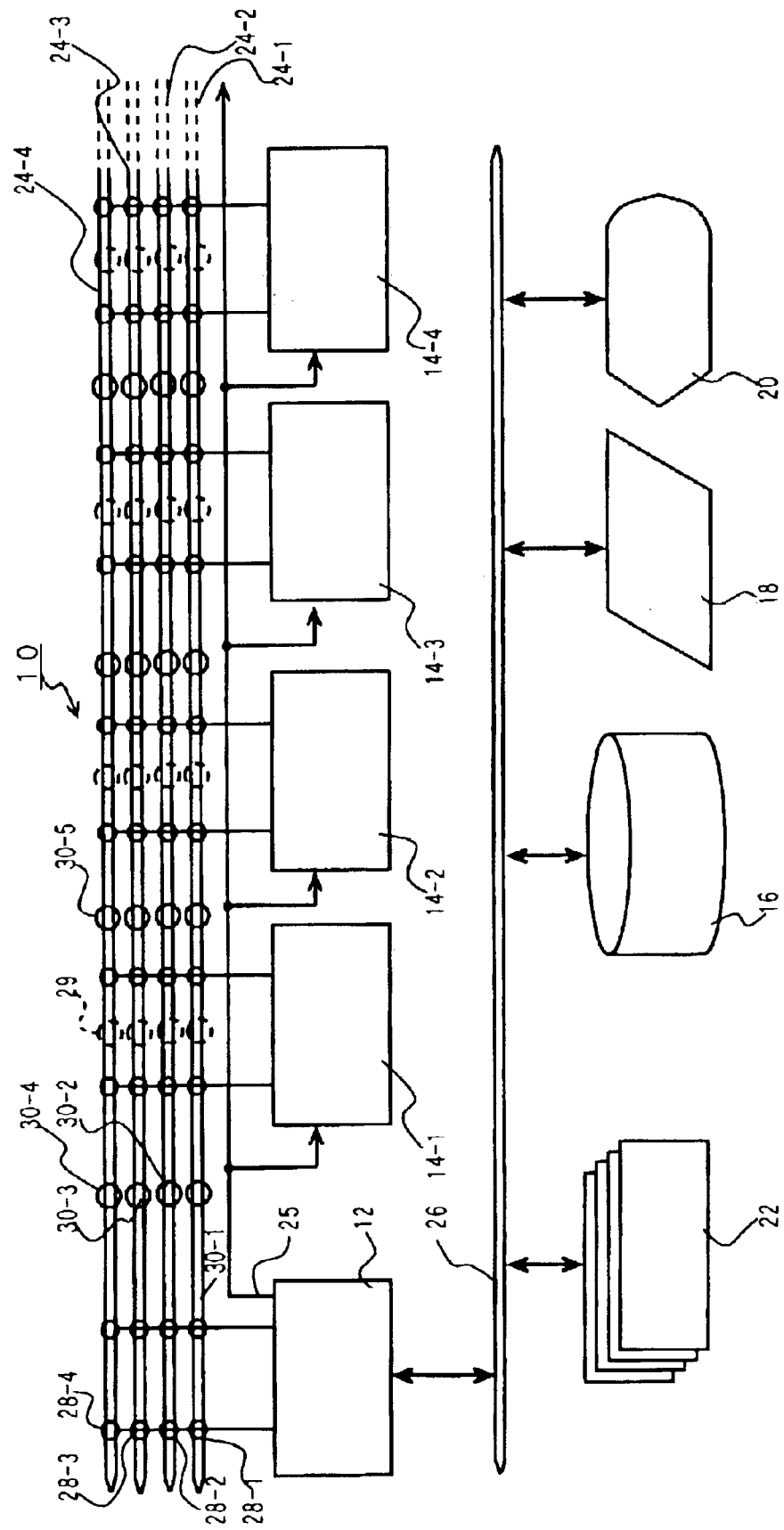
FIG. 1 is a block diagram showing the configuration of a computer system according to an embodiment of the present invention.

Here follows a description of the embodiments of the present invention made with reference to the appended drawings. FIG. 1 is a block diagram showing the configuration of a computer system according to an embodiment of the present invention. As shown in FIG. 1, a computer system 10 comprises a CPU module 12 that performs parallel operations based on a single instruction, memory modules 14-1, 14-2 and 14-3 that store various types of data required for parallel operations, a hard disk drive 16 that stores required programs and data, a keyboard, mouse or other input device 18, display 20 consisting of a CRT or the like and legacy memory 22 that stores data and the like in various formats. In addition, on buses 24-1, 24-2, ..., switches 28-1, 28-2, 28-3, ... and the like are placed at points of contact with the various memory modules 14, so the selected circuit elements are able to exchange information. In addition, switches 30-1, 30-2, ... are provided between the CPU module 12 and memory module 14-1 to make bus links and connections among adjacent memory modules. In addition, a switch (see symbol 29) may also be provided between the point of contact from memory module input terminal to bus and point of contact from memory module output terminal to bus. In FIG. 1, the aforementioned switches are indicated by the broken circles.

Moreover, the memory modules 14 are preferably provided not only with a single input terminal and single output terminal, but also one or more other terminals (I/O terminals, etc.). For example, in Embodiments 2 or 3 to be presented later, processing is implemented using I/O from three or more terminals.

A plurality of buses 24-1, 24-2, 24-3, 24-4, ... is provided between the CPU module 12 and the memory modules 14. Accordingly, data and the like can be exchanged among the memory modules by means of the aforementioned buses. In addition, a signal control line 25 is provided between the CPU 12 and the memory modules 14, so that instructions issued by the CPU 12 are transmitted to all of the memory modules 14.

Moreover, a local bus 26 is provided between the CPU 12 and various other constituent elements (e.g., the hard disk drive 16, input device 18, etc.), so data and the like can also be exchanged among them also. The CPU 12 reads a program stored on the hard disk drive 16 or RAM or other storage devices (not shown) connected to the local bus 26, and follows this program to execute the sending of instructions to the memory modules 14 and other exchanges of data, along with control of the switches 28, 30 and the like. In addition, in accordance with the program, the CPU 12 accepts data in various formats stored in legacy memory 22, converts this formatted data to a series of data (array) that can be processed by the system consisting of the CPU 12, memory modules 14 and bus 24, and stores this in the various memory modules 14.

FIG. 2 is a schematic block diagram showing a memory module 14 according to this embodiment. As shown in FIG. 2, the memory module 14 consists of a clock buffer 32 that accepts clock and other synchronization signals given by the CPU module 12, a RAM core 34 that stores data, a processor (MPU) 36 that recognizes the space ID and element numbers of data (to be described later), and upon accepting an instruction or the like from the CPU 12, writes data to the RAM core 34 or reads data from the RAM core based on the space ID and element number, and an I/O unit 38 that receives data from one of the buses and supplies it to the RAM core 34, and/or sends data from the RAM core 34 and sends it out on one of the buses. In this embodiment, the memory module 14 is able to receive instructions from the CPU via the signal control line 25, respond to these instructions and perform the reading of data from the RAM core 34, writing of data to the RAM core 34 or perform other stipulated processing on data. In addition, data access to the RAM core 34, and data input and data output via the I/O unit are executed based on a clock or other synchronization signal given by the clock buffer 32. The processor (MPU) 36 of the aforementioned memory modules 14 preferably consist of a plurality of processing units and can execute a plurality of processes in parallel.

As is clear from FIG. 1 and FIG. 2, in the present invention, the computer system 10 may be thought of as a shared memory type system. In addition, as described later, processing is executed in parallel by the various memory modules 14 by giving instructions to the memory modules 14 via the signal control line 25. In addition, data output to the bus and data input from the bus and the like are executed based on stipulated synchronization signals. Accordingly, this computer system 10 may be considered to take the form of a SIMD system.

The computer system 10 having such a configuration is fundamentally provided with the multi-space memory, memory modules and reconfigurable bus recited in Japanese Patent Application No. H11-263793. Here follows a brief description of these.

(1) Multi-Space Memory

In this Specification, a "multi-space memory" refers to a memory wherein the memory space is allocated such that it is accessed based on a space ID and address. Thereby, even when a series of data is divided among many processors, each processor is able to separate and recognize it reliably.

In the conventional memory space, even if separate regions are allocated for each process, the allocation of memory space was not performed for each series of variables (arrays, structures, etc.). Accordingly, such a conventional memory space is described in the following as a "single memory space." In a system with a single memory space, data access is performed using only the address, so it was not possible to separate or recognize a series of associated data. For this reason, even if parallel processing is actually possible, there are many cases in which this cannot be determined. In addition, when a new series of data is stored in a certain single memory space, it was necessary to perform garbage collection in order to secure a place to store the series of data in question.

In contrast, in the present invention, a space ID is introduced into the memory space, thereby applying the same ID to a series of data. In addition, each of the memory modules 14 recognizes the space ID for the data kept in its own RAM core 34, and thereby each memory module 14 is able to determine whether or not it needs to operate by looking up the space ID of the data currently being accessed. In addition, because each memory module 14 can keep all or some of a series of data associated with a space ID, it is possible to store a certain series of data divided among a plurality of memory modules 14, and thereby garbage collection becomes unnecessary.

(2) Memory Modules

In addition, in the present invention, each of the memory modules 14 has a processor 36 that recognizes the individual element numbers of the series of data that it keeps itself.

Accordingly, upon accepting an instruction from the CPU 12, the processor 36 is able to determine whether the data to be accessed according to the instruction is kept within its own RAM core 34 or not and thereby determine whether access is necessary or not. Moreover, each of the memory modules 14 is able to determine from the range of subscripts in the array elements stored in its own RAM core 34 the range of the burden of implicit processing in instruct ions under SIMD.

The memory modules 14 are able to reorder the storage order of elements to be processed according to an instruction from the CPU 12, and sort the elements stored within its own RAM core 34.

(3) Reconfigurable Bus

With the present invention, the CPU 12 is able to selectively turn on/off switches 28-1, 28-2, ... and switches 30-1, 30-2, ..., and thus specify the memory module 14 with which data is to be exchanged, thereby achieving pipeline processing. For example, as shown in FIG. 3, if data output from a certain memory module 14-$i$ is to be given to another memory module 14-$j$, and data output from this other memory module 14-$j$ is to be transmitted to yet another memory module 14-$k$, then the CPU 12 sets the states of the various switches so that bus 24-$m$ is allocated to memory modules 14-$i$ and 14-$j$ and bus 24-$n$ is allocated to memory modules 14-$j$ and 14-$k$.

Moreover, this pipeline processing can be achieved not only in the case of connections among single memory modules, but it can also be achieved by connections among a plurality of series of memory modules (memory module groups). Depending on the processing to be achieved, the various memory modules can be reconnected so that it is possible to perform one-directional continuous transmission of stipulated types of data in a stipulated order on each connection route, thereby scheduling communication so that nearly 100% of the capacity of the bus can be used. Thereby, the poor performance of interprocessor communication which is the greatest problem of distributed memory type parallel processing systems can be solved.

[Multi-Space Memory]

We shall now give a more detailed description of the memory management of various memory modules and memory access according to instructions in a computer system according to the present invention that uses a multi-space memory.

FIGS. 4A to 4C are diagrams used to describe the structure of a memory module 14 under a multi-space memory. As shown in FIG. 4A, a space ID control table is provided in the RAM core 34 within the memory module 14. Thereby, the processor 36 of the memory module 14 can determine the space ID of the data kept by itself and other necessary information.

As shown in FIG. 4B, the space ID control table contains, for each group of data it keeps, the space ID, the logical start address under CPU control, the size of the region allocated to the data group, the physical start address within RAM core 34, the total size of the series of data having the space ID in question, and access control flags that control access. The access control flags can be set to one of the three states of read only (R), write only (W) or read/write enabled (RW).

When given a data group having a certain space ID, the processor 36 of the memory module 14 finds one or more regions in the RAM core 34 where the data group in question is to be stored and stores the data group in said regions as is or divided into two or more parts. At this time, the logical start address within the RAM core where the data is actually stored and the allocated region size are stored in the space ID control table together with the given space ID, logical start address, total size and access control flags. FIG. 4C is a diagram showing the data stored within the RAM core 34 according to the space ID control table of FIG. 4B.

[Brief Discussion of Memory Access]

Here follows a description of accessing a memory module 14 having such a constitution. As shown in FIGS. 5A to 5C, the CPU 12 first transmits the space ID, logical address and required instruction (e.g., read or write data) to all memory modules 14 via the signal control line 25. In response, each of the memory modules 14 uses the space comparator 52 provided in the processor 36 to compare the space ID against the space ID's kept in its own space ID control table, and determines if the same one is kept by itself. Also, the address comparator 54 performs the same type of determination regarding the logical address. Next, if the data subject to the instruction is determined to be kept within its own RAM core 34, the processor 36 of the memory module 14 uses an address calculator 56 to look in the space ID control table to calculate the physical address within RAM core 34 and identify the data subject to processing.

Once the data is identified in this manner, the processor 36 executes the processing corresponding to the instruction given by the CPU 12 (e.g., read or write data), and if necessary, transmits the data to the CPU 12 (see FIG. 5C).

[Sorting (Embodiment 1)]

Here follows a description of sorting by means of a computer system 10 having such a configuration. Note that in the following description, each memory module is a memory module equipped with a processor and is thus referred to as a Processor Memory Module (PMM).

For ease in understanding, consider a case such as that shown in FIGS. 6A to 6C, wherein each of four PMMs holds two elements (surnames). As shown in FIG. 6A, a certain PMM (the first PMM 14-1) holds the surname "Smith" with an element subscript (record number) of "0" and the surname "Carter" with a subscript of "1." The second PMM 14-2 holds the surname "Clinton" with a subscript of "2" and the surname "Johnson" with a subscript of "3." Similarly, the third PMM 14-3 and fourth PMM 14-4 hold surnames corresponding to the subscripts shown in FIG. 6A. The same space ID is applied to the array consisting of these elements, and the processor 36 of each PMM uses its space ID control table to manage the subscripts (record numbers) of the elements managed in its own RAM core 34, along with the physical address where they are actually stored and the like.

Figure 7:
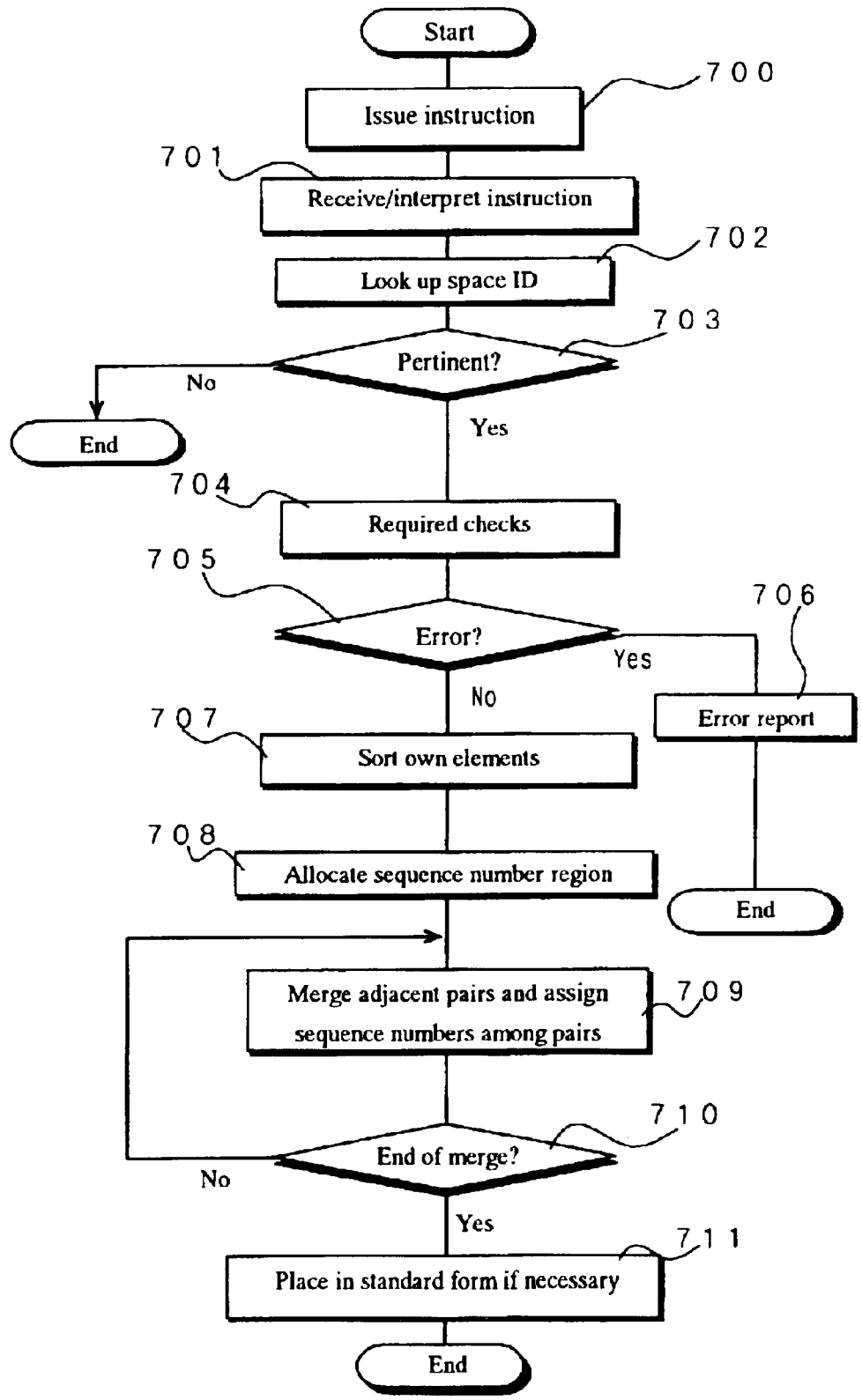
FIG. 7 is a flowchart showing the procedure for sorting according to Embodiment 1.

For example, consider the case wherein an instruction to sort the array having this space ID is given by the CPU 12 to the various PMMs 14-1 through 14-4 via the signal control line 25. FIG. 7 is a flowchart showing the procedure for sorting according to this embodiment. As shown in FIG. 7, when the CPU 12 issues an instruction (e.g., the instruction "sort the elements within an array having a certain space ID") (Step 700), in response to this instruction, in each PMM, the processor 36 of each PM receives the instruction given via the signal control line 25 and interprets its content (Step 701), examines the "space ID" within the instruction (Step 702), and determines whether it pertains to the space ID of data held by its own RAM core 34 (Step 703). If the result of Step 703 is No, then processing ends. On the other hand, if the result is Yes, the processor 36 performs various required checks such as checking that the data group pertaining to the space ID in question is in the write-enabled state (Step 704). If an error results from the checks (a "Yes" result in Step 705), the processor 36 reports the error to the CPU 12 via the signal control line 25. On the other hand, if there is no error, the processor 36 executes the main body of the sorting process described below (Steps 707 and on).

First, each of the PMMs 14-1 through 14-4 executes a sort on its own elements (Step 707). This sort actually accompanies the replacement of elements within the various PMMs. More specifically, the processor 36 uses Quicksort or another known sorting technique to sort the elements held in its own RAM core 34. FIG. 6B is a diagram showing the state in which the elements within the arrays of each PMM sorted. Note that as shown in FIG. 6D, the placement of the subscript (record number) for each element is also changed.

Next, the processor 36 of each memory module 14 allocates a region (sequence number region) for placing the sequence numbers and gives an initial value for each sequence number (Step 708). FIG. 6C is a diagram showing the state of each PMM wherein the initial values of the sequence numbers are given. In this manner, the sequence numbers are assigned among the sorted elements within each module.

Figure 8:
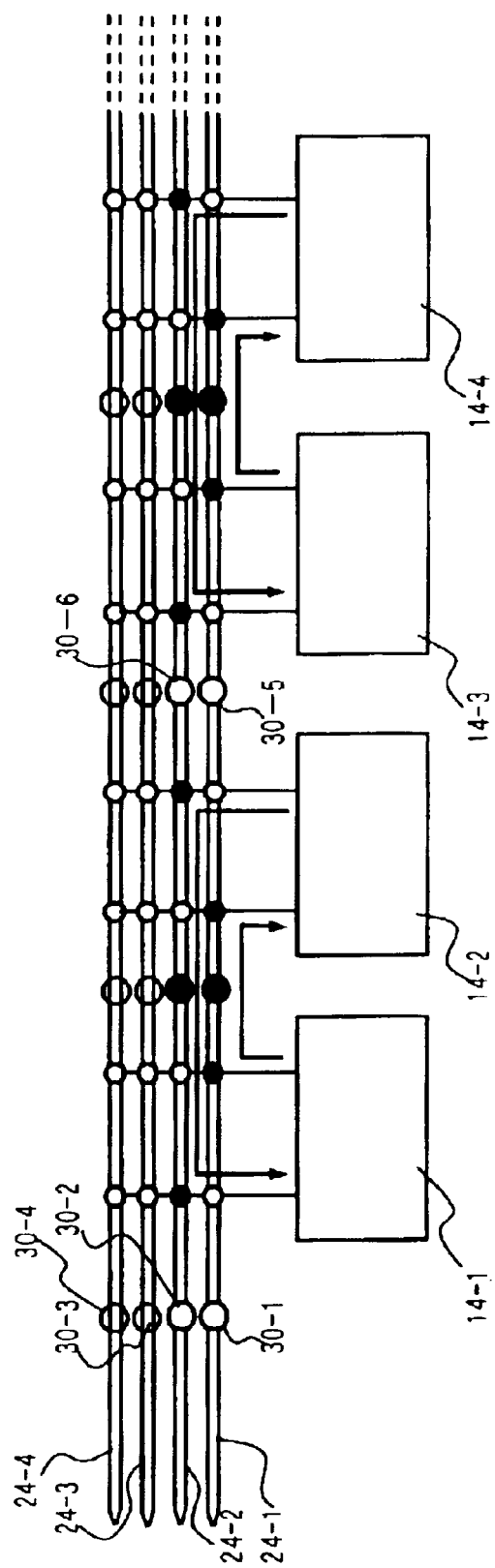
FIG. 8 is a block diagram showing the connections among memory modules at the time of performing sorting according to Embodiment 1.

Next, the merging and assignment of sequence numbers among adjacent pairs is executed (Step 709). In Step 709, the CPU 12 first controls switches 28 and 30 on the bus 24 so that among the PMMs involved in a sort, the input to one side of a certain pair is connected to the output of the other side, and the output to that one side is connected to the input of the other side. The aforementioned pair is preferably two adjacent PMMs or if not adjacent, two PMMs that are at neighboring positions. For example, in FIG. 1, if PMMs 14-1 through 14-4 are involved in a sort, PMMs 14-1 and 14-2 and PMMs 14-3 and 14-4 are preferably taken as pairs. For example, as shown in FIG. 8, the CPU 12 may control the switches 28 so that the output of PMM 14-1 and the input of PMM 14-2 are connected to bus 24-1, the input of PMM 14-1 and the output of PMM 14-2 are connected to bus 24-2, and control the switches 28 so that the output of PMM 14-3 and the input of PMM 14-4 are connected to bus 24-1, the input of PMM 14-3 and the output of PMM 14-4 are connected to bus 24-2. Moreover, the CPU 12 also turns off the switches 30-5 and 30-6 on buses 24-1 and 24-2 placed between PMM 14-2 and PMM 14-3. In FIG. 8, the black circles indicate the state of continuity, while the white circles indicate the state of non-continuity and not being connected to the PMM. In addition, the remaining ones follow the state of the other PMMs (not shown). Note that in the example of FIG. 8, one can understand that the bus can be utilized more effectively by dividing the buses 24-1 and 24-2 by turning switches 30-5 and 30-6 off.

Figure 9:
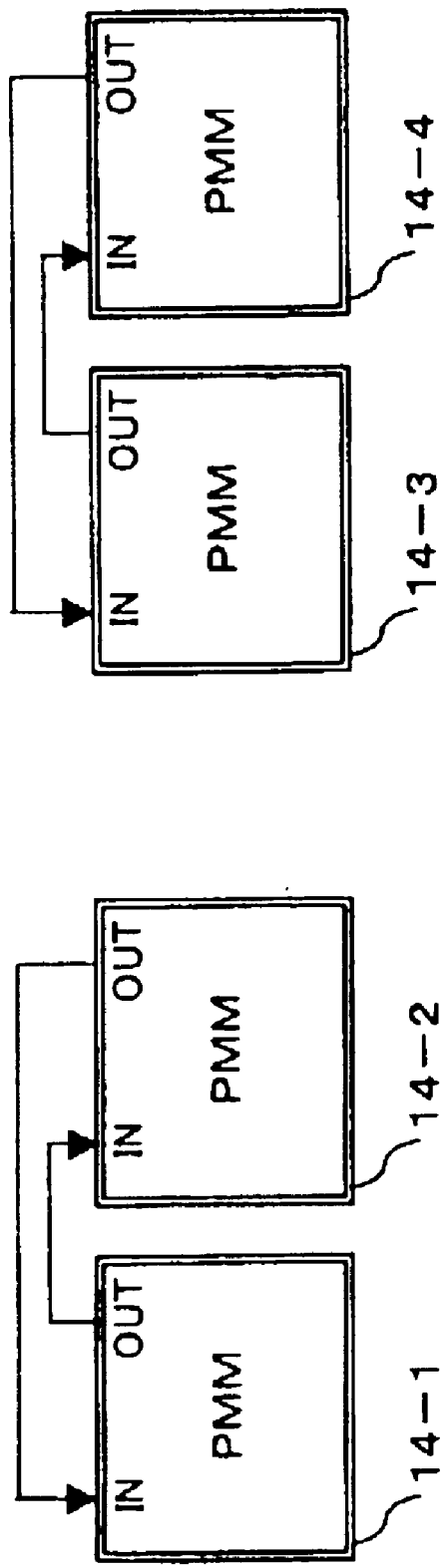
FIG. 9 is a schematic diagram showing the connections among the memory modules shown in FIG. 8.
Figure 13A:
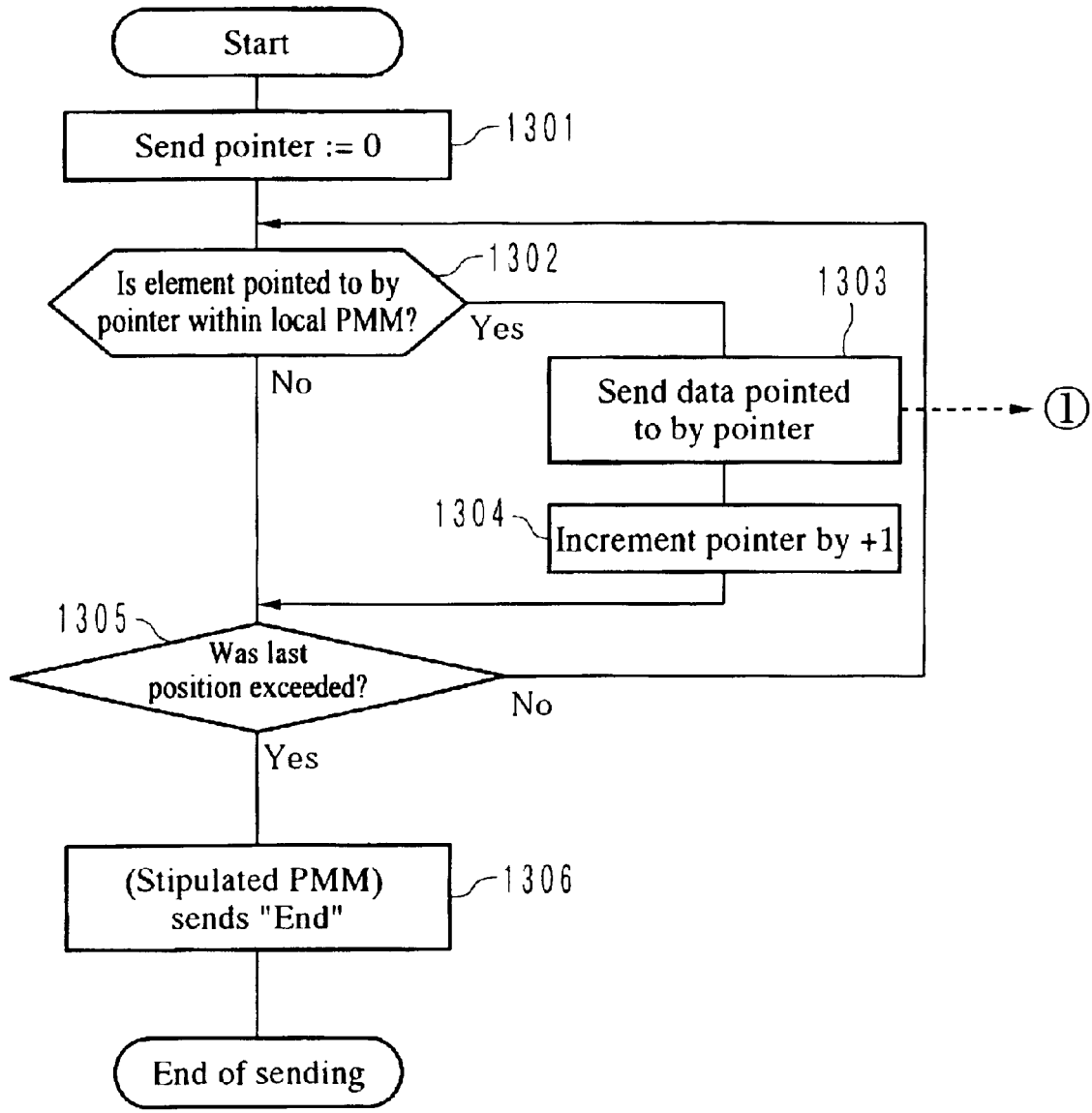
FIGS. 13A to 13C are flowcharts that show the sequential numbering among memory module pairs according to Embodiment 1.
Figure 13B:
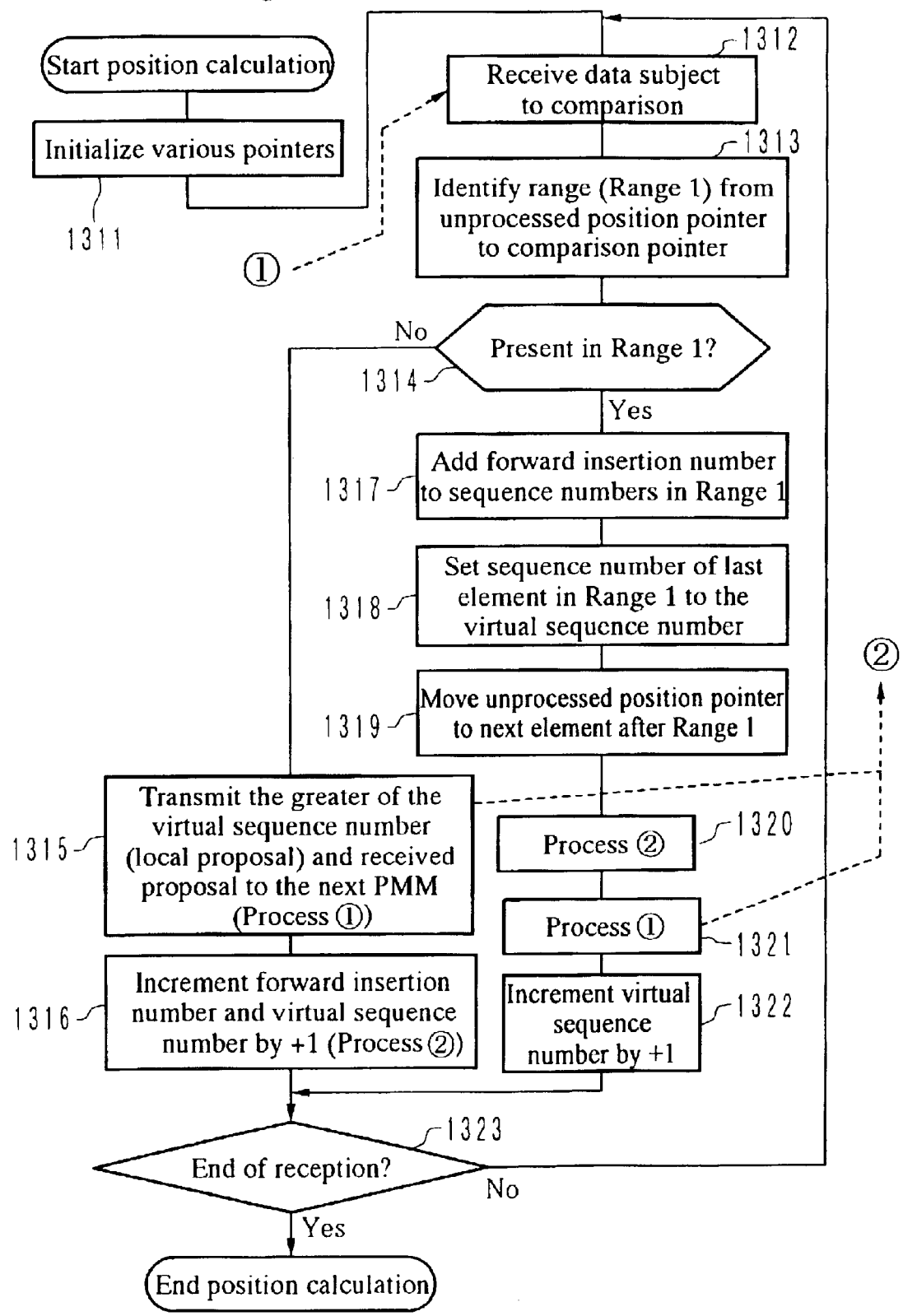
Figure 13C:
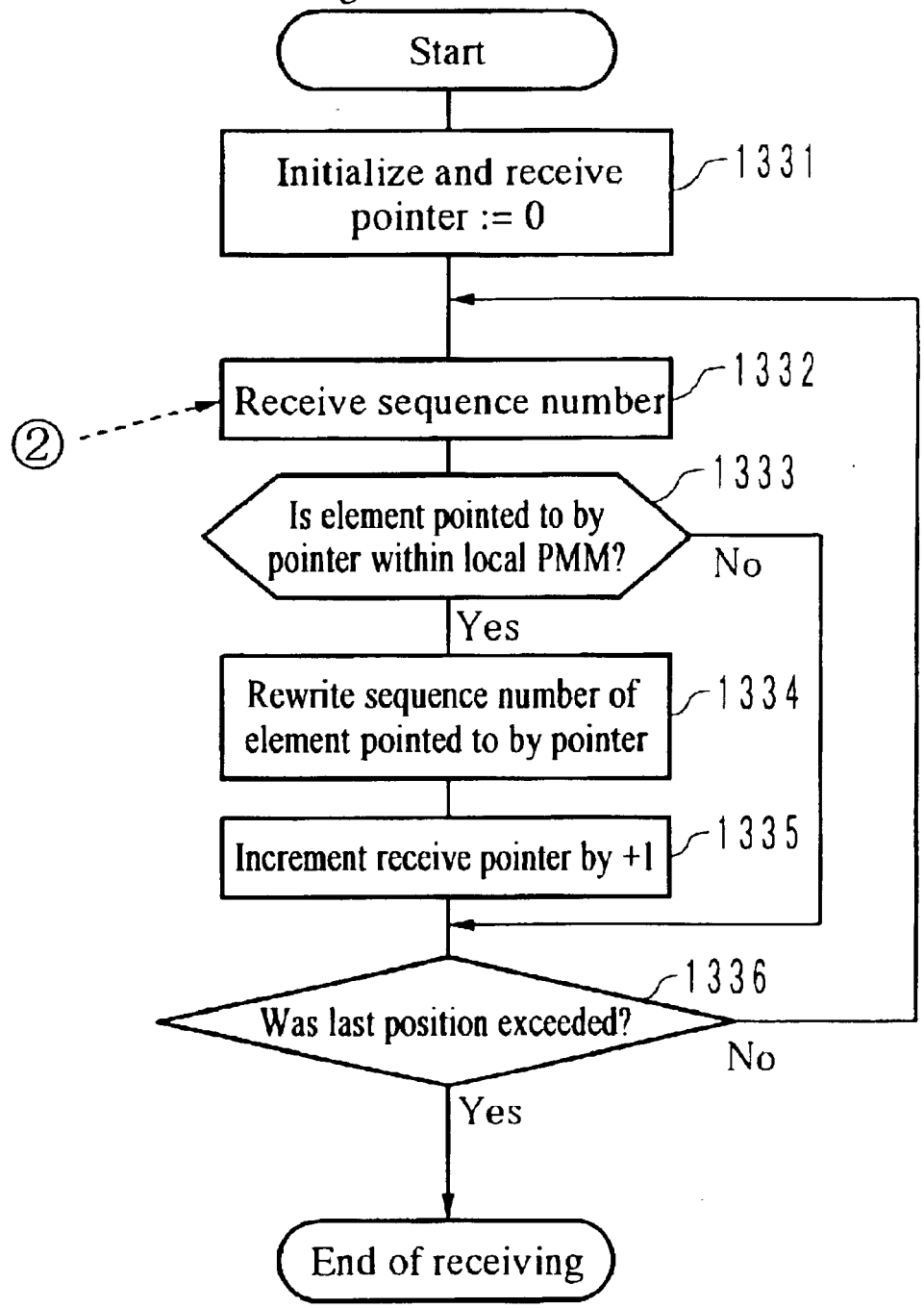

In this manner, as shown schematically in FIG. 9, the connections among PMMs are defined by the CPU 12 and the main body of the sequence number assignment is executed among pairs of PMMs. FIGS. 10 through 12 are diagrams that schematically show the sequential numbering of arrays shown in FIG. 6. FIGS. 13A–13C are flowcharts that show more general sequential numbering among PMM pairs.

FIGS. 10A through 12C illustrate only the processing of PMM 14-1 and PMM 14-2, but the processing of PMM 14-3 and PMM 14-4 are also executed in parallel. Note that in the processing, the one that first gives data to another PMM is called the former PMM and the one that receives it (the other PMM) is called the latter PMM. The former PMM can also be called the presentation PMM because it presents the elements or sequence numbers, and on the other hand, the latter PMM can also be called the determination PMM because it determines the presented sequence numbers. Either one of the pair can be the former PMM. In this example, for convenience, the PMM 14-1 is made the former PMM and PMM 14-2 is made the latter PMM.

First, in the former PMM, a pointer that indicates the processing position (hereinafter referred to as the "PUT pointer") is placed at the initial position (beginning of the sorted array portion or the "$0^{th}$" position). On the other hand, in the latter PMM, as described below, the element received from the former PMM and a pointer that first indicates the position to be compared and the like (hereinafter referred to as the "comparison pointer") are placed at the initial position (beginning of the sorted array portion or the "$0^{th}$" position). (See FIG. 10A and Steps 1301 and 1311 of FIG. 13A and FIG. 13B.) In this embodiment, the comparison pointer used in the latter PMM is a structural array of the form (X, Y, Z). Here, X indicates the starting position to be compared (namely, the starting position of the elements yet to be compared; hereinafter referred to as the "unprocessed position"), Y indicates the total number of elements received from the former PMM (hereinafter referred to as the "forward insertion number" depending on the case) and Z is a proposed sequence number for the element given by the former PMM in a virtual array obtained upon merging the former PMM and latter PMM (called a "virtual sequence number" depending on the case).

Next, the initial data transmission is executed by the processor of the former PMM. In this data transmission, the element at the position indicated by the PUT pointer is transmitted to the latter PMM via the bus (see FIG. 10B and Steps 1303 and 1312). Note that in the branch in Step 1302, the result is always Yes in processing among two PMMs, but this will be described later. In the first data transmission, the element "Carter" is transmitted to the latter PMM. The latter PMM finds the position at which the transmitted element "Carter" is to be inserted in the portion of the array stored in the latter PMM (Step 1313). This need not be the actual insertion of a value, but rather it is sufficient to find the position at which the element is to be inserted. In this embodiment, the elements stored in the array portions are actually placed in the sorted state. Accordingly, the insertion position can be found by means of the bisection method or other high-speed search techniques. By finding the insertion position, it is possible to identify the range of elements whose sequence is not determined that are elements positioned before the insertion position (hereinafter referred to as "Range 1"). Note that in this embodiment, there is a convention that in the case that the element is the same, the sequence of the latter PMM lakes priority. Accordingly, in the event that the element "Carter" transmitted from the former PMM is present in the latter PMM, the sequence when stored in the latter PMM takes precedence (namely, has a smaller sequence number).

In this example, one can see that the element "Carter" transmitted from the former PMM is positioned before the element "Carter" within the portion of the array managed by the latter PMM, and thus one can see that elements belonging to the Range "1" are not present (see FIG. 10C and Yes in Step 1314). Then, the processor of the latter PMM sets the sequence number of the transmitted element "Carter" to "0 (namely the beginning)" and returns it to the former PMM (Step 1315). Next, the processor of the latter PMM increments the forward insertion number to "1" and also increments the virtual sequence number to "1" (Step 1316). This is because, since the number of elements transmitted from the former PMM is increased by one, it is necessary to increment the forward insertion number and the sequence number of the next element must be incremented must be incremented for at least the one given this time (in this case, "0").

When the sequence number (insertion position of the element is given by the latter PMM (Step 1332), the processor of the former PMM stores the sequence number given as the sequence number of the element in question (Step 1334), and then increments the PUT pointer (see FIG. 11A and Step 1335). In this manner, the sequence of elements within the former PMM is determined.

Next, the processor of the former PMM transmits the element "Smith" at the position indicated by the PUT pointer to the latter PMM via a bus (see FIG. 11B and Step 1303). In the same manner as when the element "Carter" was transmitted previously, the latter PMM finds the position where the transmitted element "Smith" is to be inserted (Step 1313). One can see that the element "Smith" is positioned after the element "Monroe" within the portion of the array managed by the latter PMM (see FIG. 11C and Yes in Step 1314). Thereby, in the portion of the array managed by the latter PMM, it is possible to determine the number of the element "Monroe" and the elements positioned before it, and the sequence of the various elements. More specifically, the processor of the latter PMM determines the sequence of the aforementioned elements by the following procedure.

First, the forward insertion number "Y" is added to each of the sequence numbers pertaining to the elements contained within Range "1" (Step 1317). Thereby, the sequence of elements contained within Range "1" is determined. In the aforementioned example, the sequence number of the element "Carter" becomes "0+1=1" and the sequence number of the element "Monroe" becomes "1+1=2." Next, the sequence number of the last element within the elements contained in Range 1 is substituted into the virtual number and also (Step 1318), the unprocessed position is changed to the position of the next element after the last element in Range 1 (Step 1319). In the aforementioned example, the sequence number "2" of the element "Monroe" is given in Z of the comparison pointer (structure array), and the unprocessed position is changed from "0" to "2." Thereby, the structure array becomes (2, 1, 2).

After this process, the forward insertion number "Y" and virtual sequence number "Z" within the structure array are incremented (Step 1320). Thereby, the structure array becomes (2, 2, 3) (see FIG. 11D). The virtual sequence number obtained in Step 1320 becomes the sequence number of the element obtained in Step 1312 (in the aforementioned example, "Smith"), and the processor of the latter PMM transmits the sequence number in question (in the aforementioned example, "3") to the latter PMM (Step 1321). After this process, the virtual sequence number is incremented further (Step 1322). This is because the sequence number of the next element becomes at least one larger than the sequence number given this time.

The former PMM stores the received sequence number as the sequence number of the element in question and increments the PUT pointer. In this manner, the sequence number in the former PMM is determined.

In the event that no unprocessed elements are present in the former PMM (to wit, a sequence number is established for all elements and no element is placed at the position of the PUT pointer), the processor of the former PMM transmits a value that indicates the end to the latter PMM (see Step 1306). Here, the "value that indicates the end" is a value greater than the value that indicates the element at the end of the array. In response to the aforementioned value that indicates the end, the latter PMM executes a process nearly identical to this process (Steps 1312–1322 of FIG. 13B). In the aforementioned example, regardless of the receipt of the value indicating the end, no elements contained in Range "1" are present, so processing reaches Step 1323 via Steps 1315 and 1316 and ends (see FIG. 12B).

In the former PMM, by sending the value that indicates the end (see Step 1316) and by determining the sequence numbers of all elements (Yes in Step 1336), processing ends.

Merging is performed between PMM 14-3 and PMM 14-4 by a procedure similar to the aforementioned process, and thus the sequence numbers of each element are determined as shown in FIG. 12C.

When the sequence numbers of each element are determined in the two PMMs, the CPU 12 changes the positions of the switches to connect two PMM groups each consisting of two PMMs. FIG. 14A and FIG. 14B are diagrams that show one example of the connection of two PMM groups with the PMMs shown in FIG. 8. In FIG. 14A, PMMs 14-1 and 14-2 constitute the first PMM group and PMMs 14-3 and 14-4 constitute the second PMM group. CPU 12 controls the switches 28 and 30 so that the outputs of PMMs 14-1 and 14-2 are connected to the inputs of PMM group 14-3 and the output of PMM 14-3 is connected to the input of PMM 14-4 and the output of PMM 14-4 is connected to the input of PMMs 14-1 and 14-2 (see Step 709 of FIG. 7). Alternately, as shown in FIG. 14B, the switches can be controlled so that the outputs of PMMs 14-1 and 14-2 are connected to PMMs 14-3 and 14-4.

Figure 15A:
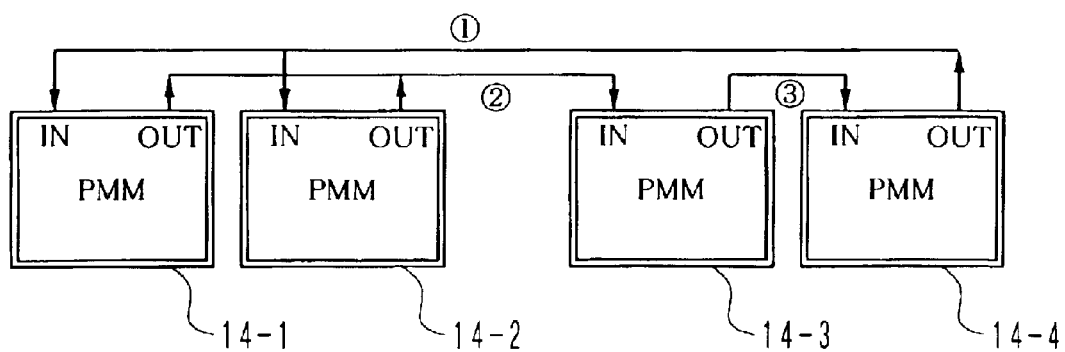
FIGS. 15A and 15B are schematic diagrams showing examples of the connections shown in FIG. 14.
Figure 15B:
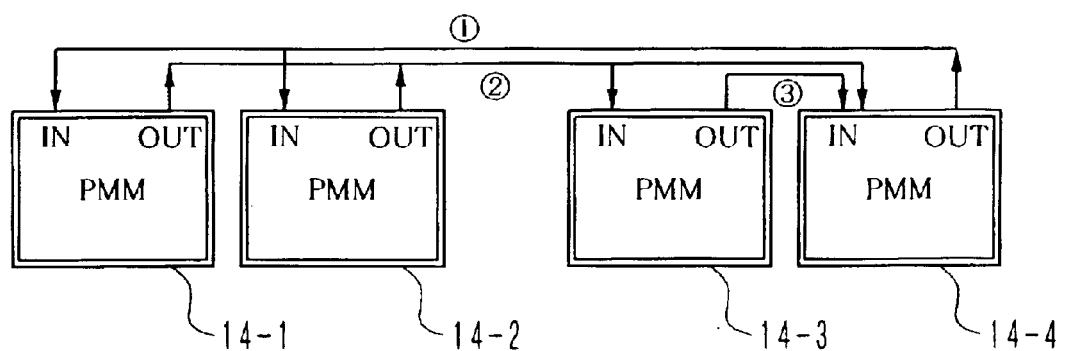

FIGS. 15A and 15B are diagrams that schematically represent FIGS. 14A and 14B, respectively. As will be made clear later, in FIG. 15A, the data given from PMM 14-4 to PMMs 14-1 and 14-2 (symbol (1) in the figure) indicates the sequence number, while the data given from PMMs 14-1 and 14-2 to PMM 14-3 (symbol (2) in the figure) indicates the element, and the data given from PMM 14-3 to PMM 14-4 (symbol (3) in the figure) indicates the element and the virtual sequence number calculated by PMM 14-3. In addition, in FIG. 15B also, the data (1) and (2) exchanged among the PMMs are the same as those in FIG. 15A, and on the other hand, the data transferred from PMM 14-3 to PMM 14-4 (see symbol (3)) indicates the virtual sequence number calculated by PMM 14-3.

Here follows a description of the process of merging two PMM groups and the process of determining the sequence numbers of an array from the portion of the array in two paired PMMs and the sequence numbers of elements contained therein, as shown in the aforementioned FIGS. 12A to 12C (see Step 709 of FIG. 7). Note that in the following description, the processes executed in each PMM are described according to the bus connection state indicated in FIG. 14B and FIG. 15B.

First, in the PMM 14-1 and PMM 14-2 respectively (hereinafter referred to as the "former PMM group"), the PUT pointer is placed at the initial position (Step 1301). Note that in the subsequent process, each of the PMMs that make up the former PMM group moves the PUT pointer according to the sending of elements that itself controls. On the other hand, each of the latter PMMs places the comparison pointer at the initial position at the time of initialization of its structure array (Step 1302). Then, in each of the PMMs that make up the former PMM group, currently, the PMMs that make up the former PMM group determine the sequence number of the element which was sent.

Note that in the flowchart, both the send pointer used when sending and the receive pointer are used as the PUT pointer, but fundamentally, the movement of these send and receive pointers sandwiches the processing time in the latter PMM group, but it is performed with only a slight time difference. For example, as described later, when the send pointer is incremented in a certain PMM (sec Step 1304), the PMM in question increments the receive pointer in the receive process also (see Step 1335).

Figure 16A:
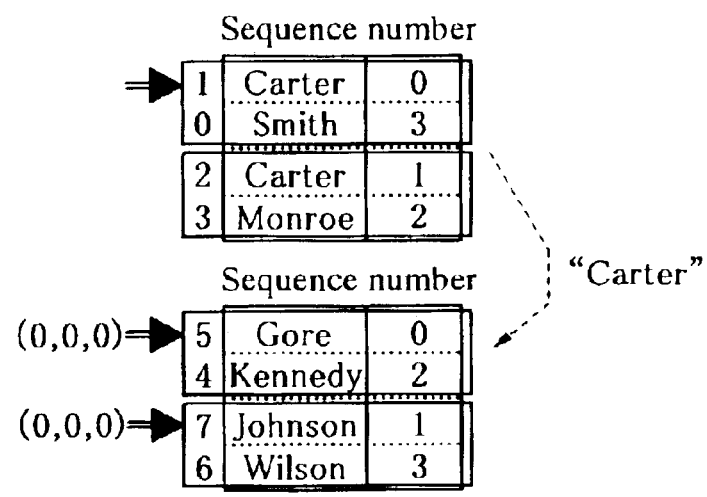
FIGS. 16A and 16B are diagrams showing the sequence numbering of elements within an array in the sorting according to Embodiment 1.

The PMMs that make up the former PMM determine if the element in question is controlled by itself based on the sequence number of the element subject to processing (Step 1302). It the result of this Step 1302 is Yes, the element pointed to by the PUT pointer is transmitted to PMMs 14-3 and 14-4 via bus 24 (see Step 1302 of FIG. 13A and FIG. 16A). In the aforementioned example, the element "Carter" with a sequence number of "0" is transmitted from PMM 14-1 to PMM 14-3 and PMM 14-4. By this process the position of the PUT pointer is moved in PMM 14-1 (Step 1304).

PMM 14-3 and PMM 14-4 each receive elements (Step 1312), find the position at which those elements are to be inserted (Step 1313) and determine whether any elements belonging to Range "1" are present (Step 1314). For the aforementioned element "Carter," the result of Step 1314 is No.

Figure 16B:
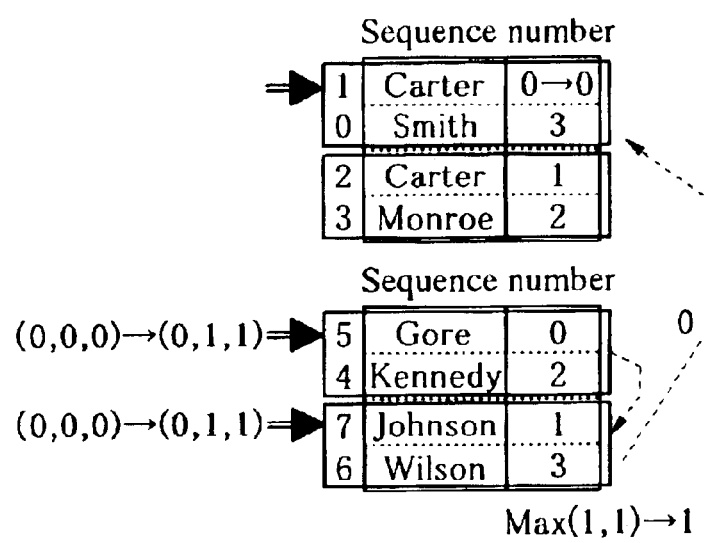

Thereby, in PMM 14-3, the virtual sequence number of the element "Carter" becomes "0" so this value is transmitted to PMM 14-4. The virtual sequence number of the element "Carter" becomes "0" in PMM 14-4 also. Thus, the processor of PMM 14-4 returns "MAX(0, 0)=0" as the sequence number of the element "Carter" to the former PMM group via the bus (see FIG. 16B and Step 1315). Then, in PMMs 14-3 and 14-4, the forward insertion number (Y) and virtual sequence number (Z) within the structure array are each incremented (Step 1316). In the aforementioned example, the structure arrays of each thus become (0, 1, 1), (0, 1, 1).

When a sequence number is given from the latter PMM group (Step 1331), the PMMs that make up the latter PMM group determines whether the element currently being processed (e.g., the element "Carter") is one that it controls itself (Step 1333). In the event that the sequence number of the element "Carter" is transmitted, PMM 14-1 finds that Yes is the result of the aforementioned Step 1333, and replaces the sequence number corresponding to the element at that position with that given by the latter PMM group (see FIG. 16A and Step 1334).

Figure 17A:
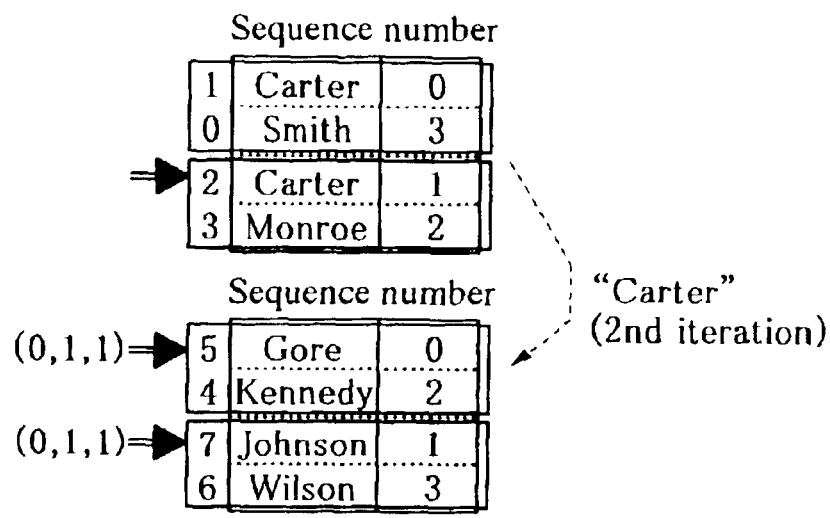
FIGS. 17A and 17B are diagrams showing the sequence numbering of elements within an array in the sorting according to Embodiment 1.
Figure 17B:
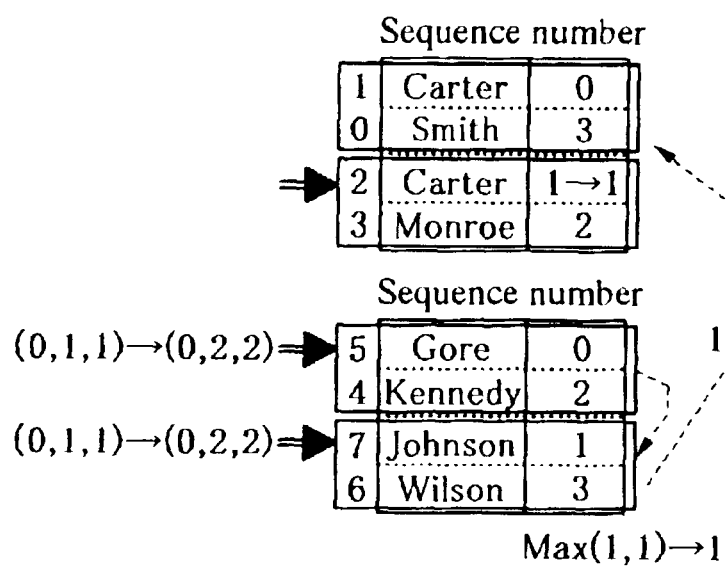

In the same manner, the latter PMM group transmits the element given the next sequence number to the latter PMM. In the aforementioned example, the element "Carter" is transmitted from PMM 14-2 (see FIG. 17A), and those of each of the latter PMM group with a higher virtual sequence number "MAX(1, 1)=1" are transmitted to the former PMM group as the sequence number of the element "Carter" in question (see FIG. 17B). In addition, in the PMMs 14-3 and 14-4 that make up the latter PMM group, the structure arrays become (0, 2, 2) and (0, 2, 2), respectively (see FIG. 17B).

Figure 18A:
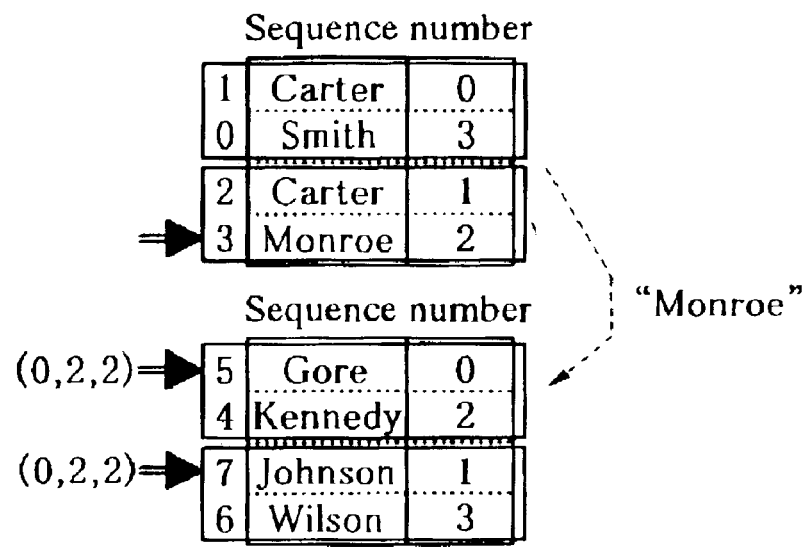
FIGS. 18A and 18B are diagrams showing the sequence numbering of elements within an array in the sorting according to Embodiment 1.
Figure 18B:
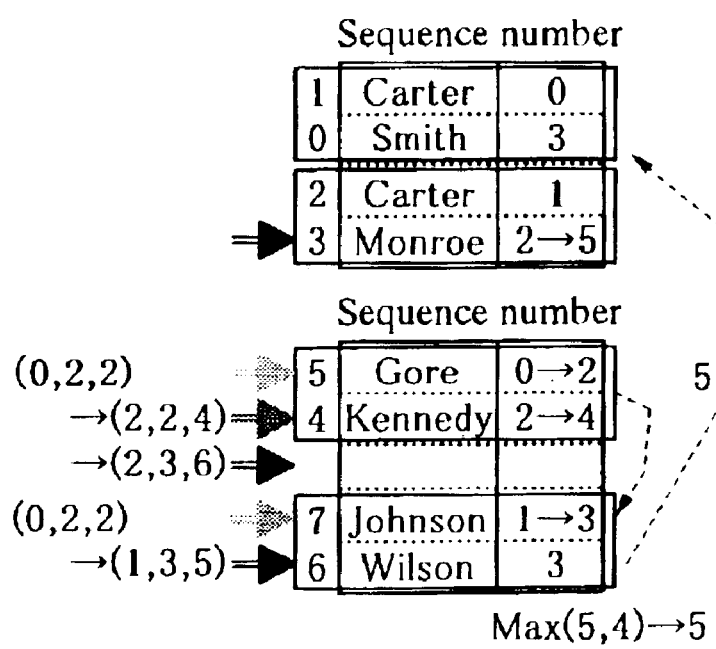

Moreover, the former PMM group transmits the element given the next sequence number to the latter PMM. In the aforementioned example, the element "Monroe" is transmitted from PMM 14-2 (see FIG. 18A). In PMM 14-3, the element "Monroe" is determined to be behind the element "Kennedy" controlled by the PMM 14-3 in question (see Step 1313). Accordingly, in PMM 14-3, since the element "Gore" and the element "Kennedy" belong to the Range "1," the forward insertion number "Y (=2)" is added to the sequence numbers of the element "Gore" and the element "Kennedy," respectively. Thereby, the sequence number of the element "Gore" is determined to be "0+2=2" and the sequence number of the element "Kennedy" is determined to be "2+2=4" (see Step 1317). Then, the processor of PMM 14-3 sets the virtual sequence number Z of the structure array (current value is (0, 2, 2)) to the sequence number "4" of the end element within the Range "1" (see Step 1318) and advances the unprocessed position (namely, changes the value of X from "0" to "2") (see Step 1319). Furthermore, the processor of PMM 14-3 increments the forward insertion number "Y" and virtual sequence number "Z" of the structure array (current value is (2, 2, 4)) (see Step 1321). Thereby, the structure array becomes (2, 3, 5). The virtual sequence number "Z (=5)" in PMM 14-3 is transmitted to PMM 14-4 via the bus. Thereafter, the processor of PMM 14-3 increments the virtual sequence number "Z" of the structure array (sec Step 1322). In the aforementioned example, the structure array becomes (2, 3, 6) by performing Step 1322.

On the other hand, in PMM 14-4, the element "Monroe" is determined to be positioned between the elements "Johnson" and "Wilson" that the PMM 14-4 in question controls (see Step 1313). Accordingly, in PMM 14-4, the element "Johnson" belongs to the Range "1" so the forward insertion number "Y (=2)" is added to the sequence number of the element "Johnson" and thus the sequence number of the element "Johnson" is determined to be "1+2=3" (see Step 1317). Then, the processor of PMM 14-4 sets the virtual sequence number "Z" of the structure array (current value is (0, 2, 2)) to the sequence number "3" of the end element within the Range "1" (see Step 1318) and advances the unprocessed position (namely, changes the value of "X" from "0" to "1") (see Step 1319). Furthermore, the processor of PMM 14-4 increments the forward insertion number "Y" and virtual sequence number "Z" of the structure array (current value is (1, 2, 3)) (see Step 1321). Thereby, the structure array becomes (1, 3, 4).

Thereafter, PMM 14-4 compares the virtual sequence number "Z (=5)" given from the PMM 14-3 against the virtual sequence number "Z (=4)" calculated by itself, finds the larger value "MAX(5, 4)=5" and transmits this to the former PMM group as the sequence of the transmitted element "Monroe." Thereby, in the former PMM group (more specifically, in the PMM 14-4 that had sent the element "Monroe"), the sequence number of the element in question is determined to be "5." Note that in PMM 14-4 also, after Step 1321, the virtual sequence number "Z" within the structure array is incremented (see Step 1322). In the aforementioned example, the structure array becomes (1, 3, 5).

Figure 19A:
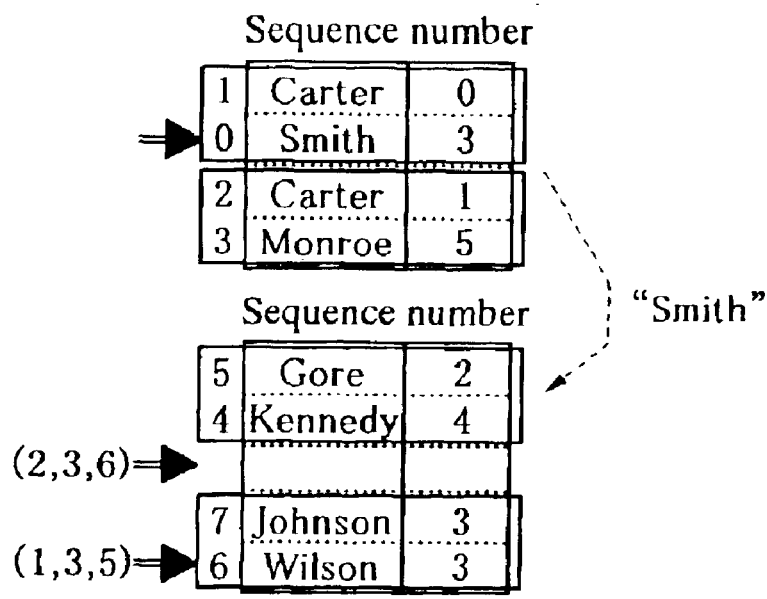
FIGS. 19A and 19B are diagrams showing the sequence numbering of elements within an array in the sorting according to Embodiment 1.
Figure 19B:
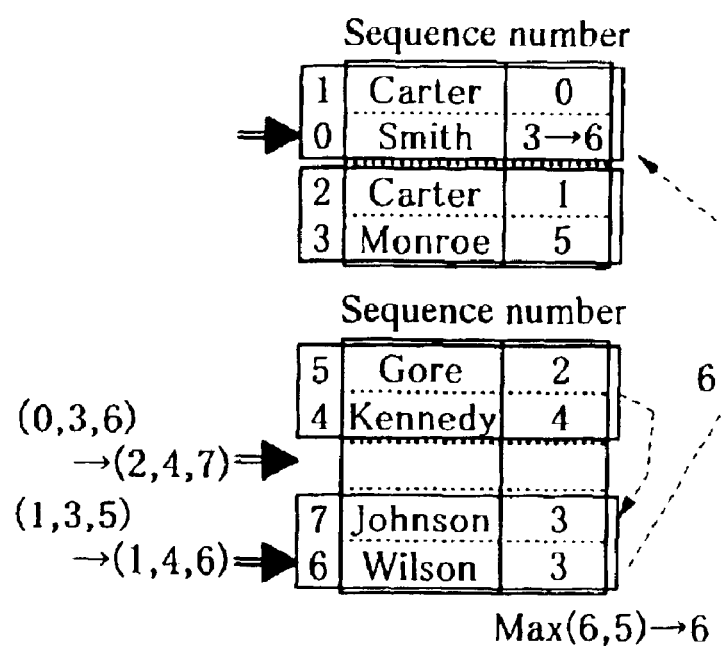

The element "Smith" is sent from the former PMM group in the same manner (FIG. 19A), but the process in this case is also executed according to FIGS. 13A–13C. To describe this again briefly, the PMM 14-3 that received the element "Smith" has no element belonging to the Range "1" present ahead of the insertion position of the element "Smith" so PMM 14-3 transmits the virtual sequence number "Z (=6)" within its structure array to PMM 14-4. The PMM 14-4 also has no element belonging to the Range "1" present ahead of the insertion position of the element "Smith" so it compares the virtual sequence number "Z (=5)" within its structure array against the virtual sequence number "Z (=6)" thus transmitted, finds the larger value (MAX(6, 5)=6) and transmits this to the former PMM group as the sequence of the element "Smith" (see FIG. 19B and Step 1315). In the former PMM, the PMM 14-1 that sent the element "Smith" rewrites the sequence number corresponding to the element "Smith" with the received sequence number (=6). Note that in PMM 14-3, by passing through Step 1316, its structure array becomes (2, 4, 7) and on the other hand in PMM 14-4, by passing through Step 1316, its structure array becomes (1, 4, 6).

In this manner, when the sending of all elements in the former PMM group ends, one of the PMMs that make up the former PMM group transmits a value indicating the end to the latter PMM group (see Step 1306). Each of the PMMs that make up the latter PMM group receives this and executes the processing of Steps 1312 through 1323. In the aforementioned example, the element "Wilson" for which a sequence is not determined is present in PMM 14-4. For this reason, in PMM 14-4 when the result of Step 1314 is Yes, the forward insertion number "Y" is added to the sequence number of the element "Wilson" belonging to Range "1" to give "3+4=7" and the number "7" thus obtained is set as the sequence number of the element "Wilson." After passing through this process, each of the PMMs that make up the latter PMM group obtain the result Yes in Step 1323, and the process ends in the latter PMM group also.

Figure 20:
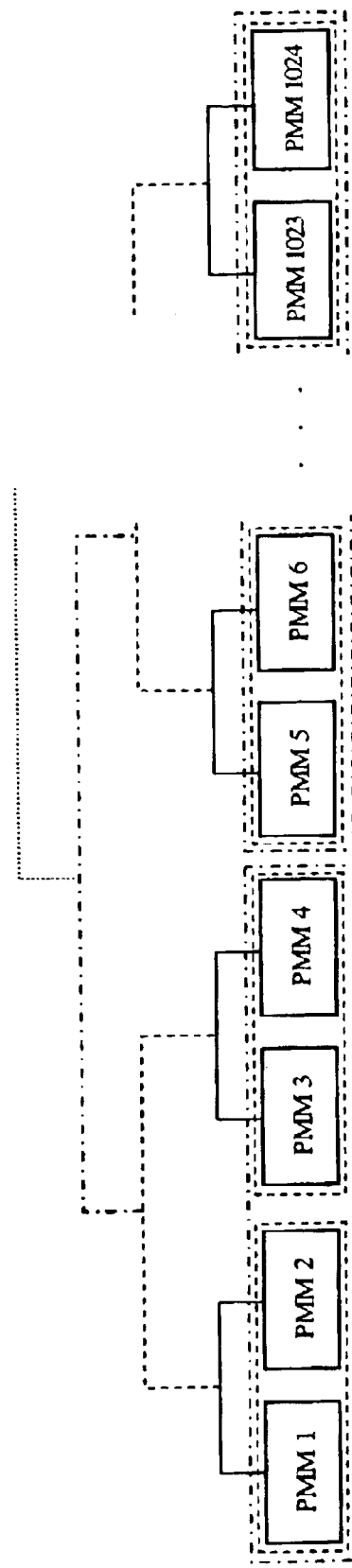
FIG. 20 is a diagram used to describe the combination of memory modules in the sorting according to Embodiment 1.

In the aforementioned example, the elements within the array are stored in four PMMs, but even in the event in which elements are stored within arrays in a larger number of PMMs, it is sufficient to prepare additional pairs of PMM groups each consisting of four PMMs and execute a similar process among these pairs. Consider the case such as that shown in FIG. 20, for example, wherein the elements within a certain array are stored within 1024 PMMs. In this case, first PMM 1 and PMM 2, PMM 3 and PMM 4, PMM 5 and PMM 6, . . . , PMM 1023 and PMM 1024 are linked to each other (see the solid lines among PMMs), and the sequence numbers of elements are determined among these two PMMs, and then a pair of PMM groups consisting of PMM 1 and PMM 2 taken as the former PMM group and PMM 3 and PMM 4 taken as the latter PMM group, a pair of PMM groups consisting of PMM 5 and PMM 6 taken as the former PMM group and PMM 7 and PMM 8 (not shown) taken as the latter PMM group, . . . , and a pair of PMM groups consisting of PMM 1021 and PMM 1022 (not shown) taken as the former PMM group and PMM 1023 and PMM 1024 taken as the latter PMM group are formed and the pairs are linked to each other (see the broken lines), and the sequence numbers of elements are determined among the PMM groups that make up these pairs. Thereafter, pairs of PMM groups consisting of four PMMs as the former PMM group and the subsequent four PMMs as the latter PMM group are formed (sec the dashed-dotted lines), and then pairs of PMM groups consisting of eight PMMs as the former PMM group and the subsequent eight PMMs as the latter PMM group are formed (sec the dotted lines) are formed, and in this manner, pairs of PMM groups each consisting of $2^n$ PMM groups are sequentially formed, and then the sequence numbers of elements are determined among them. Ultimately, the sequence numbers of all elements within the 1024 PMMs can be determined by determining the sequence numbers of elements within a pair of PMM groups consisting of a former PMM group of 512 PMMs and a latter PMM group of 512 PMMs.

In this manner, by forming pairs of PMM groups each consisting of $2^n$ PMMs and sequentially determining the sequence numbers of elements stored in each PMM of the PMM groups that make up the pairs (see Steps 709 and 710 of FIG. 7), ultimately the sequence numbers of all elements are determined (Yes results in Step 710), and then, if necessary, the process of reforming the arrays according to the aforementioned sequential numbering is executed (Step 711). This process is not mandatory, but by generating an array wherein the elements are placed according to the sequence number, information processing to be executed later can be implemented at high speed.

More specifically, the CPU 12 controls the switches 28 and 30 so that the inputs and outputs of each PMM are connected by a certain bus. FIG. 21 is a schematic diagram showing the case of connections among four PMMs. Next, the processors of PMMs 14-1 through 14-4 release the elements and sequence numbers upon the bus according to the sequence numbers determined. Each processor monitors the elements and their sequence numbers released upon the bus, gets elements that have the same sequence number as the element subscripts (record numbers) that had originally been managed by its own RAM core, and stores them in the appropriate regions of the RAM core. For example, it is sufficient for the PMM that had originally stored the elements with subscripts (record numbers) "0" and "1" in its own RAM core (e.g., see PMM 14-1 of FIG. 10) to get the elements marked with the sequence numbers "0" and "1" and store them. By doing so, it is possible for each PMM to manage the array actually sorted. Note that in this manner, the processor of the PMM creates the space ID control table at the time of creating a sorted array also.

Alternately, as shown in FIG. 22, it is sufficient to provide other PMMs (PMM 14-5 through PMM 14-8) to manage the sorted array, so that each of the other PMMs monitors the sequentially output elements and their sequence numbers, gets the elements to be stored by itself according to the sequence numbers and stores them in the RAM core of each PMM.

For example, consider the case of using the aforementioned present invention to provide 1024 PMMs, store approximately 1 million pieces of data (elements) in each PMM, and perform a sort of this data. In this case, the sort was completed in the following amount of time. Here, we are assuming that each of the buses connecting the PMMs has a data capacity of 6.4 GB/s, all of the PMMs operate in parallel during the processing (namely, no PMM that is not executing a process is present), and all associated PMMs can operate cooperatively and simultaneously. In addition, the sorting of approximately 1 million pieces of data (elements) in each PMM is assumed to be complete in 2.5 seconds. In this case, one can see that sorting the approximately 1 billion elements contained within the 1024 PMMs would require only roughly 4 seconds.

By means of this embodiment, the PMMs are initially divided into pairs of two PMMs, but they are subsequently divided into PMM groups where each group is made up of $2^n$ PMMs, and then the sequence numbers are determined among each pair. In addition, by using switches or the like to regulate the buses used for each pair, the determination of sequence numbers among each pair can be executed in parallel. Moreover, by repeating the procedure of transmitting elements from the former PMM group to the latter PMM group, establishing sequence numbers according to values within the structure array in the later PMM group, it is possible to establish the sequence numbers in all pairs. Accordingly, the processing can be executed in an extremely parallel manner without generating any PMMs that are not executing any processing (so-called "idle" PMMs), and also it is possible to reduce the amount of data transferred using the bus. This permits the sorting speed to be made remarkably fast.

Note that in the aforementioned Embodiment 1, as shown in FIG. 14B and FIG. 15B, the sorting is implemented by connecting PMMs and assigning sequence numbers to the elements among them, but the PMMs may also be connected as shown in FIG. 14A and FIG. 15A. In this case, the processing of the latter PMM group in FIG. 13B (Step 1312 through Step 1323) is not performed in parallel, but once a virtual sequence number is obtained in a certain PMM, the element subject to processing and virtual sequence number in question are transmitted to the adjacent PMM, and the processing of Steps 1312 through 1323 is performed in this PMM. Accordingly, as the number of PMMs that make up the latter PMM group becomes larger, there are cases in which this leads to a commensurate delay in processing.

[Other Sorting (Embodiment 2)]

Here follows a description of Embodiment 2 of the present invention. In the aforementioned Embodiment 1, all of the elements (elements within the former PMM group) are transmitted to the latter PMM group. However, as the array becomes larger, a large number of duplicate values may appear. With the technique according to the aforementioned Embodiment 1, elements that take the same value are sent on the bus many times. Depending on the case, one may think that repeatedly sending elements having the same value would be wasteful. Thus, in Embodiment 2, the number of elements within the PMM group is counted in advance, and by sending the number of elements together with that element to the latter PMM group, the repeated sending of duplicate elements over the bus is prevented.

Figure 23:
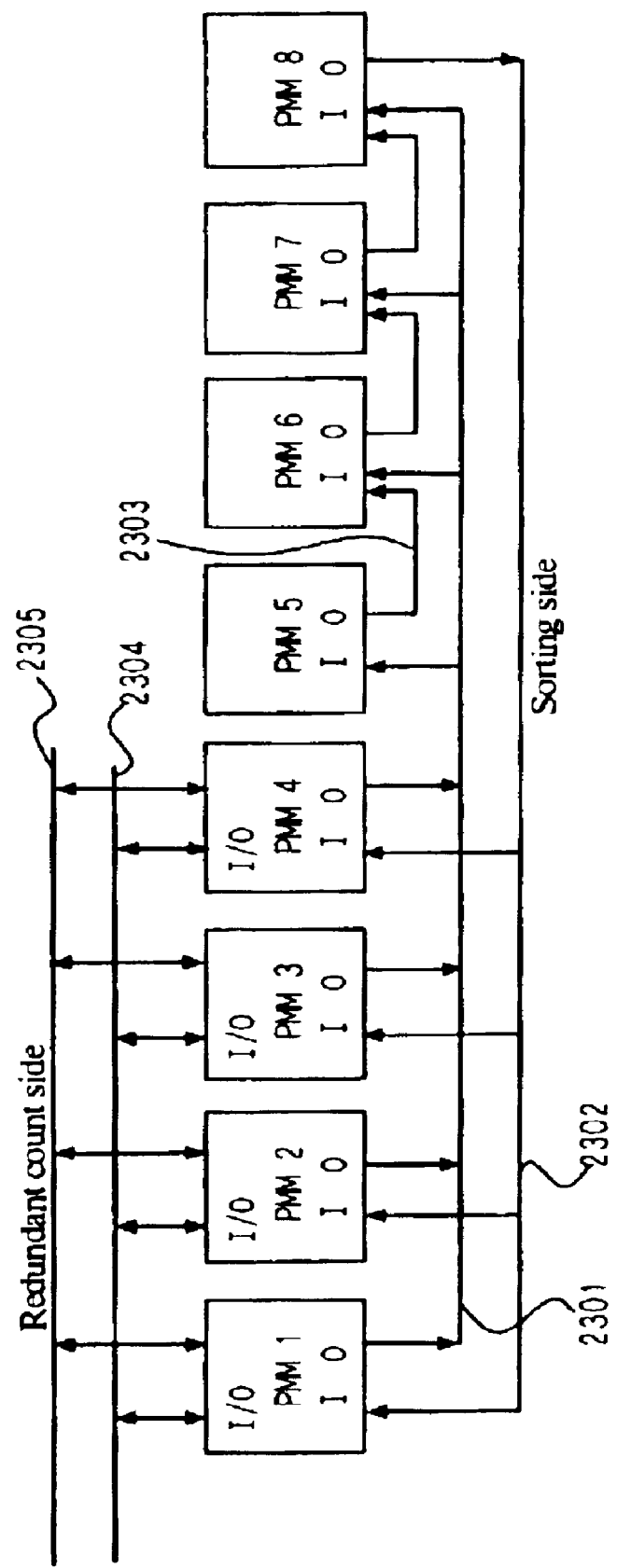
FIG. 23 is a schematic diagram showing an example of the connection of memory modules in the sorting according to Embodiment 2.

For example, consider the case in which the sorting of four pairs of PMMs is complete and these pairs are connected to perform the sorting of eight PMMs. In this case, as shown in FIG. 23, it is preferable to be able to use a bus used to perform the merging and sorting of eight PMMs (the bus positioned below the PMM in FIG. 23; see symbols 2301 through 2303) and exchange data among the PMMs. Here follows a description of the calculation of the redundancy of values in PMM 14-1 through PMM 14-4 (hereinafter, for convenience, "PMM 14-1" through "PMM 14-4" are referred to as "PMM 1" through "PMM 4" respectively) in the connection mode shown in FIG. 23. Here, the bus (see symbol 2304) that connects the input/output terminals (I/O) of PMM 1 through PMM 4 is called the first bus, while the bus (see symbol 2305) that connects the other input/output terminals (I/O) of PMM 1 through PMM 4 is called the second bus. The first bus is used for exchanging information for the PMM group made up of PMM 1 through PMM 4, while the second bus is used for giving the values and their redundancy to the various PMMs.

Figure 24:
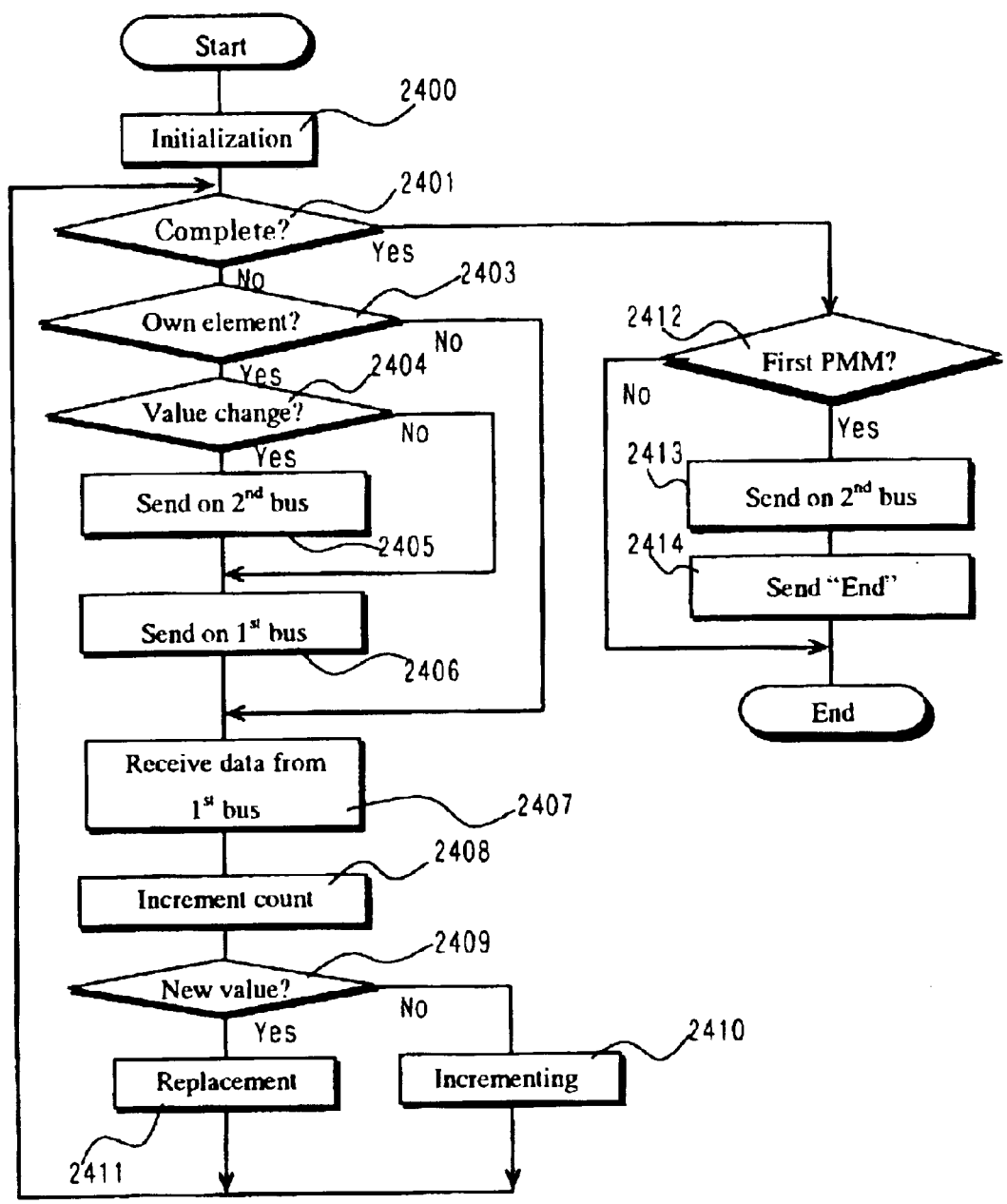
FIG. 24 is a diagram used to describe the process of calculating the redundancy in memory module groups according to Embodiment 2.

Note that in the following description, as shown in FIG. 25, the redundancy of those to which sequence numbers are attached to each element is calculated in the array within PMM 1 through PMM 4. To wit, it is sufficient to calculate the redundancy for only the former PMM group. FIG. 24 is a flowchart showing the process of calculating the redundancy in the PMM group. Each of PMM 1 through PMM 4 first executes various initialization processes (Step 2401). Here, each PMM is provided with a sequence-number counter that indicates the sequence number of the value (element) subject to processing, an identical-value counter that indicates how redundantly a certain value (element) is present, a previous-value storage register that holds the previous value (element) subject to processing, and the sequence-number counter and identical-value counter are given an initial value of "0" as their values (see FIG. 25). Note that initially, the previous-value storage register holds no value.

Next, each PMM refers to the sequence-number counter to determine the sequence number of the element subject to processing, and determines whether the element to which this sequence number is applied is one that it manages itself (Step 2403). In the aforementioned example, the value of the sequence-number counter is initially "0" so PMM 3 determines that an element that it manages itself is subject to processing (Yes in Step 2403). Note that the next Steps 2404–2405 are ignored in the initial processing (namely the processing of the element with a sequence number of "0"). PMM 3 determines how many elements identical to the element with the sequence number of "0" (in this case, "Carter") are present within itself (namely, how many elements equal to "Carter" does PMM 3 manage), and sends to the first bus the element "Carter" and the local PMM internal count, which indicates how many of these elements it has (Step 2406). The other PMMs (PMM 1, PMM 2 and PMM 4) obtain a result of No in Step 2403 and thus advance to Step 2407.

Each PMM receives data given via the first bus and based on the local PMM internal count, adds the PMM internal count to the value of the sequence-number counter (Step 2408). In the aforementioned example, the value of the sequence-number counter becomes "0+1=1." Next, a determination is made as to whether or not the given value is different from that in the previous-value storage register (Step 2409), and if the two are identical, the local PMM internal count is added to the value of the identical-value counter (Step 2410), and on the other hand if it is a new value, the replacement process to be described later is executed (Step 2411). Note that in the initial iteration, the previous-value storage register has no value, so the aforementioned Step 2409 is omitted and the element is stored in the previous-value storage register and also the identical-value counter is incremented. Accordingly, in the aforementioned example, each PMM stores the received element "Carter" in the previous-value storage register and also the identical-value counter is set to "0+1=1" (see FIG. 26).

The processing of these Steps 2401 through 2411 is repeated and when the processing of the last element is complete, Yes results in Step 2401 so processing advances to Step 2412.

Figure 27:
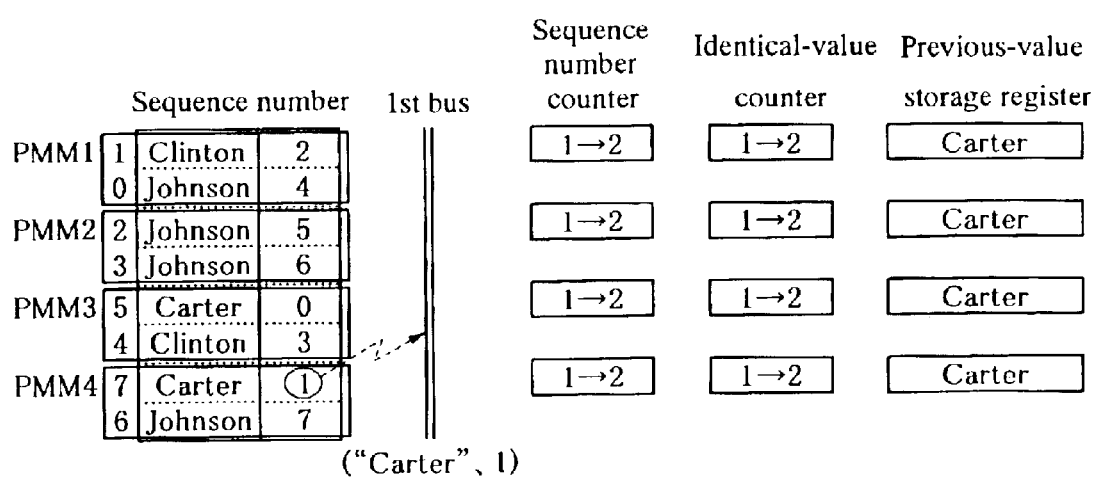
FIG. 27 is a diagram used to describe the process of calculating the redundancy in memory module groups according to Embodiment 2.

In the aforementioned example, when the processing of the first Steps 2401 through 2411 is complete, each PMM refers to the value of the sequence-number counter and confirms that the value is "1." Thereby the PMM 4 knows that it manages the element with the sequence number "1." In addition, the PMM 4 compares the value of the previous-value storage register (the element "Carter") with the element "Carter" which has the sequence number "1" (Step 2404), and there is no change in the value so it sends the element "Carter" and the local PMM internal count "1" over the first bus (Step 2405). As shown in FIG. 27, the PMMs that receive data via the first bus increment (1+1=2) the sequence-number counter (Step 2408), and since the value stored in the previous-value storage register is identical to the received element, they increment (1+1=2) the identical-value counter (Step 2410).

Thereafter, the processing of the element with sequence number "2" is executed in each PMM. In the processing of the element with sequence number "2," PMM 1 holds an element, so PMM 1 compares the element "Clinton" against the element "Carter" stored in the previous-value storage register. Here, there is a change in the value (Yes in Step 2404) so PMM 1 sends over the second bus the content of the previous-value storage register (the element "Carter") and the value "2" of the identical-value counter (Step 2405). This content of the register and the counter value are given to the various PMMs. As described later, when the redundancy of a certain element (in this case the element "Carter") is calculated, the sorting of the element in question (see FIGS. 31A through 31C). Accordingly, the element and its redundancy may be held in each PMM until the sorting of the element in question is complete.

In addition, the element "Clinton" and the local PMM internal count "1" are given to the first bus (Step 2406).

Based on the data given via the first bus, the PMMs increment (2+1=3) the sequence-number counter (Step 2408). In addition, the value "Carter" of the previous-value storage register is different from the transmitted element "Clinton" (Yes in Step 2409) so the PMMs replace (update)

the value of the previous-value storage register and also replace the value of the identical-value counter to the local PMM internal count given via the first bus (see Step 2411 and FIG. 28A).

The same process is performed on the elements with other sequence numbers. For example, for sequence number "3" PMM 3 sends the element "Clinton" over the first bus according to Steps 2404 and 2406 and increments the various counters according to Steps 2407, 2408, 2409 and 2410 (see FIG. 28B). In addition, for sequence number "4" PMM 1 sends the element "Clinton" and the value "2" of the identical-value counter over the second bus according to Steps 2404, 2405 and 2406 and increments the various counters according to Steps 2407, 2408, 2409 and 2411 (see FIG. 29A).

In the processing of sequence number "5," there are two "Johnson" elements that PMM 2 manages, so it sends the element "Johnson" and the local-PMM internal count "2" over the first bus. Accordingly "2" is added to the value of the sequence-number counter and identical-value counter (see FIG. 29B). In addition, by means of this process, the value of the sequence-number counter changes from "5" to "7" so note that the sequence number of the next element subject to processing becomes not "6" but "7." When the processing of the last element with the sequence number of "7" (see FIG. 30A) is complete, Yes results in Step 2401. Then, the beginning PMM (PMM 1 in the aforementioned example) sends, over the second bus, the element "Johnson" and the value "4" of the identical-value counter (Step 2413) and sends, over the second bus, data that indicates that the processing has ended (Step 2414). Each PMM is given via the second bus each element and a count that indicates the number of elements, and these are used for sorting. Note that in the aforementioned example, the beginning PMM is constituted such that it executes Steps 2413 and 2414, but this is not a limitation, as it is sufficient for the PMM to stipulate in advance the last element or the like, and data that indicates the end.

As described above, by obtaining the numbers of various elements present within a certain PMM group, at the time of merging a PMM group with another PMM group and sorting these elements, there is no need to send duplicate elements.

Figure 31A:
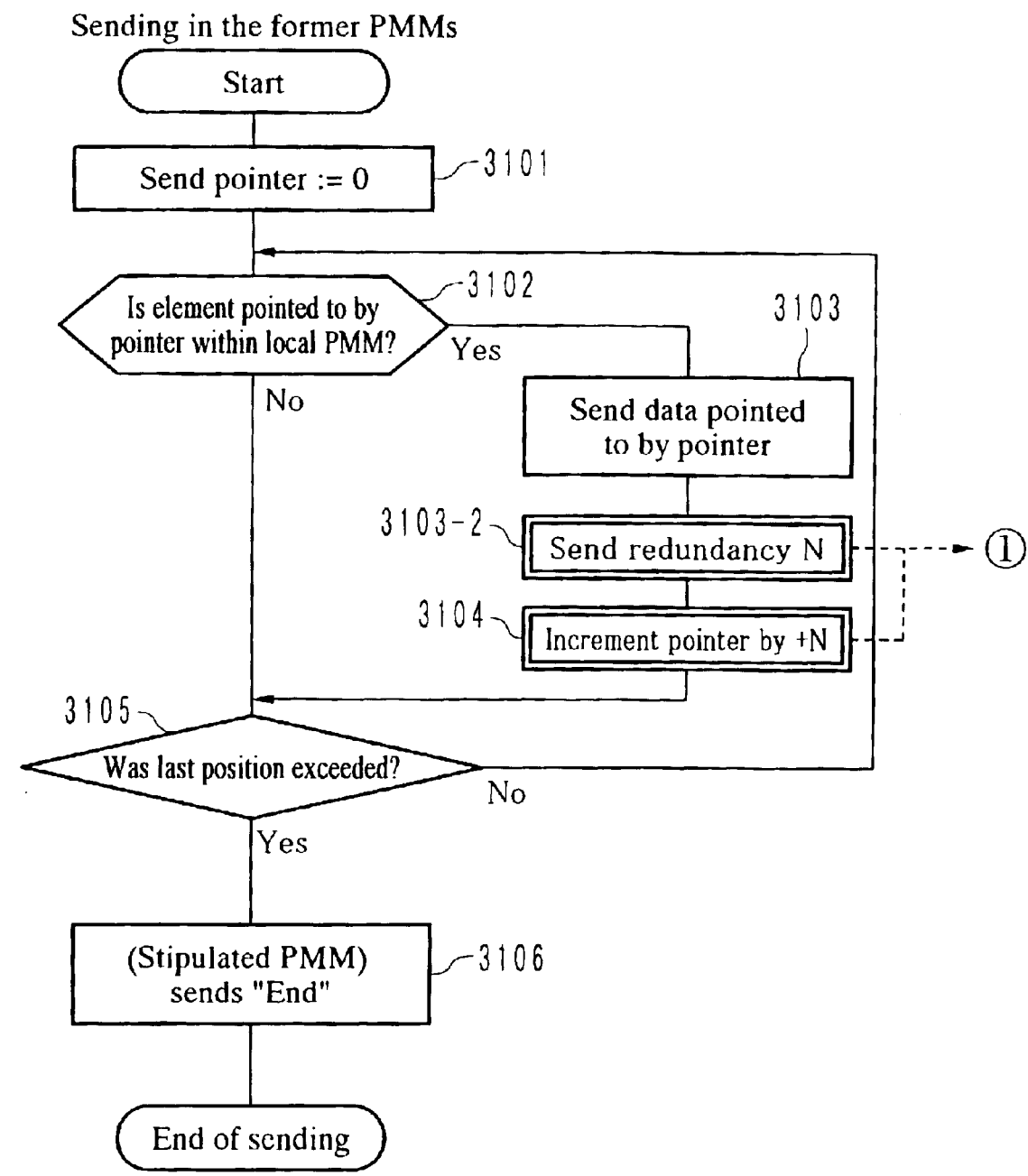
FIGS. 31A to 31C are flowcharts showing sorting with the sending of redundant elements omitted.
Figure 31B:
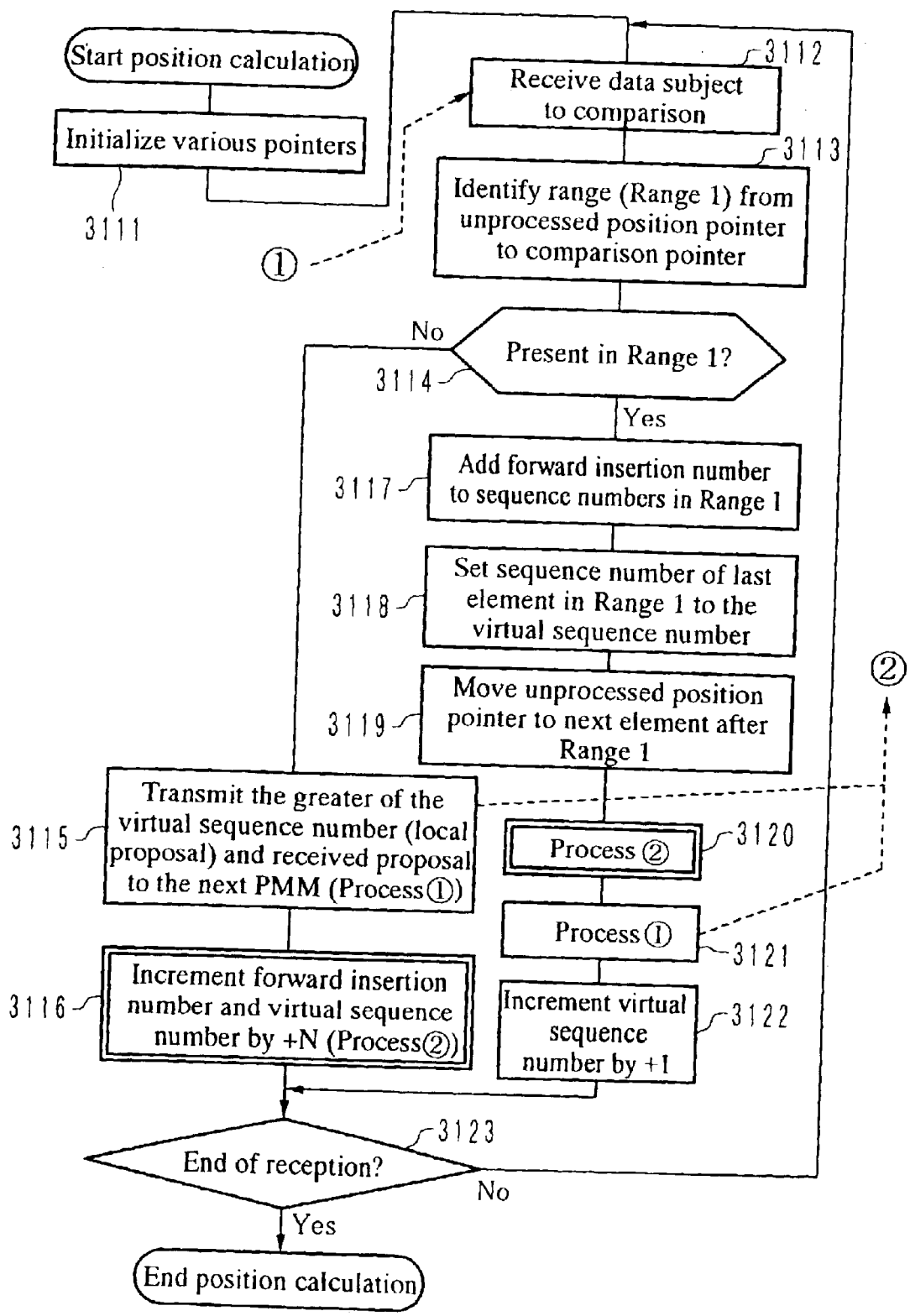
Figure 31C:
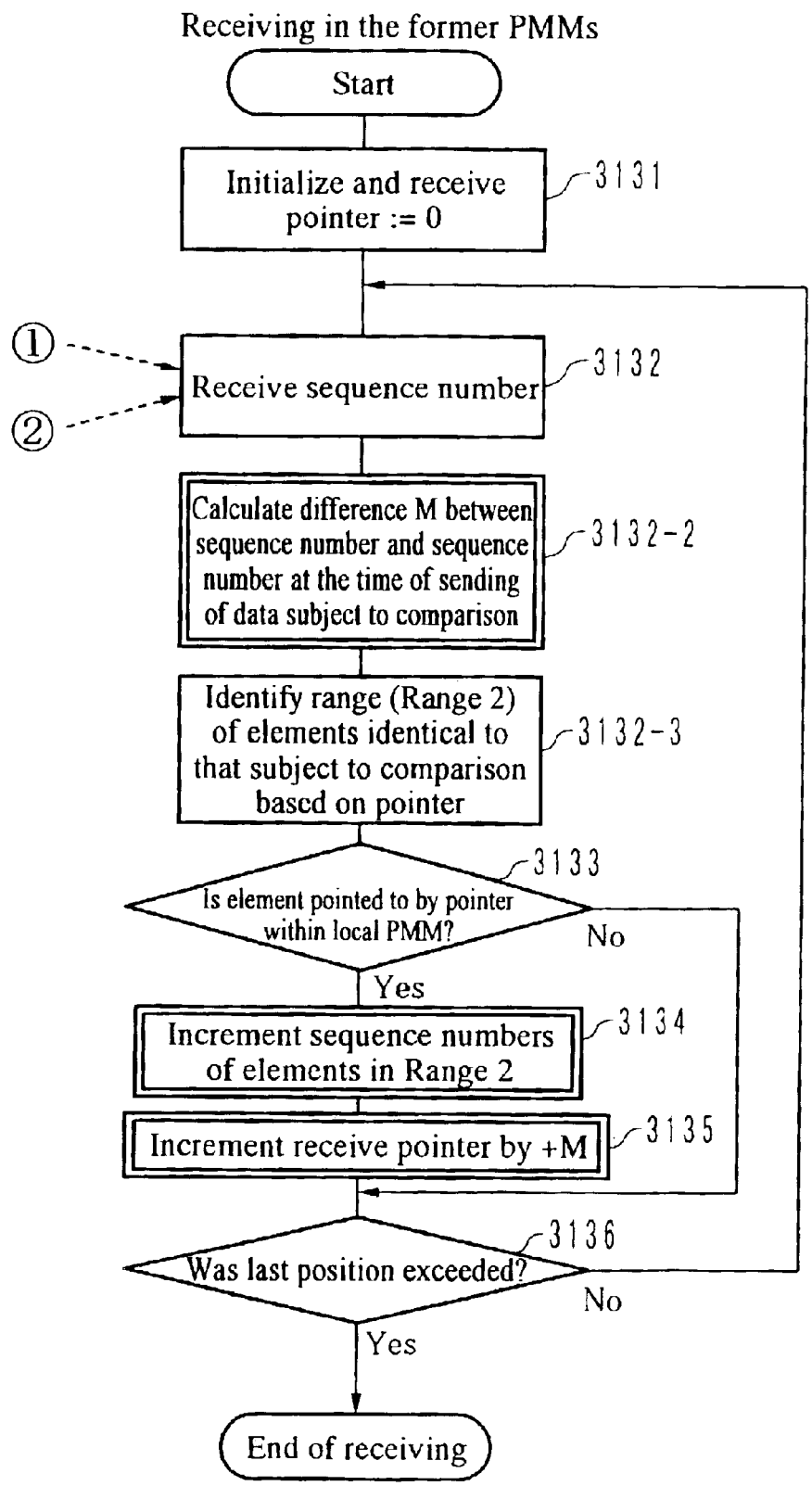

FIGS. 31A–31C are flowcharts showing sorting with the sending of redundant elements omitted. FIGS. 31A–31C are identical to FIGS. 13A–13C with certain exceptions, so steps with the same last two digits are roughly corresponding processes. In addition, the steps in FIGS. 31A–31C that have double lines around them are newly added steps or steps that are slightly different from the corresponding step in FIGS. 13A–13C. In this process, in the former PMM group, the PMM that manages the element subject to processing (namely, the element pointed to by the send pointer) sends to the latter PMM group that element together with the redundancy (number present) "N" of that element in the former PMM group (see Steps 3103 and 3103-2). In the example shown in FIG. 25 through FIG. 30B, for example, when the element "Carter" is sent from the former PMM group made up of PMM 1 through PMM 4 to the latter PMM group, the element "Carter" is transmitted along with the redundancy "2" of the element "Carter" in the former PMM group. In addition, in the send process of the former PMM group the PMM that outputs the element and its redundancy moves the send pointer after that output by the number of the elements in question that it manages itself (Step 3104). For example, as shown in FIG. 28A, the redundancy of the element "Carter" is "2" and these are managed one each in PMM 3 and PMM 4. Accordingly, the position of the send pointer is moved down one each in PMM 3 and PMM 4. Note that the sum of movement of the send pointers in the PMMs is equal to the redundancy "N" of the element in question.

On the other hand, the PMMs that make up the latter PMM group that received the element and its redundancy add the redundancy "N" to both the forward insertion number and virtual sequence number as shown in Step 3116 and Step 3120 of FIG. 31B. This corresponds to the case in which there are "N" elements (with smaller sequence numbers) positioned in front of itself.

Moreover, in the receive process of the PMMs that make up the latter PMM group, the elements (data subject to comparison) sent in the send process of the former PMMs and the sequence number sent in the processing by the latter PMMs are used to calculate the difference "M" between the received sequence number and the sequence number at the time of sending of data subject to comparison (Step 3132-2). This difference "M" indicates the number of elements (given sequence numbers smaller than the element in question) that are positioned before the element subject to comparison. Accordingly, the PMMs that make up the latter PMM group identify elements within the elements managed by it itself that are identical to the element subject to the comparison in question (Step 3132-3), and if present, add "M" to the sequence number of each of these elements (Step 3134). After Step 3134, the PMM moves the receive pointer by the number of the elements in question (Step 3135). This process is roughly identical to Step 3104.

Here follows a description of parallelism in the calculation of the redundancy shown in FIG. 24 and in the sorting shown in FIGS. 31A–31C (sometimes called the "sort itself" depending on the situation). As shown in FIG. 23, in this embodiment, the communication among PMMs involved in the counting of the redundancy is performed using buses 2304 and 2305, while the communication among PMMs involved in the execution of the sort itself is performed using buses 2301, 2302, 2303 and the like. To this end, if parallel processing is possible in the PMM, the counting of redundancy and the sort itself can be executed in parallel. In this case, when the calculation of the redundancy of a certain element in the former PMM group (e.g., as shown in FIG. 28A), the element "Carter" and its redundancy "2" are sent over the second bus and when received by the PMMs (PMM 1 through PMM 4) that make up the former PMM group, the process shown in FIGS. 31A–31C can be executed on the element for which a redundancy is calculated. To wit, in response to the calculation of the redundancy of a certain element, it is possible to execute the processing of Steps 3102–3104, Steps 3112–3122 and Steps 3132–3135 on the element in question. In addition, among the processing shown in the aforementioned FIGS. 31A–31C, a certain element and its redundancy can be deleted together with the completion of those processes regarding the element in question. Accordingly, in each of the PMMs that make up the former PMM group, not all of the data pertaining to the element and its redundancy (the amount of which becomes larger as the number of different elements increases) need be held.

In this manner, in Embodiment 2, the latter PMM group calculates the redundancy and sends the element and its redundancy to the latter PMM group. Accordingly, the former PMM group must send the same element to the latter PMM group redundantly. In cases in which the number of redundant identical elements is large (e.g., when an element indicates the sex of a person, or the age of a person, etc.), it is possible to reduce the number of times the sort itself is processed, so the sorting can be achieved at even higher speed.

[Compiling (Embodiment 3)]

Here follows a description of Embodiment 3 of the present invention. In Embodiment 3, based on an array consisting of elements placed within each PMM, records, a value list without duplicate elements, and an array of pointers for specifying the value list from the record. In this specification, this process is called compiling.

Figure 32:
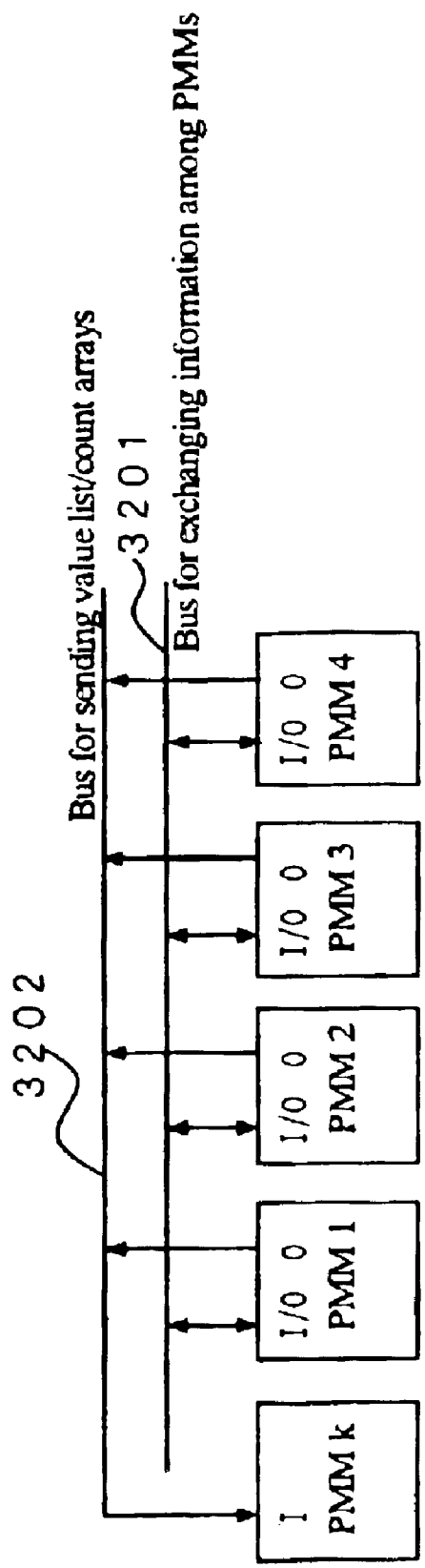
FIG. 32 is a schematic diagram showing an example of the connection of memory modules in the compiling according to Embodiment 3 of the present invention.

For example, when the elements of a certain array are divided among four PMMs (PMM 1 through PMM 4), it is sufficient to connect the PMMs as shown in FIG. 32. As shown in FIG. 32, the input/output pins (I/O) of PMM 1 through PMM 4 are connected by the first bus (see symbol 3201) and on the other hand, the output pins (I) of PMM 1 through PMM 4 and the input pins (I) of another PMM "k" are connected to the second bus (see symbol 3202).

The first bus is used for exchanging information with the PMM group made up of PMM 1 through PMM 4, while the second bus is used for giving the elements and their redundancy to another PMM "k." In this embodiment, based on the aforementioned element and its redundancy, a value list and count array and the like are formed in the other PMM "k." Note that this PMM "k" may be a PMM other than PMM 1 through PMM 4, but of course it may also be one of PMM 1 through PMM 4.

Figure 33:
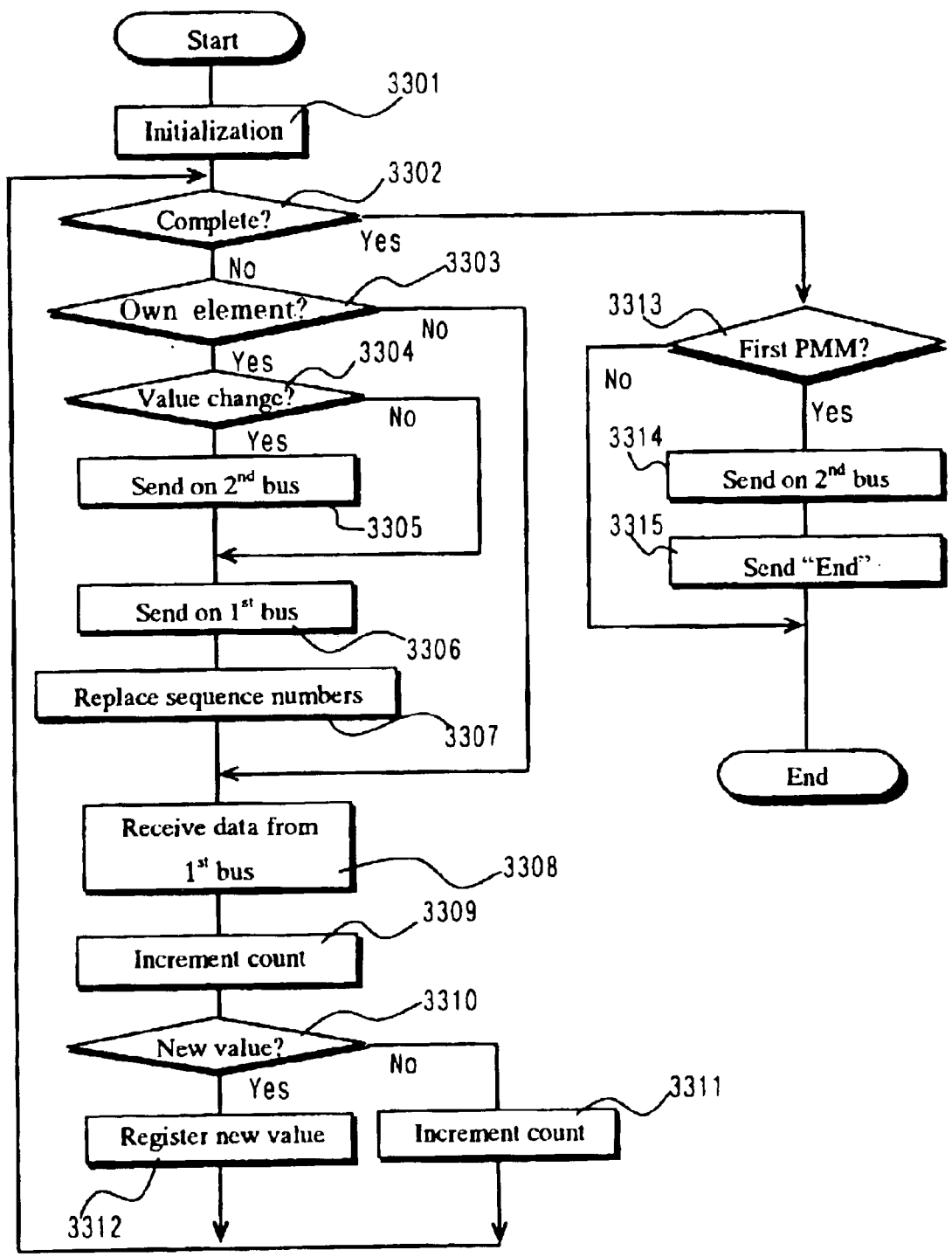
FIG. 33 is a flowchart showing the compiling according to Embodiment 3 of the present invention.

FIG. 33 is a flowchart showing the compiling according to this embodiment. Note that in order to simplify the description, consider that the elements are divided among PMM 1 through PMM 4 as shown in FIG. 34A and that the process of assigning sequence numbers among them has already been executed. First, each PMM is provided with a sequence-number counter that indicates the sequence number of the value (element) subject to processing, a value-number counter that indicates the sequence number of the value (element) in question after processing, an identical value counter that indicates how many redundant copies of the element in question are present, and a previous-value storage register that that holds the previous value (element) subject to processing (see Step 3301 and FIG. 34A). Note that initially, the previous-value storage register holds no value.

Thereafter, the processing of Steps 3302–3306 of FIG. 33 is nearly identical to that of Steps 2401-2406 of FIG. 24. To wit, each PMM refers to the sequence number counter, identifies the sequence numbers that are subject to processing, and determines whether or not the elements given those sequence numbers are managed by itself (Step 3303). In the state of FIG. 34A, the value of the sequence number counter is "0" so PMM 3 creates a local PMM internal count that indicates how many elements with the sequence number "0" on the second bus the PMM 3 in question has (in this example, "1") (see Step 3306 and FIG. 34B). Next, PMM 3 compares the element stored in the previous-value storage register against the element released on the first bus, and if they are different, sets the value of the value-number counter to that sequence number as if it was sent on the first bus (Step 3307). Note that in the state of FIG. 34A, the value of the value-number counter is the initial value of "0" so the sequence number applied to the element "Carter" does not change (see FIG. 34B).

Next, each PMM receives data given via the first bus (Step 3308). The processing of Steps 3308–3311 is nearly identical to that of Steps 2408–2411 of FIG. 24. To wit, each PMM adds the PMM internal count of the given data to the value of the sequence-number counter, and moreover, if the element is not new within the given data (No in Step 3310), it adds the PMM internal count to the value of the identical-value counter (see Step 3311 and FIG. 34B). As shown in FIGS. 34A and 34B, when the processing of the element "Carter" with the sequence number of "0" is complete, the processing of the element with the sequence number of "1" is executed in the same manner (see FIG. 35A).

Furthermore, the processing of the element with the sequence number of "2" is executed. Here, PMM 1 compares the element "Carter" stored in the previous-value storage register against the element "Clinton" with the sequence number of "2." Here, they are different (Yes in Step 3304), so PMM 1 sends over the second bus the element stored in the previous-value storage register and the value of the identical-value counter (Step 3305). Next, the PMM 1 sends over the first bus the element "Clinton" subject to processing and the local PMM internal count "1" (Step 3306). Thereafter, PMM 1 compares the element stored in the previous-value storage register and the element released on the first bus. In the case that the element "Clinton" is released, these are different, so the sequence number of the element "Clinton" is set to the value of the value-number counter to which "1" is added (0+1=1).

Each PMM receives the data given via the first bus (Step 3308) and adds to the value of the sequence number counter the local PMM internal count within the received data (2+1=3) (see Step 3309 and FIG. 35B). In the case that the element "Clinton" is given, the element "Carter" of the previous-value storage register and the given element "Clinton" are different (Yes in Step 3310) so each PMM executes the new-value registration process (Step 3312). In this process, the value of the value-number counter is incremented (0+1=1), the value of the identical-value counter is changed to the local PMM internal count "1" within the received data, and the content of the previous-value storage register is rewritten to the element "Clinton" (see FIG. 35B).

Figure 38:
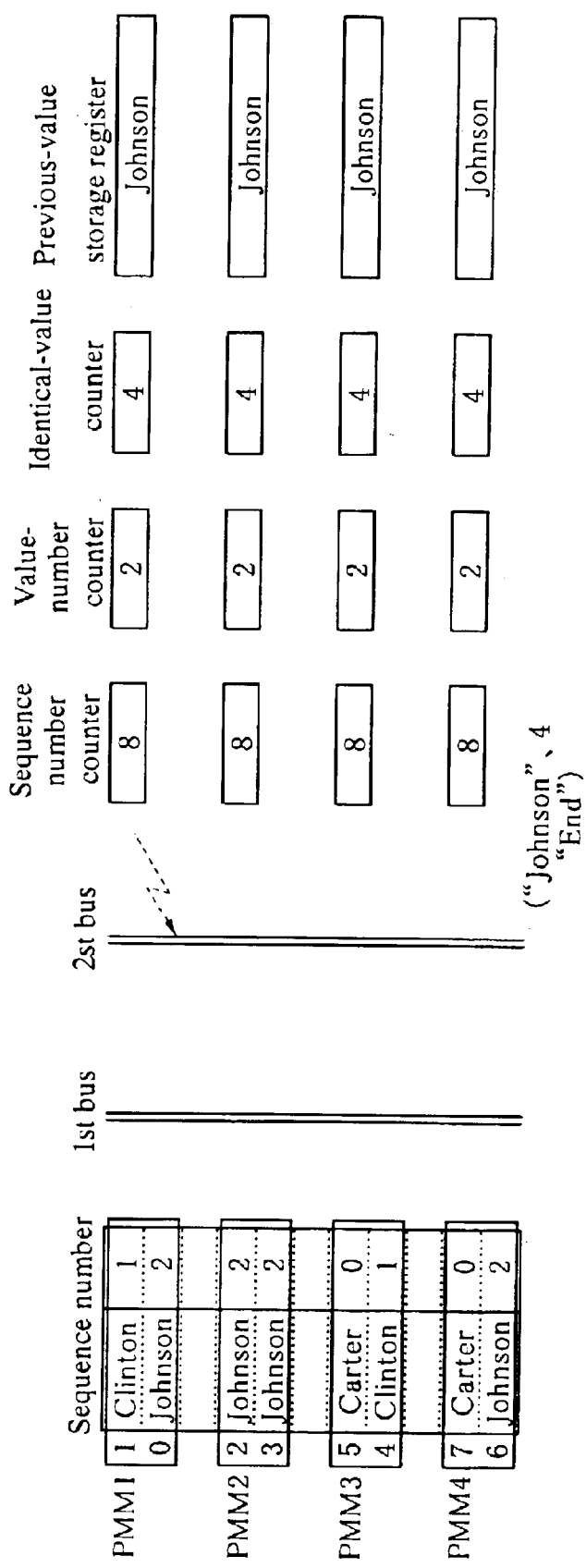
FIG. 38 is a diagram used to describe compiling in the memory module group according to Embodiment 3 of the present invention.

The same process is performed on the element "Clinton" with the sequence number "3." For example, PMM 3 may send over the first bus the element "Clinton" and the local PMM internal count "1" (see Step 3306) and set the sequence number of the element "Clinton" in question to the value "1" of the value-number counter (see Step 3307 and FIG. 36A). In addition, each PMM adds to the value of the sequence-number counter the received local PMM internal count "1" (see Step 3309) and also adds to the value of the identical-value counter the local PMM internal count "1" (see Step 3311 and FIG. 36A). Moreover, as shown in FIG. 36B, regarding the element "Johnson" with the sequence number "4" also, the PMM 1 sends over the second bus the element "Clinton" and the value "2" of the identical-value counter (Step 3305), and sends over the first bus the element "Johnson" and the local PMM internal count "1" (Step 3306), and sets the sequence number of the element "Johnson" to the value of the value-number counter to which "1" is added (1+1=2). On the other hand, each PMM executes the incrementing of the sequence-value counter and the new-value registration process (Steps 3309 and 3312 and FIG. 36B). The same process is performed for the elements with other sequence numbers. The processing of the various elements is shown in FIG. 37A and FIG. 38. Note that regarding FIG. 38, the PMM 1 sends the last element "Johnson" and the count of those elements over the first bus and sends data that indicates the end over the second bus (see Step 3315).

Figure 39A:
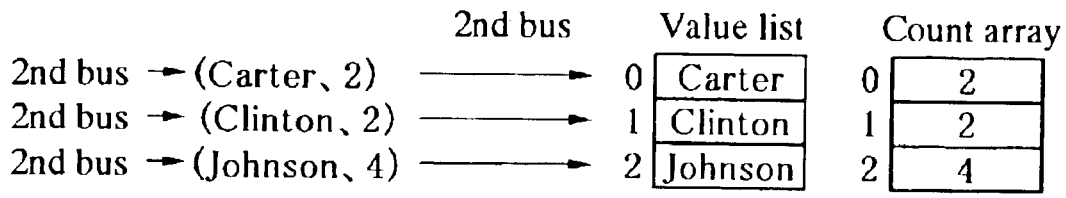
FIGS. 39A and 39B are diagrams used to describe compiling in the memory module group according to Embodiment 3 of the present invention.

As described above, the inputs of PMM "k" are connected to the second bus. Accordingly, non-redundant elements and the value of the value-number counter related thereto are given over the second bus. Accordingly, the PMM "k" receives them and places the received elements sequentially in the value list and also places the received values of the value-number counter sequentially in the count array. FIG. 39A is a diagram of a value list and count array created within the PMM "k." These are sent in Step 3305 or Step 3314 (see FIG. 35B, FIG. 36B and FIG. 38) and transmitted to PMM "k." As shown in FIG. 39A, elements are placed in the value list without redundancy and counts that indicate the number of each element present (namely the redundancy) are placed in the count array.

Figure 39B:
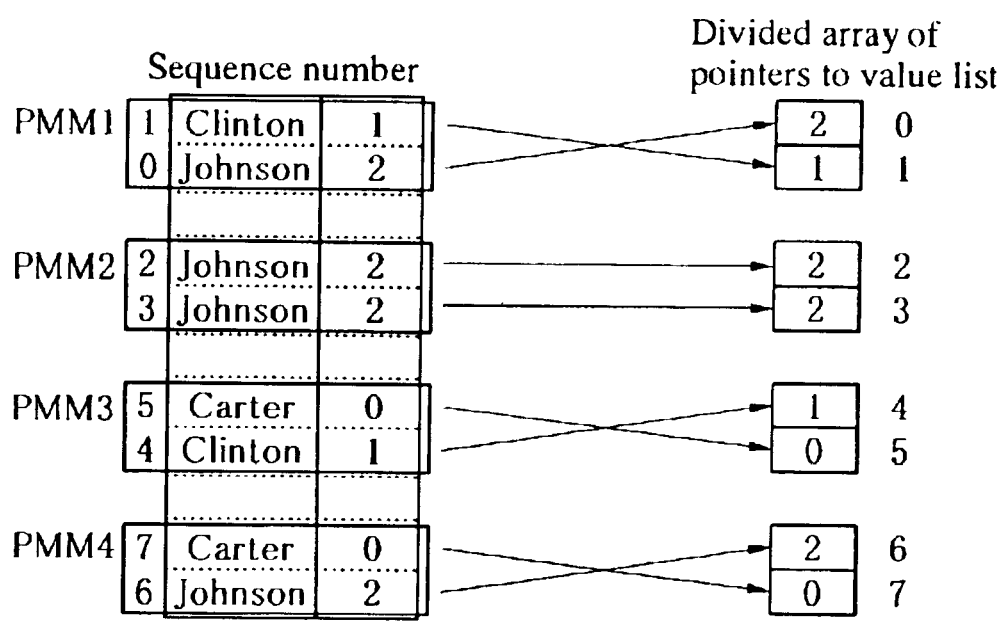

Moreover, it is possible to create in PMM 1 through PMM 4 an array of pointers to the value list that indicates the correspondence between records and the sequence numbers applied to each element without redundancy. To wit, by creating an array that indicates the correspondence between the records and the sequence number applied to the element corresponding to the record in question, it is possible to make this an array of pointers to the value list (see FIG. 39B). In FIG. 39B, regarding record "0," the sequence number "2" of the corresponding element becomes the pointer value in the array of pointers to the value list. This indicates that, in the value list (see FIG. 39A), the value such that the storage position number is "2" is to be pointed at. To wit, based on the pointer value in the array of pointers to the value list, the value list stored in PMM "k" can be pointed at, and thus it is possible to identify the element from the record.

By means of this embodiment thus described, the elements of an array divided among PMMs are sorted and given sequence numbers and, the sequence is reassigned so that the same sequence is assigned to the same element. A correspondence is found between elements and a newly obtained non-redundant sequence and the elements are stored in the value list. The sequence in question is the correspondence between the array of pointers to the value list and the elements within the divided array. Accordingly, it is possible to identify elements within the value list based on records via the pointer values in the pointer array.

[Joining a Value List (Embodiment 4)]

Here follows a description of Embodiment 4 of the present invention. In Embodiment 4, two arrays are joined. This is premised upon the value list and array of pointers to the value list being created by compiling. In addition, a space ID is applied the value list and array of pointers to the value list, and various information regarding the part of the array managed by itself is managed by this space ID in question, etc.

Figure 40:
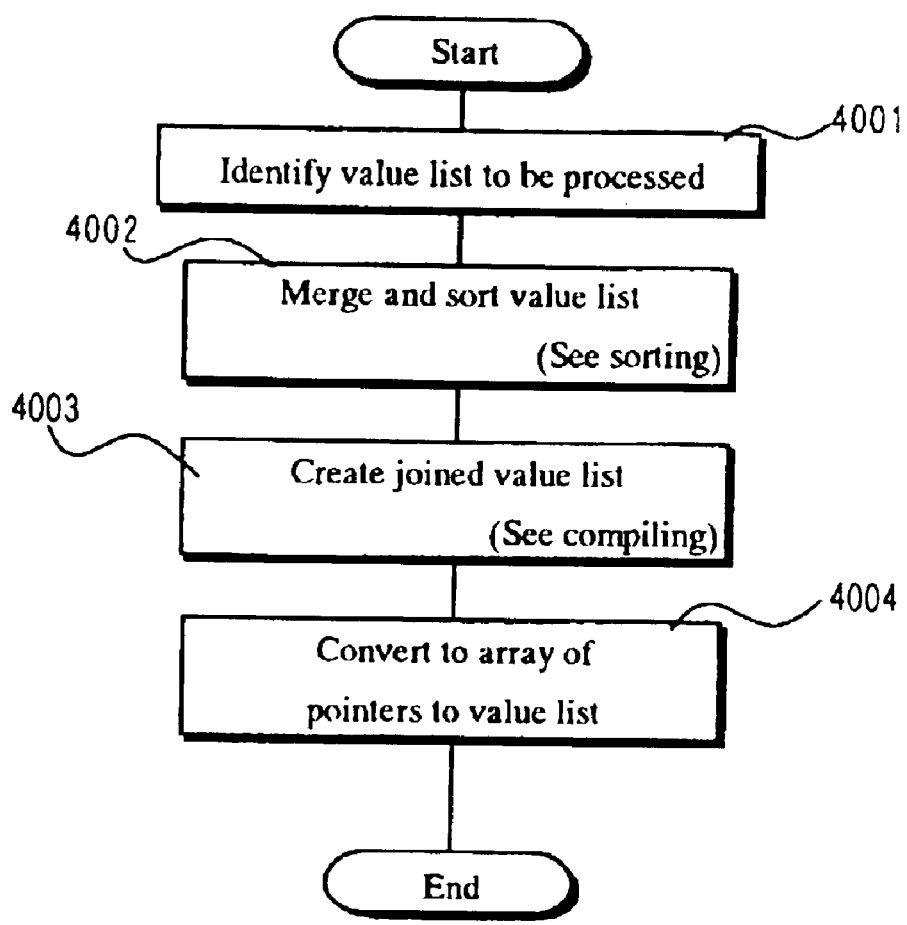
FIG. 40 is a flowchart showing joining according to Embodiment 4 of the present invention.

FIG. 40 is a flowchart that shows the joining process according to Embodiment 4.

In order to simplify the description, as shown in FIG. 41A, consider the case in which the original data is an array consisting of elements corresponding to records (see symbol 4100) which is divided over a certain PMM group. Compiling this record group results in the creation of a block (hereinafter referred to as an "information block") consisting of a pointer array (see symbol 4101) and value list (see symbol 4102) in the PMM group consisting of PMM 1 and PMM 2. On the other hand, the other arrays consisting of elements corresponding to records (see symbol 4110) are divided among other PMM groups, and by compiling, the information block consisting of the pointer array (see symbol 4111) and value list (see symbol 4112) is created in the PMM group consisting of PMM 3 and PMM 4.

The CPU 12 transmits to each PMM an instruction that orders the joining of the value lists along with the space ID of the array that indicates the two value lists. Among the PMMs, those in which the arrays to be joined are value lists that they manage themselves, or portions thereof, identify the value list subject to joining based on the space ID (see Step 4001 and FIG. 42A). Next, PMM 1 through PMM 4 sort them in the state in which the two value lists are merged and assign sequence numbers to the elements (Step 4002). The sorting according to Embodiment can be used for this sorting. In the aforementioned example, first, the sequential numbering of elements is executed on the first PMM group made up of PMM 1 and PMM 2 and the second PMM group made up of PMM 3 and PMM 4, and then sequence numbers are applied to the elements within the two PMM groups by taking the first PMM group as the former PMM group and the second PMM group as the latter PMM group. FIG. 42B is a diagram that shows the state in which the sequence numbers are applied to elements in this manner.

Thereafter, compiling of the PMMs in which the value lists subject to processing are divided is executed to generate a joined value list and joined count array in another PMM or one of the PMMs 1 through 4 (Step 4003). To wit, the compiling is performed to obtain a new value list in which the elements of the merged value list are not redundant and a count array that contains counts that indicate how many duplicate elements are present (sec FIG. 42C). After this process, a new pointer array is needed to point to the joined new value list (namely, the value list obtained by compiling). This is achieved by creating a new pointer array that stores sequence numbers corresponding to the sequence number array obtained by compiling, which indicate the pointer values within the pointer array in the information block prior to joining, in positions corresponding to the positions of pointer vales within the pointer array in question. The values within the aforementioned sequence number array are understood to correspond to the new sequence numbers (see FIG. 42C) applied to the elements.

As shown in FIG. 43A, for example, the value (sequence number) within the sequence number array at the position that indicates the first pointer value "1" within the pointer array is "2" so the pointer value at the corresponding position within the pointer array after joining becomes "2." In addition, the value (sequence number) within the sequence number array at the position that indicates the second pointer value "2" within the pointer array is "3" so the pointer value at the corresponding position within the pointer array after joining becomes "3." In this manner, it is possible to obtain a pointer array for the joined value list (FIG. 43A and FIG. 43B).

In this manner, it is clear that the value (element) can be identified from the record by means of the new pointer array and joined value list. As shown in FIGS. 44A and 44B, the pointer value at the corresponding position within the newly obtained array of pointers to the value list is identified and this pointer value identifies the element within the value list at the position indicated by that value. Here, one can see that the same element is specified as in the element of the original data, even though two value lists are joined.

In this manner, according to Embodiment 4, by merging a plurality of value lists and combining the sorting and compiling with regard to the elements of the merged value list, it is possible to obtain a joined value list and sequence number array for each value list. The value (sequence number) of the sequence number array is identified by means of the pointer array used to specify the value list from a record, and the sequence number in question is stored at a position corresponding to the record, so a new pointer array can be obtained to specify the joined value list based on the record. Accordingly, it is possible to join a plurality of value lists in roughly the time required for the aforementioned sorting and compiling, so the processing speed can be markedly increased.

The present invention is in no way limited to the aforementioned embodiments, as various modifications are possible within the scope of the claims, and it need not be said that these are still included within the scope of the present invention.

For example, while the present invention was applied to a computer system in the aforementioned embodiments, but this is not a limitation, as it may also be applied to a computer board that can be connected to a personal computer or the like. In this case, in FIG. 1, the CPU 12, memory units 14, bus 24 and the like may be mounted upon the board, thereby constituting an information processing unit according to the present invention.

In addition, the number of sets of buses that connect the CPU 12 and memory modules 14, and/or the memory modules 14 to each other is not limited to those in the aforementioned embodiments, but rather this number may be determined appropriately in consideration of the size of the circuit board on which the computer system is mounted, the bit width of the various buses and the like. In addition, in the aforementioned embodiment, switches 28 for setting the connections between memory module input/output and the buses and switches 30 that are able to switch buses between the CPU and memory modules and among memory modules are provided. By providing switches 29 and 30, for example, a certain bus (see bus 24-4 of FIG. 1) can be used for both the exchange of data between the CPU module 12 and memory module 14-1, it can also be used for the exchange of data between memory module 14-2 and memory module 14-3 (in this case, it is sufficient to turn switch 30-5 off). Accordingly, the buses can be utilized effectively. However, in the case in which the number of sets of buses can be made large enough, or in the case that the number of memory modules is relatively few, the switches 30 need not necessarily be provided.

In addition, this Specification recites that the instructions from the CPU 12 are given via the signal control line 25, but in addition to the instructions, naturally clock signals or various other control signals for making the various memory modules to operate synchronously may also be given via the signal control line 25, and also stipulated signals from the various memory modules to the CPU 12 (for example, error signals and signals that indicate the receipt of data) may be given.

Moreover, in the aforementioned embodiments, various examples of connections among the PMMs are illustrated, but the selections of buses to be used for connections among PMMs and the exchange of signals are not limited to those illustrated in the aforementioned embodiments.

In addition, in the aforementioned Embodiment 3, as shown in FIG. 32, the first bus (see symbol 3201) is used to perform communication among PMMs and the second bus (see symbol 3202) is used to perform the communication of elements and the count (redundancy) of these elements, but this is not a limitation. For example as shown in FIG. 45, it may be possible for the PMM "k" which generates a value list which is an array of elements with no redundancy and a count array thereof monitor the first bus 4501 and, based on the elements and count array appearing upon the first bus 4501, perform the stipulated processing (e.g., the incrementing of counters and the saving/updating the content of registers executed by PMM 1 through PMM 4), thus creating the value list and count array.

Moreover, in this Specification, the function of one means may be implemented by two or more physical means, or the functions of two or more means may be implemented by one physical means.

By means of the present invention, it is possible to provide an information processing apparatus wherein the sorting, compiling and joining of arrays can be performed at extremely high speed and with stable processing times.

APPLICABILITY OF THE INVENTION

The present invention is usable in systems that handle large amounts of data, for example, databases and data warehouses. More specifically, it is usable in large-scale scientific and technical calculation, and to order management and the management of mission-critical clerical work such as securities trading.

What is claimed is:

1. A distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, wherein said information processing system is characterized in that the processor of said memory module comprises:

sorting means that executes a sort on the elements that make up those portions of the array that it itself manages, and reorders said elements according to a specific order, I/O that, depending on the positions that said portions managed by itself occupy within the array, sends said sorted elements together with their sequence numbers to another memory module via a stipulated bus, or receives said elements and sequence numbers from another memory module via a stipulated bus, sequence number calculation means that, upon receipt of said element and sequence number, compares it with the elements that it manages itself and calculates a virtual sequence number which is a candidate for the sequence number of the received element, and returns it to said other memory module, and sequence determination means that, upon receipt of said virtual sequence number, determines the sequence of elements according to said virtual sequence numbers;

such that the sequence numbers of elements of said array are determined by means of communication between a presentation memory module on the side that sends said element and sequence number and a determination memory module on the side that receives said element and sequence number and calculates the virtual sequence number.

2. The information processing system according to claim 1, wherein said memory module comprises:

element identification/sending means that identifies elements subject to processing according to the determined sequence number and sends it over one of the buses, element comparison means that compares the previous element subject to processing against the sent element, and an identical-value counter that indicates the count of identical elements and whose value is incremented when an identical element is sent; wherein said element comparison means is constituted such that when the previous element subject to processing is determined to be different from the sent element, the previous element subject to processing is associated with the value of the identical-value counter related to the element in question and one of which is sent, and moreover, one of the memory modules receives the previous element subject to processing and the value of the related counter thus sent, and is provided with an array in which they are associated and placed in the order received.

3. The information processing system according to claim 2, wherein said memory module comprises:

a value-number counter that indicates the non-redundant sequence numbers, whose value is incremented in the event that said element comparison means determines that the previous element subject to processing is different from the sent element, and sequence number updating means that, regarding the sent element, if the previous element subject to processing is identical to the sent element, sets the value of the value-number counter as the sequence number of the non-redundant element in question, but if they are different, sets the incremented value of the value-number counter as the sequence number of the non-redundant element in question.

4. A method of sorting arrays using a distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, wherein said method of sorting comprises:

(a) a step of sorting the elements that make up those portions of the array that it itself manages in the memory module, (b) a step of, depending on the positions that said portions managed by itself occupy within the array, determining, among the memory modules that manage portions of said array, a presentation memory module on the side that sends the element and sequence number, and a determination memory module on the side that receives said element and sequence number, (c) a step of, in the presentation memory module, transmitting the sorted element together with its sequence number to the other memory module via a stipulated bus, (d) a step of, in the determination memory module, receiving said element and its sequence number from the other memory module via a stipulated bus, (e) a step of, in said determination memory module, based on the sequence numbers of elements managed by said determination memory module, calculating a virtual sequence number that indicates a candidate for the sequence number of the received element, and returning said virtual sequence number to said presentation memory module, and (f) a step of, in said presentation memory module, upon receiving said virtual sequence number, updates the sequence number of the element according to said virtual sequence number, and (g) upon each completion of said steps (d) through (f), by taking each of the memory module groups consisting of the presentation memory module and determination memory module pertaining to the element that is given a stipulated sequence number by means of said steps (d) through (f) as one of the presentation memory module group and determination memory module group, respectively, and repeating steps (d) through (f) to update the sequence numbers of elements in each memory module group, the sequence numbers of each element of the array are determined.

5. The method of sorting according to claim 4, wherein said step (e) comprises:

(e1) a step of calculating the virtual sequence number based on a forward insertion number that indicates the number of elements to be inserted in front of the received element, the sequence number regarding the element to be positioned in front, and the received sequence number.

6. The method of sorting according to claim 4 or 5, wherein said step (f) comprises:

(f1) a step of setting the received virtual sequence number to the sequence number of the element sent in step (c).

7. The method of sorting according to claim 4, further comprising:

(h) a step of, in said presentation memory module, calculating the redundancy which indicates how many elements managed by memory modules that make up said presentation memory module group are present within said memory module group, wherein said step (c) comprises:

(c1) a step of transmitting the sorted element together with its sequence number and redundancy to the other memory module so that identical elements are not transmitted redundantly, wherein said step (c) comprises:

(c1) a step of calculating the virtual sequence number based on a forward insertion number that indicates the number of elements to be inserted in front of the received element, the sequence number regarding the element to be positioned in front, and the received sequence number and redundancy, and wherein said step (f) comprises:

(f2) a step of deciding the sequence number of the element identical to the element in question based on the difference between the virtual sequence number and the sequence number at the time of sending of the element in step (c).

8. The method of sorting according to any of claims 4–7, wherein the presentation memory module is initially an independent memory module and the receiving module is also an independent memory module, and the presentation memory module group consists of $2^n$ memory modules where n (n: an integer greater than or equal to 1) is incremented each time steps (d) through (f) are complete, while the determination memory module group consists of $2^n$ memory modules.

9. A compiling method wherein an array is sorted by means of the method according to one of claims 4–6, and based on said sorted array, a new array is generated such that the elements within said array are placed in the stipulated order without duplication, and wherein said compiling method comprises:

(i) a step of, in the stipulated memory module, sending the elements subject to processing according to the sequence number, (j) a step of, if the previous element subject to processing is identical to the sent element, incrementing the identical-value counter that indicates the count of the identical elements present, but if an element different from the previous element subject to processing was sent, associating the previous element subject to processing with the value of the identical-value counter related to the element in question and sending these, (k) a step of receiving the previous element subject to processing and the value of the associated identical-value counter, and generating a new array which has them associated, and (l) repeating steps (i) through (j) to place the elements and their counts such that they are associated in said new array.

10. The compiling method according to claim 9, further comprising (m) a step of, in one of the modules, monitoring the element sent in step (j) and the value of the associated identical-value counter, and wherein step (k) is executed by means of one of said modules.

11. The compiling method according to claim 9, further comprising (n) a step of, in the memory modules that manage the elements of said array, providing a sequence-number counter and identical-value counter that hold the sequence number of the element subject to processing and the count of said elements, respectively, and also providing a register that temporarily stores the previous element subject to processing, (o) a step of, in the memory module that manages the element having the sequence number in question, sending the element in question according to the sequence number, (p) a step of, in the memory module that manages the elements of the array, comparing the received element and the content of the register, and if these are identical, incrementing the count, but if they are not identical, sending the content of the register and the value of the counter over the second bus, and then updating the content of the register and the value of the counter, (q) a step of, in one of the memory modules, placing the content of said register and the value of said counter as the element and count of said elements, respectively, in the array.

12. The compiling method according to claim 11, wherein step (n) further comprises:

(n1) a step of providing a value counter that stores non-redundant sequence numbers for elements subject to processing, wherein said step (p) comprises:

(p1) a step of comparing the received element and the content of the register, and if these are identical, assigning the value of the value-number counter as the sequence number of said element subject to processing, but if they are not identical, incrementing the value-number counter, and assigning the value of the incremented value-number counter as the sequence number of said element subject to processing.

13. A method of joining arrays that achieves the joining of a plurality of arrays using the sorting method according to one of claims 4–8 and the compiling method according to one of claims 9–12, wherein said joining method comprises:

(r) a step of merging a plurality of arrays and executing the processing of said sorting method by assigning sequence numbers to each of the elements in these arrays, and (s) a step of executing the processing of said compiling method according to the elements within said merged array and their sequence numbers, thereby generating a new array with no redundant elements present.

14. A method of joining arrays that achieves the joining of a plurality of arrays using the sorting method according to one of claims 4–8 and the compiling method according to one of claims 9–12 using a distributed memory type information processing system comprising: a CPU module, a plurality of memory modules, each of which having a processor and RAM core, and a plurality of sets of buses that make connections between said CPU and memory modules and/or connections among memory modules, where the processors of the various memory modules execute the processing of arrays managed by the aforementioned one or more memory modules based on instructions given by the CPU to the processors of the various memory modules, wherein said memory modules each comprises a pointer array in which pointer values indicating a value list are placed at positions corresponding to the record number in order to specify stipulated elements in the value list which is an array that stores elements based on the record number, and said method of joining comprises:

(r1) a step of merging a plurality of value lists and executing the processing of said sorting method by assigning sequence numbers to each of the elements in theses arrays, and (t) a step of executing the processing of said compiling method according to the elements within said merged value list and their sequence numbers, thereby generating a new array with no redundant elements present and also updating the sequence numbers of said elements to the sequence numbers of said elements in the case that no redundant elements are present, and (u) a step of setting said array consisting of sequence numbers of elements in the case in which no redundant elements are present as a new pointer array for indicating the new value list.

* * * * *